United States Patent
Jang et al.

(10) Patent No.: US 12,356,212 B2
(45) Date of Patent: Jul. 8, 2025

(54) METHOD AND APPARATUS FOR REPEATING UPLINK TRANSMISSION FOR NETWORK COOPERATIVE COMMUNICATION

(71) Applicant: Samsung Electronics Co., Ltd., Suwon-si (KR)

(72) Inventors: Youngrok Jang, Suwon-si (KR); Hoondong Noh, Suwon-si (KR); Jinhyun Park, Suwon-si (KR); Hyoungju Ji, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 355 days.

(21) Appl. No.: 17/761,584

(22) PCT Filed: Sep. 16, 2020

(86) PCT No.: PCT/KR2020/012516
§ 371 (c)(1),
(2) Date: Mar. 17, 2022

(87) PCT Pub. No.: WO2021/054726
PCT Pub. Date: Mar. 25, 2021

(65) Prior Publication Data
US 2022/0353698 A1  Nov. 3, 2022

(30) Foreign Application Priority Data

Sep. 18, 2019  (KR) .................. 10-2019-0115029

(51) Int. Cl.
| H04W 16/28 | (2009.01) |
| H04L 1/1812 | (2023.01) |
| H04W 72/1268 | (2023.01) |
| H04W 72/23 | (2023.01) |

(52) U.S. Cl.
CPC ........... *H04W 16/28* (2013.01); *H04L 1/1812* (2013.01); *H04W 72/1268* (2013.01); *H04W 72/23* (2023.01)

(58) Field of Classification Search
CPC ....... H04L 1/1812; H04L 1/08; H04L 1/1822; H04L 5/0023; H04L 5/0053;
(Continued)

(56) References Cited

U.S. PATENT DOCUMENTS 11,115,962 B2    9/2021  Kang et al.
2020/0107341 A1*  4/2020  Zhang ................... H04W 80/02
(Continued)

FOREIGN PATENT DOCUMENTS

| KR | 10-2018-0122818 A | 11/2018 |
| KR | 10-2020-0130050 A | 11/2020 |
| WO | 2018/128376 A1 | 7/2018 |

OTHER PUBLICATIONS

International Search Report and Written Opinion of the International Searching Authority dated Dec. 15, 2020, in connection with International Application No. PCT/KR2020/012516, 11 pages.
(Continued)

*Primary Examiner* — Benjamin H Elliott, IV

(57) ABSTRACT

Disclosed are a communication technique and a system thereof for fusing a 5G communication system with IoT technology for supporting a higher data transmission than that of a 4G system. The present disclosure may be applied to intelligent services (for example, smart home, smart building, smart city, smart car or connected car, health care, digital education, retail, security, and safety related services, etc.) on the basis of 5G communication technology and IoT-related technology. The invention of the present disclosure provides an uplink transmission method and apparatus for a plurality of TRPs.

16 Claims, 30 Drawing Sheets

(58) Field of Classification Search
CPC ... H04L 1/1671; H04L 1/1854; H04L 1/1896; H04L 5/0048; H04L 2001/0093; H04L 1/189; H04L 5/0032; H04L 5/0044; H04W 16/28; H04W 72/1268; H04W 72/23; H04W 72/046; H04W 72/20

See application file for complete search history.

(56) References Cited

U.S. PATENT DOCUMENTS

| | | | |
|---|---|---|---|
| 2020/0154427 A1 | 5/2020 | Choi et al. | |
| 2020/0205150 A1* | 6/2020 | Cheng | H04W 72/21 |
| 2020/0229104 A1* | 7/2020 | MolavianJazi | H04W 52/42 |
| 2021/0084640 A1* | 3/2021 | Kang | H04L 5/0048 |
| 2021/0235386 A1* | 7/2021 | Zhang | H04W 52/42 |
| 2022/0201679 A1* | 6/2022 | Lim | H04W 8/22 |
| 2022/0248336 A1* | 8/2022 | Matsumura | H04W 52/10 |
| 2022/0312338 A1* | 9/2022 | Matsumura | H04W 52/146 |
| 2022/0330173 A1* | 10/2022 | Matsumura | H04L 5/0051 |
| 2022/0353698 A1* | 11/2022 | Jang | H04L 5/0053 |
| 2022/0369242 A1* | 11/2022 | Matsumura | H04W 52/325 |

OTHER PUBLICATIONS

Catt, "Considerations on multi-TRP/panel transmission," R1-1908602, 3GPP TSG RAN WG1 Meeting #98, Prague, Czech Republic, Aug. 26-30, 2019, 28 pages.

NTT Docomo, Inc, "Enhancements on multi-TRP/panel transmission," R1-1909201, 3GPP TSG RAN WG1 #98, Prague, Czech Republic, Aug. 26-30, 2019, 36 pages.

Qualcomm Incorporated, "Multi-TRP Enhancements," R1-1909272, 3GPP TSG-RAN WG1 Meeting #98, Prague, Czech Republic, Aug. 26-30, 2019, 32 pages.

Sharp, "Discussion on multi-TRP/panel techniques for URLLC," R1-1909105, 3GPP TSG RAN WG1 Meeting #98, Prague, Czech Republic, Aug. 26-30, 2019, 5 pages.

Office Action dated Sep. 15, 2023, in connection with Korean Patent Application No. 10-2019-0115029, 8 pages.

Caict, "Discussion on URLLC reliability/robustness enhancement with multi-TRP/panel", 3GPP TSG RAN WG1 Ad-Hoc Meeting 1901, Jan. 21-25, 2019, R1-1901133, 2 pages.

Supplementary European Search Report dated Sep. 20, 2022 in connection with European Patent Application No. 20 86 4484, 8 pages.

Decision of Patent dated Apr. 22, 2024, in connection with Korean Application No. 10-2019-0115029, 5 pages.

ZTE, "Further details on multi-beam/TRP operation," R1-1908194, 3GPP TSG RAN WG1 Meeting #98, Prague, CZ, Aug. 26-30, 2019, 17 pages.

LG Electronics, "Feature lead summary of Enhancements on Multi-beam Operations," R1-1909695, 3GPP TSG RAN WG1 Meeting #98, Prague, CZ, Aug. 26-30, 2019, 36 pages.

Communication pursuant to Article 94(3) EPC dated Jul. 30, 2024, in connection with European Application No. 20864484.9, 6 pages.

* cited by examiner

METHOD AND APPARATUS FOR REPEATING UPLINK TRANSMISSION FOR NETWORK COOPERATIVE COMMUNICATION

CROSS-REFERENCE TO RELATED APPLICATIONS

This application is a 371 National Stage of International Application No. PCT/KR2020/012516, filed Sep. 16, 2020, which claims priority to Korean Patent Application No. 10-2019-0115029, filed Sep. 18, 2019, the disclosures of which are herein incorporated by reference in their entirety.

BACKGROUND

1. Field

The disclosure relates to a wireless communication system, and more specifically, to a method and device for a terminal to perform repeated transmission through an uplink for a plurality of transmission points, panels, or beams for cooperative communication between a plurality of transmission points, panels, or beams.

2. Description of Related Art

In order to satisfy increases in demand for wireless data traffic now that a 4G communication system is commercially available, efforts are being made to develop an enhanced 5G communication system or a pre-5G communication system. Therefore, a 5G communication system or a pre-5G communication system is referred to as a beyond 4G network communication system or a post LTE system. In order to achieve a high data transmission rate, consideration is being given to implementing the 5G communication system in a mmWave band (e.g., 60 GHz band). In order to mitigate any route loss of electronic waves in a mmWave band and to increase transmission distances of electronic waves, the technologies of beamforming, massive multiple input and multiple output (MIMO), full dimensional MIMO (FD-MIMO), array antenna, analog beamforming, and large scale antenna are being discussed for the 5G communication system. Further, in order to enhance networks in the 5G communication system, the technologies of an innovative small cell, advanced small cell, cloud radio access network (cloud RAN), ultra-dense network, device to device communication (D2D), wireless backhaul, moving network, cooperative communication, coordinated multi-points (CoMP), and interference cancellation are being developed. Further, hybrid frequency shift keying and quadrature amplitude modulation (FQAM) and sliding window superposition coding (SWSC), which are advanced coding modulation (ACM) methods; and filter bank multi carrier (FBMC), non-orthogonal multiple access (NOMA), and sparse code multiple access (SCMA), which are advanced access technologies, are being developed for the 5G system.

Innovation of Internet from a human-centered connection network in which a human generates and consumes information to an Internet of Things (IoT) network that gives and receives and processes information to and from distributed constituent elements such as things has occurred. Internet of Everything (IoE) technology in which big data processing technology through connection to a cloud server is combined with IoT technology has been appeared. In order to implement the IoT, technology elements such as sensing technology, wired and wireless communication and network infrastructure, service interface technology, and security technology are required; thus, nowadays, research is being carried out on technology of a sensor network, machine to machine (M2M), and machine type communication (MTC) for connection between things. In an IoT environment, an intelligent Internet technology (IT) service that collects and analyzes data generated in connected things to provide a new value to human lives may be provided. The IoT may be applied to the field of a smart home, smart building, smart city, smart car or connected car, smart grid, health care, smart home appliances, and high-tech medical service through fusion and complex connections between existing information technology (IT) and various industries.

Accordingly, various attempts for applying a 5G communication system to an IoT network are being made. For example, 5G communication technologies such as a sensor network, machine to machine (M2M), and machine type communication (MTC) have been implemented by the technique of beamforming, MIMO, and array antenna. Application of a cloud RAN as the foregoing big data processing technology may be an example of convergence of 5G technology and IoT technology.

Further, in a 5G communication system, cooperative communication using a plurality of transmission points is being studied.

SUMMARY

The disclosure provides a method and device for a terminal to perform repeated uplink transmission for a plurality of transmission points, panels, or beams for network coordination in a wireless communication system.

According to a disclosure, a method of transmitting uplink control information of a terminal in a communication system includes receiving, from a base station, physical uplink control channel (PUCCH) repetition configuration information; and repeatedly transmitting the uplink control information on a PUCCH according to the PUCCH repetition configuration information, wherein the PUCCH repetition configuration information includes a plurality of spatial relation information.

Further, the PUCCH repetition configuration information may include an identifier of a reference signal related to a path loss corresponding to each spatial relation information, and the plurality of spatial relation information may include a list of identifier pairs of a spatial relation information identifier and one of a synchronization signal block (SSB), a channel state information reference signal (CSI-RS), or a sounding reference signal (SRS) corresponding to the spatial relation information identifier or a list of identifiers of a spatial relation information identifier and one of a plurality of SSBs, CSI-RSs, or SRSs corresponding to the spatial relation information identifier.

According to a disclosure, a method of receiving uplink control information of a base station in a communication system includes transmitting, to a terminal, physical uplink control channel (PUCCH) repetition configuration information; and repeatedly receiving the uplink control information on a PUCCH according to the PUCCH repetition configuration information, wherein the PUCCH repetition configuration information includes a plurality of spatial relation information.

According to a disclosure, a terminal for transmitting uplink control information of a communication system includes a transceiver; and a controller configured to control to receive physical uplink control channel (PUCCH) repetition configuration information from a base station and to repeatedly transmit the uplink control information on a PUCCH according to the PUCCH repetition configuration information, wherein the PUCCH repetition configuration information includes a plurality of spatial relation information.

According to a disclosure, a terminal for transmitting uplink control information of a communication system includes a transceiver; and a controller configured to control to receive physical uplink control channel (PUCCH) repetition configuration information from a base station and to repeatedly transmit the uplink control information on a PUCCH according to the PUCCH repetition configuration information, wherein the PUCCH repetition configuration information includes a plurality of spatial relation information.

According to the disclosure, when network coordination is used in a wireless communication system, a terminal can transmit control information and data with high reliability by performing repeated uplink transmission to each transmission point, panel, or beam.

DETAILED DESCRIPTION

Figure 1:
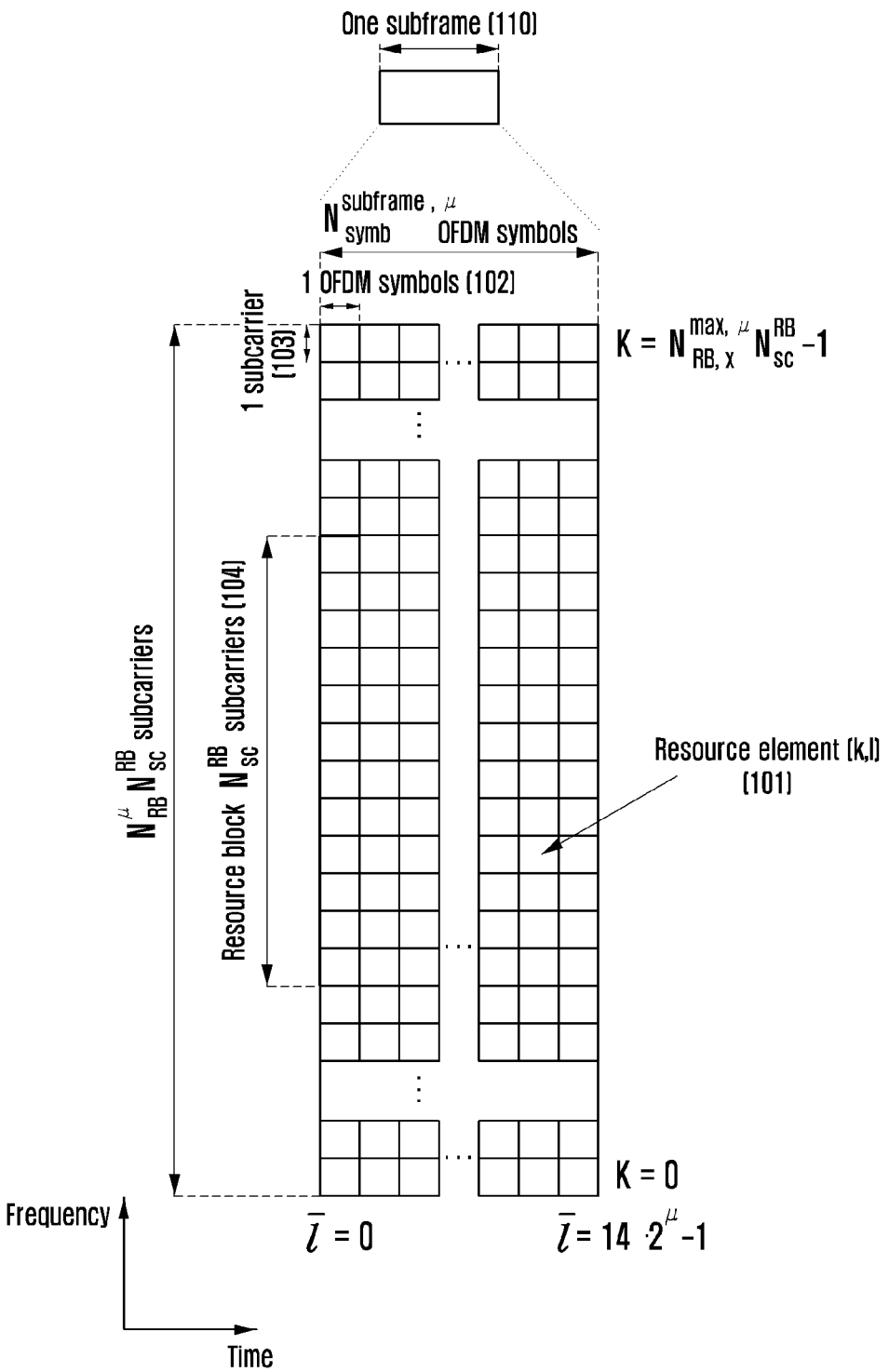
FIG. 1 is a diagram illustrating a basic structure of a time-frequency domain of a mobile communication system according to an embodiment of the disclosure.

Hereinafter, embodiments of the disclosure will be described in detail with reference to the accompanying drawings.

In describing embodiments, descriptions of technical contents that are well known in the technical field to which the disclosure pertains and that are not directly related to the disclosure will be omitted. This is to more clearly convey the gist of the disclosure without obscuring the gist of the disclosure by omitting unnecessary description.

For the same reason, some components are exaggerated, omitted, or schematically illustrated in the accompanying drawings. Further, the size of each component does not fully reflect the actual size. In each drawing, the same reference numerals are given to the same or corresponding components.

Advantages and features of the disclosure, and a method of achieving them will become apparent with reference to the embodiments described below in detail in conjunction with the accompanying drawings. However, the disclosure is not limited to the embodiments disclosed below, but may be implemented in various different forms, and only embodiments of the disclosure enable the disclosure to be complete, and are provided to fully inform the scope of the disclosure to those of ordinary skill in the art to which the disclosure pertains, and the disclosure is only defined by the scope of the claims. Like reference numerals refer to like components throughout the specification.

In this case, it will be understood that each block of flowcharts and combinations of the flowcharts may be performed by computer program instructions. Because these computer program instructions may be mounted in a processor of a general purpose computer, special purpose computer, or other programmable data processing equipment, the instructions performed by a processor of a computer or other programmable data processing equipment generate a means that performs functions described in the flowchart block(s). Because these computer program instructions may be stored in a computer usable or computer readable memory that may direct a computer or other programmable data processing equipment in order to implement a function in a particular manner, the instructions stored in the computer usable or computer readable memory may produce a production article containing instruction means for performing the function described in the flowchart block(s). Because the computer program instructions may be mounted on a computer or other programmable data processing equipment, a series of operational steps are performed on the computer or other programmable data processing equipment to generate a computer-executed process; thus, instructions for performing the computer or other programmable data processing equipment may provide steps for performing functions described in the flowchart block(s).

Further, each block may represent a module, a segment, or a portion of a code including one or more executable instructions for executing specified logical function(s). Further, it should be noted that in some alternative implementations, functions recited in the blocks may occur out of order. For example, two blocks illustrated one after another may in fact be performed substantially simultaneously, or the blocks may be sometimes performed in the reverse order according to the corresponding function.

In this case, a term '-unit' used in this embodiment means software or hardware components such as a field programmable gate array (FPGA) or an application specific integrated circuit (ASIC), and '-unit' performs certain roles. However, '-unit' is not limited to software or hardware. '-unit' may be configured to reside in an addressable storage medium or may be configured to reproduce one or more processors. Therefore, according to some embodiments, '-unit' includes components such as software components, object-oriented software components, class components, and task components, processes, functions, properties, procedures, subroutines, segments of program code, drivers, firmware, microcode, circuit, data, databases, data structures, tables, arrays, and variables. Functions provided in the components and '-units' may be combined into a smaller number of components and '-units' or may be further separated into additional components and '-units'. Further, components and '-units' may be implemented to reproduce one or more CPUs in a device or secure multimedia card. Further, in some embodiments, '-unit' may include one or more processors.

Hereinafter, an operating principle of the disclosure will be described in detail with reference to the accompanying drawings. In the following description, in describing the disclosure, when it is determined that a detailed description of a related well-known function or configuration may unnecessarily obscure the gist of the disclosure, a detailed description thereof will be omitted. Terms described below are terms defined in consideration of functions in the disclosure, which may vary according to intentions or customs of users and operators. Therefore, the definition should be made based on the content throughout this specification. Hereinafter, a base station is a subject performing resource allocation of a terminal, and may be at least one of a gNode B, an eNode B, a node B, a base station (BS), a radio access unit, a base station controller, or a node on a network. The terminal may include a user equipment (UE), a mobile station (MS), a cellular phone, a smart phone, a computer, or a multimedia system capable of performing a communication function. The disclosure is not limited to the above example. Hereinafter, the disclosure describes technology for a terminal to receive broadcast information from a base station in a wireless communication system. The disclosure relates to a communication technique that converges a 5th generation (5G) communication system for supporting higher data rates after a 4th generation (4G) system with Internet of Things (IoT) technology, and a system thereof. The disclosure may be applied to intelligent services (e.g., smart home, smart building, smart city, smart car or connected car, healthcare, digital education, retail business, security and safety-related services and the like) based on 5G communication technology and IoT-related technology.

A term indicating broadcast information used in the following description, a term indicating control information, a term related to communication coverage, a term indicating a state change (e.g., event), a term indicating a network entity, a term indicating messages, and a term indicating a component of a device and the like are exemplified for convenience of description. Accordingly, the disclosure is not limited to the terms described below, and other terms having equivalent technical meanings may be used.

Hereinafter, for convenience of description, some terms and names defined in the 3rd generation partnership project long term evolution (3GPP LTE) standard may be used. However, the disclosure is not limited by the above terms and names, and may be equally applied to systems conforming to other standards.

A wireless communication system has evolved from providing voice-oriented services in the early days to a broadband wireless communication system that provides high-speed and high-quality packet data services such as communication standards such as high speed packet access (HSPA), long term evolution (LTE) or evolved universal terrestrial radio access (E-UTRA), LTE-Advanced (LTE-A), and LTE-Pro of 3GPP, high rate packet data (HRPD), ultra mobile broadband (UMB) of 3GPP2, and IEEE 802.16e.

As a representative example of a broadband wireless communication system, in an LTE system, in a downlink (DL), orthogonal frequency division multiplexing (OFDM), which may be mixed with cyclic prefix-OFDM (CP-OFDM)) method is adopted, and in an uplink (UL), single carrier frequency division multiple access (SC-FDMA, which may be mixed with discrete Fourier transform spread OFDM (DFT-s-OFDM)) method is adopted. The uplink means a radio link in which a user equipment (UE) or a mobile station (MS) transmits data or control signals to an eNode B (eNB) or a base station (BS), and the downlink means a wireless link in which a base station transmits data or control signals to a terminal. The above-described multiple access method enables data or control information of each user to distinguish by allocating and operating data or control information so that time-frequency resources to carry data or control information for each user do not overlap each other, that is, so that orthogonality is established.

A 5G communication system as a future communication system after LTE should support services that satisfy various requirements so that various requirements of users and service providers may be freely reflected. Services considered for the 5G communication system include enhanced mobile broadband (eMBB), massive machine type communication (mMTC), ultra reliability low latency communication (URLLC), and the like.

According to some embodiments, the eMBB aims to provide more improved data transfer rates than data transfer rates supported by existing LTE, LTE-A, or LTE-Pro. For example, in the 5G communication system, the eMBB should be able to provide a peak data rate of 20 Gbps in a downlink and a peak data rate of 10 Gbps in an uplink from the viewpoint of one base station. At the same time, the eMBB should provide an increased user perceived data rate of the terminal. In order to satisfy such requirements, the eMBB requires to improve transmission and reception technologies, including more advanced multi-input and multi-output (MIMO) transmission technology. Further, it is possible to satisfy a data transmission speed required by the 5G communication system by using a frequency bandwidth wider than 20 MHz in a frequency band of 3 to 6 GHz or 6 GHz or more instead of the 2 GHz band used by the current LTE.

At the same time, mMTC is being considered to support application services such as Internet of Thing (IoT) in the 5G communication system. In order to efficiently provide Internet of Things, mMTC requires access support of large-scale terminals within a cell, improvement of coverage of terminals, an improved battery time, and cost reduction of terminals. Because the Internet of Things is attached to various sensors and various devices to provide communication functions, it should be able to support a large number of terminals (e.g., 1,000,000 terminals/km2) within a cell. Further, because a terminal supporting mMTC is highly likely to be positioned in a shaded area that a cell cannot cover, such as the basement of a building, due to the nature of the service, the terminal may require wider coverage compared to other services provided by the 5G communication system. The terminal supporting mMTC should be configured with a low cost terminal, and because it is difficult to frequently exchange a battery of the terminal, the terminal may require a very long battery life time.

Lastly, URLLC is a cellular-based wireless communication service used for a specific purpose (mission-critical) and is a service used in remote control for a robot or machine, industrial automation, an unmanned aerial vehicle, remote health care, emergency alert and the like, and should provide communication that provides ultra-low latency and ultra-reliability. For example, a service supporting URLLC should satisfy air interface latency smaller than 0.5 milliseconds and simultaneously has the requirement of a packet error rate of 10-5 or less. Therefore, for a service supporting URLLC, the 5G system should provide a transmit time interval (TTI) smaller than that of other services, and requires a design requirement that should simultaneously allocate a wide resource in a frequency band. However, the aforementioned mMTC, URLLC, and eMBB are only examples of different service types, and the service types to which the disclosure is applied are not limited to the above-described examples.

The services considered in the above-mentioned 5G communication system should be provided by convergence with each other based on one framework. That is, for efficient resource management and control, it is preferable that each service is integrated into one system rather than being operated independently and controlled and transmitted.

Hereinafter, an embodiment of the disclosure is described using an LTE, LTE-A, LTE Pro, or NR system as an example, but the embodiment of the disclosure may be applied to other communication systems having a similar technical background or channel type. Further, an embodiment of the disclosure may be applied to other communication systems through some modifications within a range that does not significantly deviate from the scope of the disclosure by the determination of a person having skilled technical knowledge.

Hereinafter, a frame structure of a 5G system will be described in more detail with reference to the drawings.

FIG. 1 is a diagram illustrating a basic structure of a time-frequency domain of a mobile communication system according to an embodiment of the disclosure.

With reference to FIG. 1, in FIG. 1, a horizontal axis represents a time domain, and a vertical axis represents a frequency domain. A basic unit of a resource in the time and frequency domains is a resource element (RE) 101, and may be defined to one orthogonal frequency division multiplexing (OFDM) symbol 102 in a time axis and one subcarrier 103 in a frequency axis. In the frequency domain, the $N_{sc}^{RB}$ (e.g., 12) number of consecutive REs may constitute one resource block (RB) 104. In an embodiment, a plurality of OFDM symbols may constitute one subframe 110.

Figure 2:
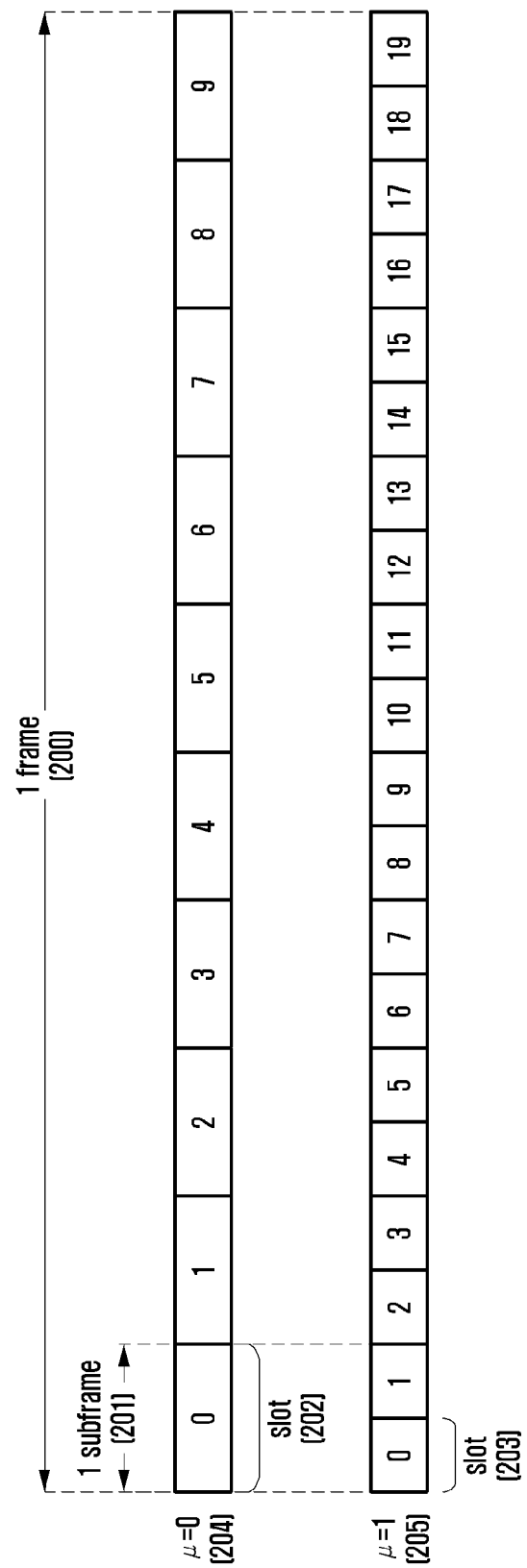
FIG. 2 is a diagram illustrating a frame, subframe, and slot structure of a mobile communication system according to an embodiment of the disclosure.

FIG. 2 is a diagram illustrating a frame, subframe, and slot structure of a next generation mobile communication system according to an embodiment of the disclosure.

With reference to FIG. 2, one frame 200 may include one or more subframes 201, and one subframe may include one or more slots 202. For example, one frame 200 may be defined as 10 ms. One subframe 2-01 may be may be defined as 1 ms, and in this case, one frame 200 may be configured with total 10 subframes 2-01. One slot 202 and 203 may be defined as 14 OFDM symbols (i.e., the number $N_{symb}^{slot}$ of symbols per slot=14). One subframe 201 may be configured with one or a plurality of slots 202 and 203, and the number of slots per subframe 201 may vary depending on a configuration value µ (204, 205) of the subcarrier spacing. An example of FIG. 2 illustrates a case of µ=0 (204) and µ=1 (205) as a subcarrier spacing configuration value. When µ=0 (2-04), one subframe 201 may be configured with one slot 202, and when µ=1 (205), one subframe 201 may be configured with two slots 203. That is, the number $N_{slot}^{subframe,\mu}$ of slots per subframe may vary according to the configuration value µ of the subcarrier spacing; thus, the number $N_{slot}^{frame,\mu}$ of slots per frame may vary. $N_{slot}^{subframe,\mu}$ and $N_{slot}^{frame,\mu}$ according to each subcarrier spacing configuration µ may be defined, as illustrated in Table 1.

TABLE 1

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

In an NR system, one component carrier (CC) or serving cell may be configured with up to 250 or more RBs. Therefore, when the UE always receives an entire serving cell bandwidth like LTE, power consumption of the UE may be extreme, and in order to solve this, the base station may configure one or more bandwidth parts (BWP) to the UE to support the UE to change a reception area within the cell. In NR, the base station may configure an initial bandwidth (initial BWP), which is a bandwidth of a CORESET #0 (or common search space (CSS)) to the UE through a MIB. Thereafter, the base station may configure an initial BWP (first BWP) of the UE through RRC signaling, and notify at least one BWP configuration information that may be indicated through future downlink control information (DCI). Thereafter, by notifying a BWP ID through DCI, the base station may indicate which band the UE will use. When the UE does not receive DCI in the currently allocated BWP for a specific time or more, the UE returns to a default BWP and attempts to receive DCI.

Figure 3:
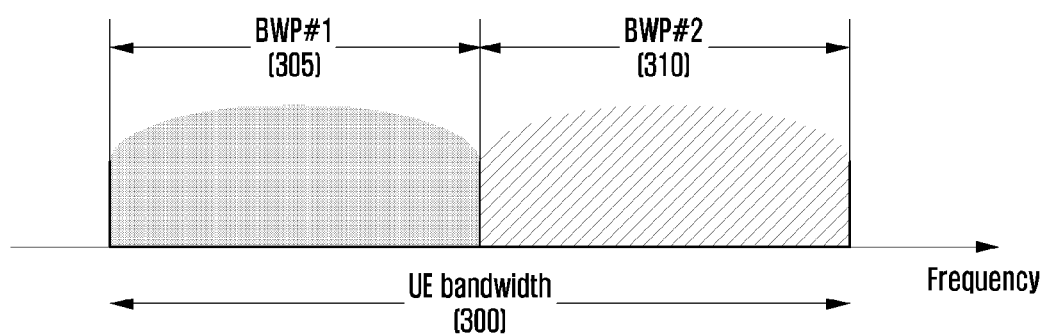
FIG. 3 illustrates an example of a configuration of a bandwidth part (BWP) in a wireless communication system according to an embodiment of the disclosure.

FIG. 3 illustrates an example of a configuration of a bandwidth part (BWP) in a wireless communication system according to an embodiment of the disclosure.

With reference to FIG. 3, FIG. 3 illustrates an example in which a UE bandwidth 300 is configured with two bandwidth parts, that is, a bandwidth part #1, 305 and a bandwidth part #2, 310. The base station may configure one or a plurality of bandwidth parts to the UE, and configure information of Table 2 for each bandwidth part.

tion block 1 (SIB1)) necessary for initial access through the MIB in an initial access step, the UE may receive configuration information on a search space and a control resource set (CORESET) in which a PDCCH may be transmitted. The CORESET and the search space configured by the MIB may be respectively regarded as an identity (ID) 0.

The base station may notify the UE of configuration information such as frequency allocation information, time allocation information, and numerology on a CORESET #0 through the MIB. Further, the base station may notify the UE of configuration information on a monitoring period and occasion for the CORESET #0, that is, configuration information on the search space #0 through the MIB. The UE may regard a frequency domain configured to the CORESET #0 obtained from the MIB as an initial bandwidth part for initial access. In this case, an identifier (ID) of the initial bandwidth part may be regarded as 0. Through the configured initial bandwidth part, the UE may receive a PDSCH transmitted by an SIB, and in addition to the purpose of receiving the SIB, the initial bandwidth part may be utilized for other system information (OSI), paging, and random access.

A configuration of a bandwidth part supported by the above-described next generation mobile communication system may be used for various purposes.

For example, when a bandwidth supported by the UE is smaller than a system bandwidth, the bandwidth supported by the UE may be supported by configuring the bandwidth part. For example, in Table 2, because a frequency position (configuration information 2) of the bandwidth part is configured to the UE, the UE may transmit and receive data at a specific frequency position within the system bandwidth.

As another example, for the purpose of supporting different numerologies, the base station may configure a plurality of bandwidth parts to the UE. For example, in order to support both data transmission and reception using subcarrier spacing of 15 kHz and subcarrier spacing of 30 kHz to

TABLE 2

```
BWP ::=                                  SEQUENCE {
   bwp-Id (Bandwidth Part Identifier)         BWP-Id,
   locationAndBandwidth(Bandwidth part location)     INTEGER (0..37949),
   subcarrierSpacing(Subcarrier Spacing)         SubcarrierSpacing,
cyclicPrefix(cyclic prefix)                    ENUMERATED { extended }
OPTIONAL      -- Need R
}
```

The disclosure is not limited to the above-described example, and in addition to the above-described configuration information, various parameters related to the bandwidth part may be configured to the UE. The above-described information may be transmitted by the base station to the UE through higher layer signaling, for example, RRC signaling. At least one bandwidth part of one or a plurality of configured bandwidth parts may be activated. Whether to activate the configured bandwidth part may be semi-statically transmitted from the base station to the UE through RRC signaling or may be dynamically transmitted through a MAC control element (MAC CE) or DCI.

According to an embodiment, the UE before the radio resource control (RRC) connection may receive a configuration of an initial bandwidth part (initial BWP) for initial access from the base station through a master information block (MIB). More specifically, in order for the UE to receive system information (which may correspond to remaining system information (RMSI) or system informaa random UE, two bandwidth parts may be configured to use subcarrier spacing of 15 kHz and 30 kHz, respectively. Different bandwidth parts may be subjected to frequency division multiplexing (FDM), and when data is transmitted and received at specific subcarrier spacing, a bandwidth part configured to the corresponding subcarrier spacing may be activated.

As another example, for the purpose of reducing power consumption of the UE, the base station may configure a bandwidth part having different sizes of bandwidths to the UE. For example, when the UE supports a very large bandwidth, for example, a bandwidth of 100 MHz and always transmits and receives data with the corresponding bandwidth, very large power consumption may be caused. In particular, it is very inefficient in terms of power consumption for the UE to monitor an unnecessary downlink control channel for a large bandwidth of 100 MHz in a situation in which there is no traffic. Therefore, for the purpose of reducing power consumption of the UE, the base station may configure a relatively small bandwidth part, for example, a bandwidth part of 20 MHz to the UE. In a situation in which there is no traffic, the UE may perform a monitoring operation in the bandwidth part of 20 MHz, and when data is generated, the UE may transmit and receive data using the bandwidth part of 100 MHz according to the instruction of the base station.

Hereinafter, a synchronization signal (SS)/PBCH block of a next generation mobile communication system will be described.

The SS/PBCH block may mean a physical layer channel block configured with a primary SS (PSS), a secondary SS (SSS), and a PBCH. More specifically, the SS/PBCH block may be defined as follows.

PSS: it is a signal serving as a reference for downlink time/frequency synchronization and may provide some information on a cell ID.

SSS: it serves as a reference for downlink time/frequency synchronization, and may provide the remaining cell ID information not provided by the PSS. Additionally, it may serve as a reference signal for demodulating the PBCH.

PBCH: it may provide essential system information necessary for transmitting and receiving a data channel and control channel of the UE. The essential system information may include search space-related control information indicating radio resource mapping information of a control channel, scheduling control information on a separate data channel for transmitting system information, and the like.

SS/PBCH block: the SS/PBCH block may be configured with a combination of a PSS, an SSS, and a PBCH. One or a plurality of SS/PBCH blocks may be transmitted within 5 ms, and each transmitted SS/PBCH block may be distinguished by an index.

The UE may detect a PSS and a SSS in an initial access step and decode the PBCH. The UE may obtain an MIB from the PBCH, and receive the CORESET #0 configured through the MIB. The UE may assume that the selected SS/PBCH block is a quasi co location (QCL) with a demodulation reference signal (DMRS) transmitted in the CORESET #0 and perform monitoring on the CORESET #0. The UE may receive system information with downlink control information transmitted in the CORESET #0. The UE may obtain configuration information related to a random access channel (RACH) necessary for initial access from the received system information. The UE may transmit a physical RACH (PRACH) to the base station in consideration of the selected SS/PBCH block index, and the base station that has received the PRACH may obtain information on the SS/PBCH block index selected by the UE. The base station may know that the UE has selected a certain block from each of the SS/PBCH blocks, and monitors the CORESET #0 corresponding to (or associated with) the SS/PBCH block selected by the UE.

Hereinafter, downlink control information (DCI) in a next generation mobile communication system will be described in detail.

Scheduling information on uplink data (or physical uplink shared channel (PUSCH)) or downlink data (or physical downlink shared channel (PDSCH)) in a next generation mobile communication system (5G or NR system) may be transmitted from the base station to the UE through DCI. The UE may monitor a DCI format for fallback and a DCI format for non-fallback for the PUSCH or the PDSCH. The fallback DCI format may be configured with a fixed field predefined between the base station and the UE, and the non-fallback DCI format may include a configurable field.

DCI may be transmitted through a physical downlink control channel (PDCCH) via a channel coding and modulation process. A cyclic redundancy check (CRC) may be attached to a DCI message payload, and the CRC may be scrambled with a radio network temporary identifier (RNTI) corresponding to an identity of the UE. According to the purpose of the DCI message, for example, UE-specific data transmission, power control command, or random access response, different RNTIs may be used for scrambling of the CRC attached to the payload of the DCI message. That is, the RNTI may not be explicitly transmitted, but may be transmitted while being included in a CRC calculation process. When the DCI message transmitted on the PDCCH is received, the UE may identify the CRC using the allocated RNTI. When the CRC identification result is correct, the UE may know that the corresponding message has been transmitted to the UE.

For example, DCI scheduling a PDSCH for system information (SI) may be scrambled with SI-RNTI. DCI scheduling a PDSCH for a random access response (RAR) message may be scrambled with RA-RNTI. DCI scheduling a PDSCH for a paging message may be scrambled with P-RNTI. DCI notifying a slot format indicator (SFI) may be scrambled with SFI-RNTI. DCI notifying transmit power control (TPC) may be scrambled with TPC-RNTI. DCI scheduling a UE-specific PDSCH or PUSCH may be scrambled with cell RNTI (C-RNTI).

A DCI format 0_0 may be used as fallback DCI for scheduling a PUSCH, and in this case, the CRC may be scrambled with C-RNTI. In an embodiment, the DCI format 0_0 in which the CRC is scrambled with C-RNTI may include information of Table 3.

TABLE 3

- Identifier for DCI formats - [1] bit
- Frequency domain resource assignment -
  [ ⌈ $\log_2(N_{RB}^{UL,\ BWP} (N_{RB}^{UL,\ BWP} + 1)/2)$ ⌉ ] bits
- Time domain resource assignment - 4 bits
- Frequency hopping flag - 1 bit
- Modulation and coding scheme - 5 bits
- New data indicator - 1 bit
- Redundancy version - 2 bits
- HARQ process number - 4 bits
- TPC command for scheduled PUSCH - [2] bits
- UL/SUL indicator - 0 or 1 bit A DCI format 0_1 may be used as non-fallback DCI for scheduling a PUSCH, and in this case, the CRC may be scrambled with C-RNTI. In an embodiment, the DCI format 0_1 in which the CRC is scrambled with C-RNTI may include information of Table 4.

TABLE 4

- Carrier indicator - 0 or 3 bits
- UL/SUL indicator - 0 or 1 bit
- Identifier for DCI formats - [1] bits
- Bandwidth part indicator - 0, 1 or 2 bits

TABLE 4-continued

- Frequency domain resource assignment
  ○ For resource allocation type 0, $\lceil N_{RB}^{DL,\ BWP}/P \rceil$ bits
  ○ For resource allocation type 1, $\lceil \log_2(N_{RB}^{UL,\ BWP}(N_{RB}^{UL,\ BWP} + 1)/2) \rceil$ bits
- Time domain resource assignment - 1, 2, 3, or 4 bits
- VRB-to-PRB mapping (virtual resource block-to-physical resource block) - 0 or 1 bit, only for resource allocation type 1.
  ○ 0 bit if only resource allocation type 0 is configured;
  ○ 1 bit otherwise.
- Frequency hopping flag - 0 or 1 bit, only for resource allocation type 1.
  ○ 0 bit if only resource allocation type 0 is configured;
  ○ 1 bit otherwise.
- Modulation and coding scheme - 5 bits
- New data indicator - 1 bit
- Redundancy version - 2 bits
- HARQ process number - 4 bits
- 1st downlink assignment index - 1 or 2 bits
  ○ 1 bit for semi-static HARQ-ACK codebook;
  ○ 2 bits for dynamic HARQ-ACK codebook with single HARQ-ACK codebook.
- 2nd downlink assignment index - 0 or 2 bits
  ○ 2 bits for dynamic HARQ-ACK codebook with two HARQ-ACK sub-codebooks;
  ○ 0 bit otherwise.
- TPC command for scheduled PUSCH - 2 bits

- SRS resource indicator - $\left\lceil \log_2\left(\sum_{k=1}^{L_{max}} \binom{N_{SRS}}{k}\right)\right\rceil$ or $\lceil \log_2(N_{SRS}) \rceil$ bits ○ bits for non-codebook based PUSCH transmission,
  ○ bits for codebook based PUSCH transmission.
- Precoding information and number of layers - up to 6 bits
- Antenna ports - up to 5 bits
- SRS request - 2 bits
- CSI request - 0, 1, 2, 3, 4, 5, or 6 bits
- CBG (code block group) transmission information - 0, 2, 4, 6, or 8 bits
- PTRS-DMRS association - 0 or 2 bits.
- beta_offset indicator - 0 or 2 bits
- DMRS sequence initialization - 0 or 1 bit A DCI format 1_0 may be used as fallback DCI for scheduling a PDSCH, and in this case, CRC may be scrambled with C-RNTI. In an embodiment, the DCI format 1_0 in which CRC is scrambled with C-RNTI may include information of Table 5.

TABLE 5

- Identifier for DCI formats - [1] bit
- Frequency domain resource assignment -
  $\lceil \log_2(N_{RB}^{DL,\ BWP} (N_{RB}^{DL,\ BWP} + 1)/2) \rceil$ bits
- Time domain resource assignment - 4 bits
- VRB-to-PRB mapping - 1 bit.
- Modulation and coding scheme - 5 bits
- New data indicator - 1 bit
- Redundancy version - 2 bits
- HARQ process number - 4 bits
- Downlink assignment index - 2 bits
- TPC command for scheduled PUCCH - [2] bits
- physical uplink control channel (PUCCH) resource indicator - 3 bits
- PDSCH-to-HARQ feedback timing indicator - [3] bits A DCI format 1_1 may be used as non-fallback DCI for scheduling a PDSCH, and in this case, the CRC may be scrambled with C-RNTI. In an embodiment, the DCI format 1_1 in which the CRC is scrambled with C-RNTI may include information of Table 6.

TABLE 6

Figure 4:
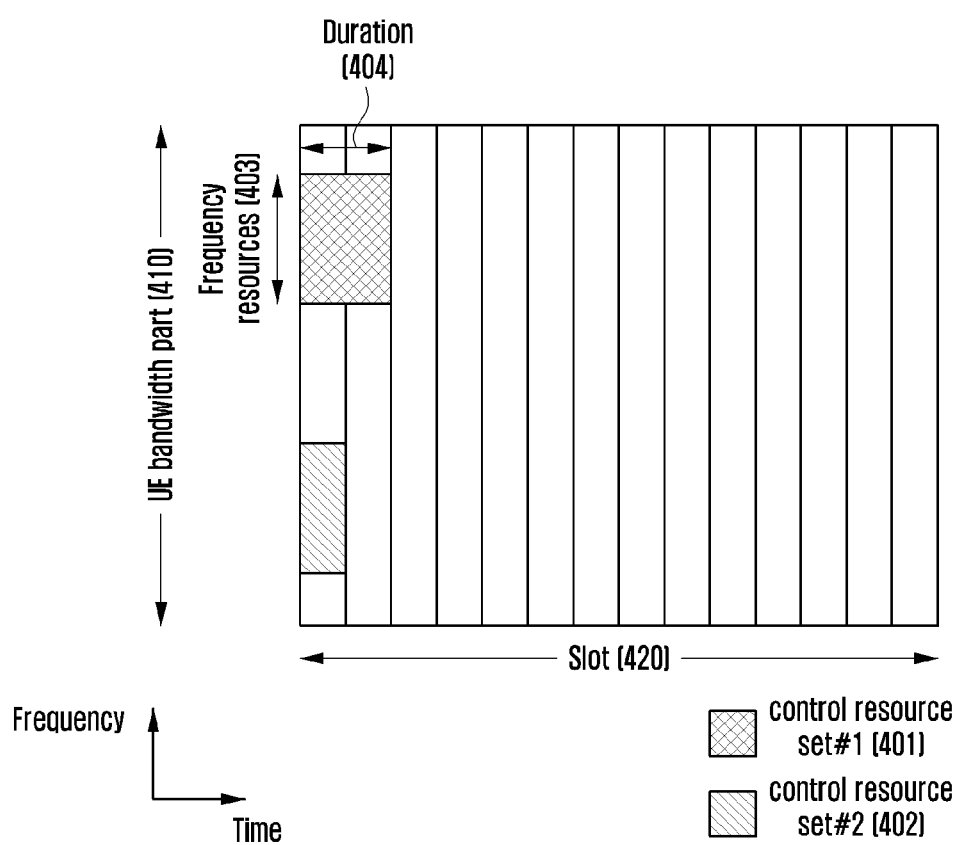
FIG. 4 is a diagram illustrating an example of a control resource set configuration of a downlink control channel in a wireless communication system according to an embodiment of the disclosure.

- Carrier indicator - 0 or 3 bits
- Identifier for DCI formats - [1] bits
- Bandwidth part indicator - 0, 1 or 2 bits
- Frequency domain resource assignment
  ○ For resource allocation type 0, $\lceil N_{RB}^{DL,\ BWP}/P \rceil$ bits
  ○ For resource allocation type 1,

TABLE 6-continued $\lceil \log_2(N_{RB}^{DL,\ BWP} (N_{RB}^{DL,\ BWP} + 1)/2) \rceil$ bits
- Time domain resource assignment -1, 2, 3, or 4 bits
- VRB-to-PRB mapping - 0 or 1 bit, only for resource allocation type 1.
  ○ 0 bit if only resource allocation type 0 is configured;
  ○ 1 bit otherwise.
- PRB bundling size indicator - 0 or 1 bit
- Rate matching indicator - 0, 1, or 2 bits
- ZP CSI-RS trigger - 0, 1, or 2 bits
For transport block 1:
- Modulation and coding scheme - 5 bits
- New data indicator - 1 bit
- Redundancy version - 2 bits
For transport block 2:
- Modulation and coding scheme - 5 bits
- New data indicator - 1 bit
- Redundancy version - 2 bits
- HARQ process number - 4 bits
- Downlink assignment index - 0 or 2 or 4 bits
- TPC command for scheduled PUCCH - 2 bits
- PUCCH resource indicator - 3 bits
- PDSCH-to-HARQ_feedback timing indicator - 3 bits
- Antenna ports - 4, 5 or 6 bits
- Transmission configuration indication - 0 or 3 bits
- SRS request - 2 bits
- CBG transmission information - 0, 2, 4, 6, or 8 bits
- CBG flushing out information - 0 or 1 bit
- DMRS sequence initialization - 1 bit FIG. 4 is a diagram illustrating a control resource set configuration of a downlink control channel of a next generation mobile communication system according to an embodiment of the disclosure. That is, FIG. 4 is a diagram illustrating an embodiment of a CORESET in which a downlink control channel is transmitted according to an embodiment of the disclosure.

With reference to FIG. 4, there is illustrated an example in which two CORESETs (CORESET #1, 401, CORESET #2, 402) are configured within 1 slot 420 on the time axis and a UE bandwidth part 410 on the frequency axis. The CORESETs 401 and 402 may be configured to a specific frequency resource 403 within the entire UE bandwidth part 410 on the frequency axis. The CORESETs 401 and 402 may be configured with one or a plurality of OFDM symbols on the time axis, which may be defined as control resource set duration 404. With reference to FIG. 4, the CORESET #1, 401 may be configured to control resource set duration of 2 symbols, and the CORESET #2, 402 may be configured to control resource set duration of 1 symbol.

The CORESET in the above-described next generation mobile communication system may be configured by transmitting higher layer signaling (e.g., system information, master information block (MIB), RRC (signaling, which may be mixed with higher signaling, higher layer signaling, L3 signaling) by the base station to the UE. To configure the CORESET to the UE means to provide information such as a CORESET identity, a frequency position of the CORESET, and a symbol length of the CORESET. For example, a configuration of the CORESET may include information of Table 7.

TABLE 7

```
ControlResourceSet ::= SEQUENCE {
-- Corresponds to L1 parameter 'CORESET-ID'
controlResourceSetId    ControlResourceSetId,
(CORESET identity (Identity))
frequencyDomainResources     BIT STRING (SIZE (45)),
(frequency axis resource allocation information)
duration INTEGER (1..maxCoReSetDuration),
(Time axis resource allocation information)
cce-REG-MappingType CHOICE {
(CCE-to-REG mapping method)
interleaved SEQUENCE {
reg-BundleSize ENUMERATED {n2, n3, n6},
(REG bundle size)
precoderGranularity ENUMERATED {sameAsREG-bundle, allContiguousRBs},
interleaverSize ENUMERATED {n2, n3, n6}
(interleaver size)
shiftIndex INTEGER(0..maxNrofPhysicalResourceBlocks-1) OPTIONAL
(Interleaver shift (Shift))
},
nonInterleaved NULL
},
tci-StatesPDCCH SEQUENCE(SIZE (1..maxNrofTCI-StatesPDCCH)) OF TCI-StateId
         OPTIONAL,
(QCL configuration information)
tci-PresentInDCI ENUMERATED {enabled}OPTIONAL,       -- Need S
}
```

In Table 7, a tci-StatesPDCCH (hereinafter, TCI state) configuration information may include information on one or more synchronization signals (SSs)/physical broadcast channel (PBCH) block index or a channel state information reference signal (CSI-RS) index in a quasi co located (QCL) relationship with a demodulation reference signal (DIVERS) transmitted in the corresponding CORESET. Further, TCI state configuration information may include information on what kind of relationship the QCL relationship is. For example, the configuration of the TCI state may include information of Table 8.

TABLE 8

```
TCI-State ::= SEQUENCE {
tci-StateId TCI-StateId,
qcl-Type1 QCL-Info,
```

TABLE 8-continued

```
qcl-Type2 QCL-Info OPTIONAL,      -- Need R
...
}
QCL-Info ::= SEQUENCE {
cell (cell index) ServCellIndex OPTIONAL,        -- Need R
bwp-Id (BWP index) BWP-Id OPTIONAL, -- Cond CSI-RS-Indicated
referenceSignal (reference RS index) CHOICE {
csi-rs NZP-CSI-RS-ResourceId,
ssb SSB-Index
},
qcl-Type ENUMERATED {typeA, typeB, typeC, typeD},
...
}
```

With reference to the TCI state configuration, an index of the reference RS in the QCL relationship, that is, a cell index and/or a BW P index and a QCL type of a reference RS together with the SS/PBCH block index or the CSI-RS index may be configured. The QCL type indicates a channel characteristic assumed to be shared between the reference RS and the CORESET DMRS, and examples of possible QCL types are as follows.

QCL typeA: Doppler shift, Doppler spread, average delay, delay spread.
 QCL typeB: Doppler shift, Doppler spread.
 QCL typeC: Doppler shift, average delay.
 QCL typeD: Spatial Rx parameter.

The TCI state may be configured similarly not only for a CORESET DMRS but also for other target RSs, for example, a PDSCH DMRS and CSI-RS.

Figure 5:
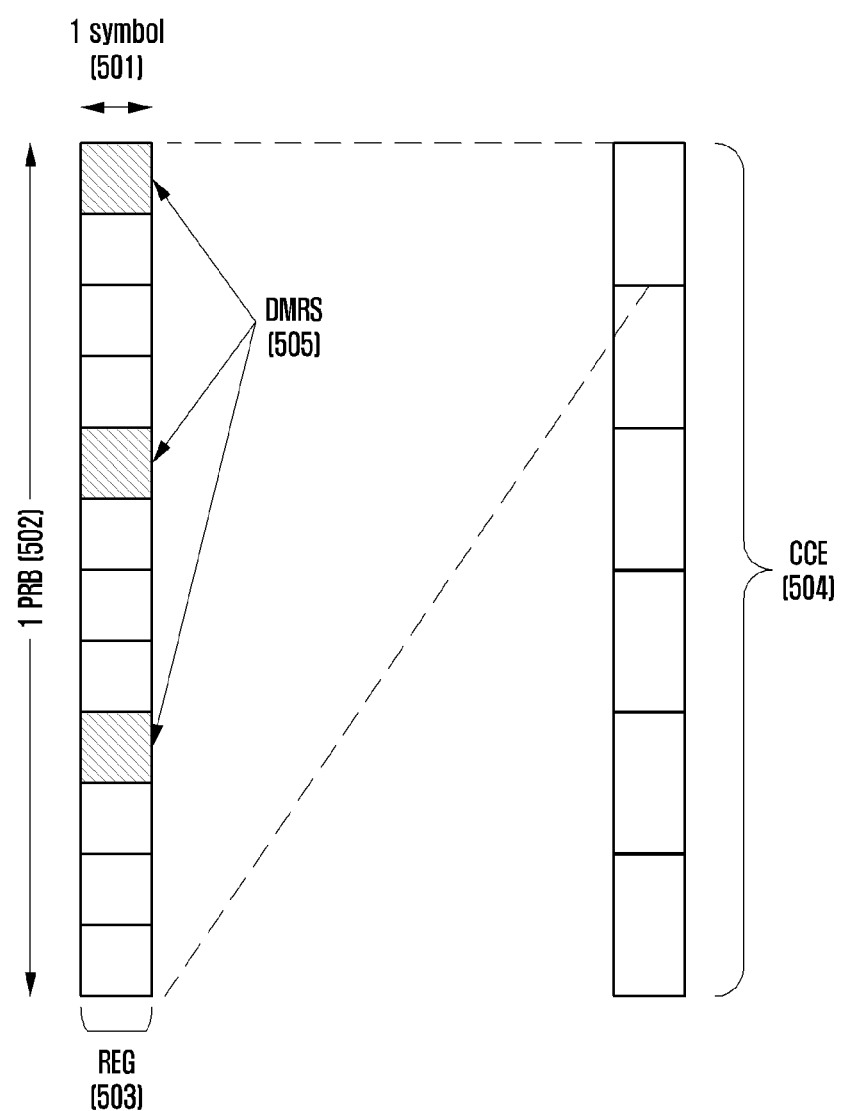
FIG. 5 is a diagram illustrating a structure of a downlink control channel of a mobile communication system according to an embodiment of the disclosure.

FIG. 5 is a diagram illustrating a structure of a downlink control channel of a next generation mobile communication system according to an embodiment of the disclosure. FIG. 5 illustrates an example of a basic unit of time and frequency resources constituting a downlink control channel.

With reference to FIG. 5, a basic unit of time and frequency resources constituting a control channel may be defined to a resource element group (REG) 503. The REG 503 may be defined to 1 OFDM symbol 501 on the time axis and 1 physical resource block (PRB) 502 on the frequency axis, that is, 12 subcarriers. The base station may configure a downlink control channel allocation unit by concatenating the REG 503.

As illustrated in FIG. 5, when a basic unit to which a downlink control channel is allocated is a control channel element (CCE) 504, 1 CCE 504 may be configured with a plurality of REGs 503. For example, the REG 503 illustrated in FIG. 5 may be configured with 12 REs, and when 1 CCE 504 is configured with 6 REGs 503, 1 CCE 504 may be configured with 72 REs. When a downlink CORESET is configured, the corresponding region may be configured with a plurality of CCEs 504, and a specific downlink control channel may be mapped and transmitted to one or a plurality of CCEs 504 according to an aggregation level (AL) in the CORESET. The CCEs 504 in the CORESET are divided by numbers, and in this case, the numbers of the CCEs 504 may be assigned according to a logical mapping method.

A basic unit of the downlink control channel illustrated in FIG. 5, that is, the REG 503 may include both REs to which DCI is mapped and an area to which a DMRS 505, which is a reference signal for decoding the REs, is mapped. As illustrated in FIG. 5, three DMRSs 505 may be transmitted within one REG 503. The number of CCEs necessary for transmitting the PDCCH may be 1, 2, 4, 8, or 16 according to an aggregation level, and the numbers of different CCEs may be used for implementing link adaptation of a downlink control channel. For example, when AL=L, one downlink control channel may be transmitted through the L number of CCEs.

The UE needs to detect a signal without knowing information on the downlink control channel, but for blind decoding, a search space representing a set of CCEs may be defined. The search space is a set of downlink control channel candidates configured with CCEs in which the UE should attempt to decode on a given aggregation level. Because there are various aggregation levels that make one bundle with 1, 2, 4, 8, and 16 CCEs, the UE may have a plurality of search spaces. A search space set may be defined as a set of search spaces in all configured aggregation levels.

The search space may be classified into a common search space and a UE-specific search space. According to an embodiment of the disclosure, in order to receive cell-common control information such as dynamic scheduling for system information or a paging message, a certain group of UEs or all UEs may search for the common search space of the PDCCH.

For example, the UE may receive PDSCH scheduling allocation information for transmission of an SIB including operator information of a cell by searching for the common search space of the PDCCH. In the case of the common search space, because a certain group of UEs or all UEs should receive the PDCCH, the common search space may be defined as a set of predefined CCEs. The UE may receive scheduling allocation information on UE-specific PDSCH or PUSCH by searching for a UE-specific search space of the PDCCH. The UE-specific search space may be UE-specifically defined as a function of an identity of the UE and various system parameters.

A parameter for a search space of the PDCCH may be configured from the base station to the UE through higher layer signaling (e.g., SIB, MIB, RRC signaling). For example, the base station may configure the number of PDCCH candidates in each aggregation level L, a monitoring period of the search space, a monitoring occasion in units of symbols in a slot of the search space, a search space type (common search space or UE-specific search space), a combination of a DCI format and RNTI to be monitored in the corresponding search space, and a CORESET index for monitoring the search space to the UE. For example, the above-described configuration may include information of Table 9.

TABLE 9

```
SearchSpace ::= SEQUENCE {
-- Identity of the search space. SearchSpaceId = 0 identifies the SearchSpace configured viaPBCH
(MIB) or ServingCellConfigCommon.
searchSpaceId   SearchSpaceId,
(search space identifier)
controlResourceSetId   ControlResourceSetId,
(CORESET identifier)
monitoringSlotPeriodicityAndOffset      CHOICE {
(monitoring slot level period)
sl1NULL,
sl2 INTEGER (0..1),
sl4 INTEGER (0..3),
sl5 INTEGER (0..4),
sl8 INTEGER (0..7),
sl10 INTEGER (0..9),
sl16 INTEGER (0..15),
sl20 INTEGER (0..19)
}              OPTIONAL,
duration(monitoring length) INTEGER (2..2559)
monitoringSymbolsWithinSlot BIT STRING (SIZE (14)) OPTIONAL,
(Monitoring symbol in a slot)
nrofCandidates SEQUENCE {
(Number of PDCCH candidates for each aggregation level)
aggregationLevel1 ENUMERATED {n0, n1, n2, n3, n4, n5, n6, n8},
aggregationLevel2 ENUMERATED {n0, n1, n2, n3, n4, n5, n6, n8},
aggregationLevel4 ENUMERATED {n0, n1, n2, n3, n4, n5, n6, n8},
aggregationLevel8 ENUMERATED {n0, n1, n2, n3, n4, n5, n6, n8},
aggregationLevel16 ENUMERATED {n0, n1, n2, n3, n4, n5, n6, n8}
},
searchSpaceType CHOICE {
(Search space type)
-- Configures this search space as common search space (CSS) and DCI formats to monitor.
Common SEQUENCE {
```

TABLE 9-continued

```
(Common search space)
}
ue-Specific SEQUENCE {
(UE-specific search space)
-- Indicates whether the UE monitors in this USS for DCI formats 0-0 and 1-0 or for formats 0-1
and 1-1.
            formats ENUMERATED {formats0-0-And-1-0, formats0-1-And-1-1},
            ...
        }
```

Based on configuration information, the base station may configure one or a plurality of search space sets to the UE. According to an embodiment of the disclosure, the base station may configure a search space set 1 and a search space set 2 to the UE, and configure to monitor a DCI format A scrambled with X-RNTI in the search space set 1 in the common search space and to monitor a DCI format B scrambled with Y-RNTI in the search space set 2 in a UE-specific search space.

According to the configuration information, one or a plurality of search space sets may exist in the common search space or the UE-specific search space. For example, a search space set #1 and a search space set #2 may be configured to the common search space, and a search space set #3 and a search space set #4 may be configured to the UE-specific search space.

In the common search space, a combination of the following DCI format and RNTI may be monitored. The disclosure is not limited to the following examples.

DCI format 0_0/1_0 with CRC scrambled by C-RNTI, CS-RNTI, SP-CSI-RNTI, RA-RNTI, TC-RNTI, P-RNTI, SI-RNTI DCI format 2_0 with CRC scrambled by SFI-RNTI DCI format 2_1 with CRC scrambled by INT-RNTI DCI format 2_2 with CRC scrambled by TPC-PUSCH-RNTI, TPC-PUCCH-RNTI DCI format 2_3 with CRC scrambled by TPC-SRS-RNTI In the UE-specific search space, the following combination of DCI format and RNTI may be monitored. The disclosure is not limited to the following examples.

DCI format 0_0/1_0 with CRC scrambled by C-RNTI, CS-RNTI, TC-RNTI

DCI format 1_0/1_1 with CRC scrambled by C-RNTI, CS-RNTI, TC-RNTI

The specified RNTIs may follow the following definitions and uses.

Cell RNTI (C-RNTI): UE-specific PDSCH scheduling use

Temporary cell RNTI (TC-RNTI): UE-specific PDSCH scheduling use

Configured scheduling RNTI (CS-RNTI): semi-statically configured UE-specific PDSCH scheduling use Random access RNTI (RA-RNTI): use for scheduling a PDSCH in a random access step Paging RNTI (P-RNTI): use for scheduling a PDSCH in which paging is transmitted System information RNTI (SI-RNTI): use for scheduling a PDSCH in which system information is transmitted Interruption RNTI (INT-RNTI): use for notifying whether a PDSCH is punctured.

Transmit power control for PUSCH RNTI (TPC-PUSCH-RNTI): use for indicating a power control command for a PUSCH Transmit power control for PUCCH RNTI (TPC-PUCCH-RNTI): use for indicating a power control command for a PUCCH Transmit power control for SRS RNTI (TPC-SRS-RNTI): use for indicating a power control command for a SRS In an embodiment, the above-described DCI formats may be defined, as illustrated in Table 10.

TABLE 10

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

According to an embodiment of the disclosure, a plurality of search space sets may be configured with different parameters (e.g., parameters of Table 8). Accordingly, a set of search space sets monitored by the UE at every occasion may be different. For example, when a search space set #1 is configured to an X-slot period and a search space set #2 is configured to a Y-slot period, and X and Y are different, the UE may monitor both the search space set #1 and the space set #2 in a specific slot, and monitor one of the search space set #1 and the search space set #2 in a specific slot.

Hereinafter, a method of allocating time and frequency resources for data transmission in NR will be described.

In NR, the following detailed frequency domain resource allocation (FD-RA) may be provided in addition to frequency axis resource candidate allocation through BWP indication.

Figure 6:
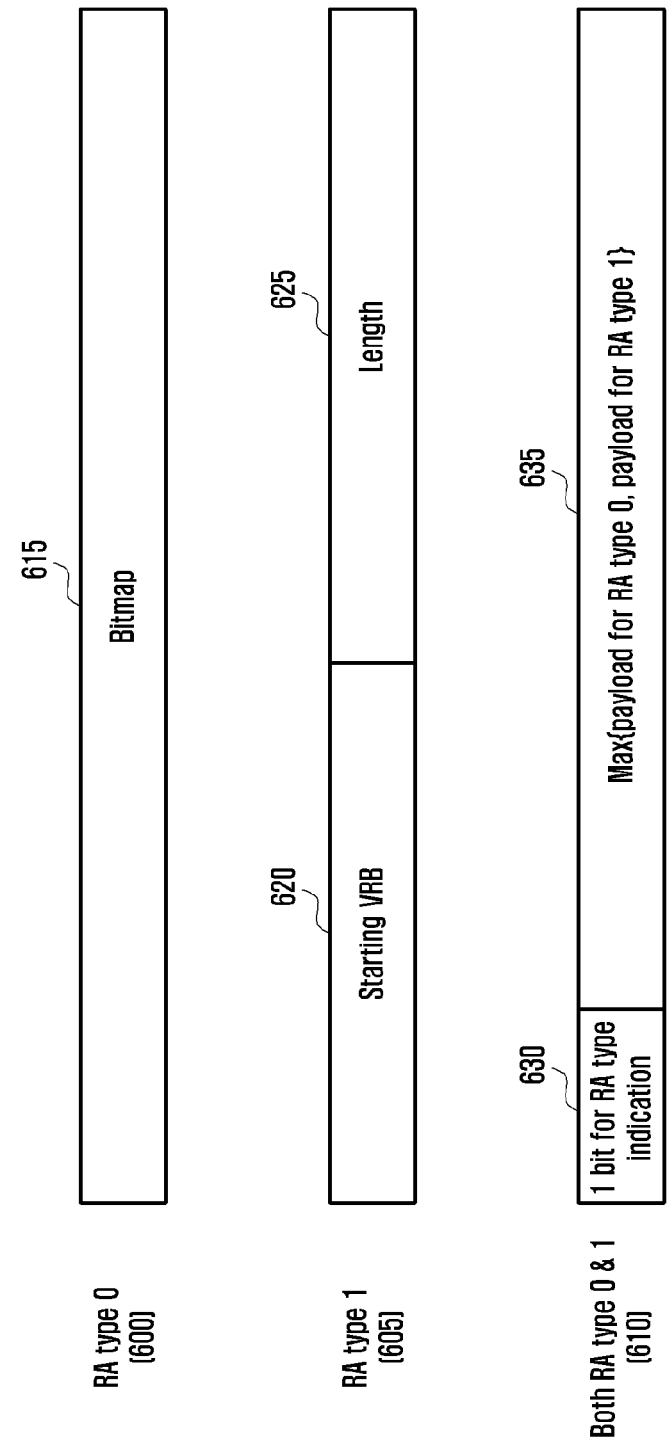
FIG. 6 is a diagram illustrating an example of frequency axis resource allocation of a physical downlink shared channel (PDSCH) in a wireless communication system according to an embodiment of the disclosure.

FIG. 6 is a diagram illustrating an example of frequency axis resource allocation of a PDSCH in a wireless communication system according to an embodiment of the disclosure.

Specifically, FIG. 6 illustrates three frequency domain resource allocations of a resource allocation type 0, 600 and type 1, 605, and a dynamic switch 610 configurable through a higher layer in NR.

With reference to FIG. 6, when the UE is configured to use only a resource allocation type 0 through higher layer signaling (600), some downlink control information (DCI) for allocating a PDSCH to the UE has a bitmap configured with the NRBG number of bits. In this case, NRBG means the number of resource block groups (RBGs) determined as illustrated in Table 11 according to a BWP size allocated by a BWP indicator and an upper layer parameter rbg-Size, and data is transmitted to the RBG displayed as 1 by the bitmap

TABLE 11

| Bandwidth Part Size | Configuration 1 | Configuration 2 |
| --- | --- | --- |
| 1-36 | 2 | 4 |
| 37-72 | 4 | 8 |
| 73-144 | 8 | 16 |
| 145-275 | 16 | 16 |

When the UE is configured to use only a resource allocation type 1 through higher layer signaling (605), some DCI for allocating a PDSCH to the UE has frequency axis resource allocation information configured with the $\lceil \log_2(N_{RB}^{DL,BWP}(N_{RB}^{DL,BWP}+1)/2) \rceil$ number of bits. Thereby, the base station may configure a starting VRB 620 and a length 625 of a frequency axis resource continuously allocated therefrom.

When the UE is configured to use both a resource allocation type 0 and a resource allocation type 1 through higher layer signaling (610), some DCI for allocating a PDSCH to the UE has frequency axis resource allocation information configured with bits of a large value 635 among a payload 615 for configuring a resource allocation type 0 and payloads 620 and 625 for configuring a resource allocation type 1. In this case, one bit may be added to a first part (MSB) of the frequency axis resource allocation information in DCI, and if the bit is 0, it may indicate that the resource allocation type 0 is used, and if the bit is 1, it may indicate that the resource allocation type 1 is used.

Hereinafter, a time domain resource allocation (TD-RA) method for a data channel in a next generation mobile communication system will be described.

The base station may configure a table for time domain resource allocation information for a PDSCH and a PUSCH to the UE through higher layer signaling (e.g., RRC signaling). For the PDSCH, a table configured with maxNrofDL-Allocations=16 entries may be configured, and for the PUSCH, a table configured with maxNrofUL-Allocations=16 entries may be configured. In an embodiment, the time domain resource allocation information may include a PDCCH-to-PDSCH slot timing (corresponding to a time interval in units of slots between an occasion in which the PDCCH is received and an occasion in which the PDSCH scheduled by the received PDCCH is transmitted, denoted by K0), PDCCH-to-PUSCH slot timing (corresponding to a time interval in units of slots between an occasion in which the PDCCH is received and an occasion in which the PUSCH scheduled by the received PDCCH is transmitted, denoted by K2), information on a position and length of a start symbol in which the PDSCH or the PUSCH is scheduled within the slot, a mapping type of PDSCH or PUSCH, and the like. For example, information such as Table 12 or 13 may be notified from the base station to the UE.

TABLE 12

PDSCH-TimeDomainResourceAllocationList information element
PDSCH-TimeDomainResourceAllocationList ::= SEQUENCE (SIZE(1..maxNrofDL-Allocations)) OF PDSCH-TimeDomainResourceAllocation
PDSCH-TimeDomainResourceAllocation ::= SEQUENCE {
k0 INTEGER(0..32) OPTIONAL, -- Need S
(PDCCH-to-PDSCH timing, slot unit)
mappingType ENUMERATED {typeA, typeB},
(PDSCH mapping type)
startSymbolAndLength INTEGER (0..127)
(Start symbol and length of PDSCH)
}

TABLE 13

PUSCH-TimeDomainResourceAllocation information element
PUSCH-TimeDomainResourceAllocationList ::= SEQUENCE (SIZE(1..maxNrofUL-Allocations)) OF PUSCH-TimeDomainResourceAllocation
PUSCH-TimeDomainResourceAllocation ::= SEQUENCE {
k2 INTEGER(0..32) OPTIONAL, -- Need S
(PDCCH-to-PUSCH timing, slot unit)
mappingType ENUMERATED {typeA, typeB},
(PUSCH mapping type)
startSymbolAndLength INTEGER (0..127)
(Start symbol and length of PUSCH)
}

The base station may notify the UE of one of entries in a table for the above-described time domain resource allocation information through L1 signaling (e.g., DCI) (e.g., may be indicated by the 'time domain resource allocation' field in DCI). The UE may obtain time domain resource allocation information on the PDSCH or PUSCH based on the DCI received from the base station.

Figure 7:
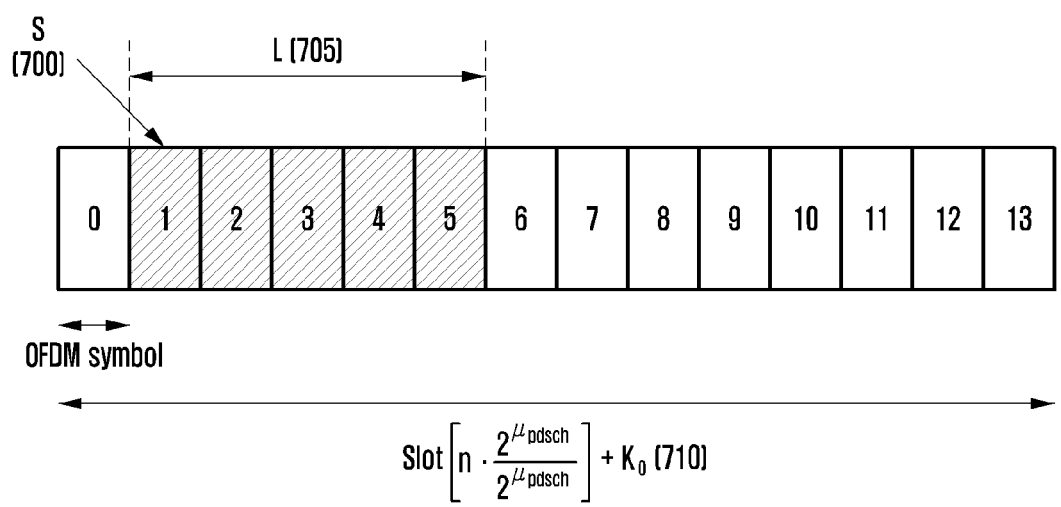
FIG. 7 is a diagram illustrating an example of time axis resource allocation of a PDSCH in a wireless communication system according to an embodiment of the disclosure.

FIG. 7 is a diagram illustrating an example of time axis resource allocation of a PDSCH in a wireless communication system according to an embodiment of the disclosure.

With reference to FIG. 7, the base station may indicate a time axis position of a PDSCH resource in a slot 710 according to an OFDM symbol start position 700 and a length 705 in one slot dynamically indicated through subcarrier spacing (SCS) ($\mu_{PDSCH}$, $\mu_{PDCCH}$), scheduling offset K0 value, and DCI of a data channel and a control channel configured using a higher layer.

Figure 8:
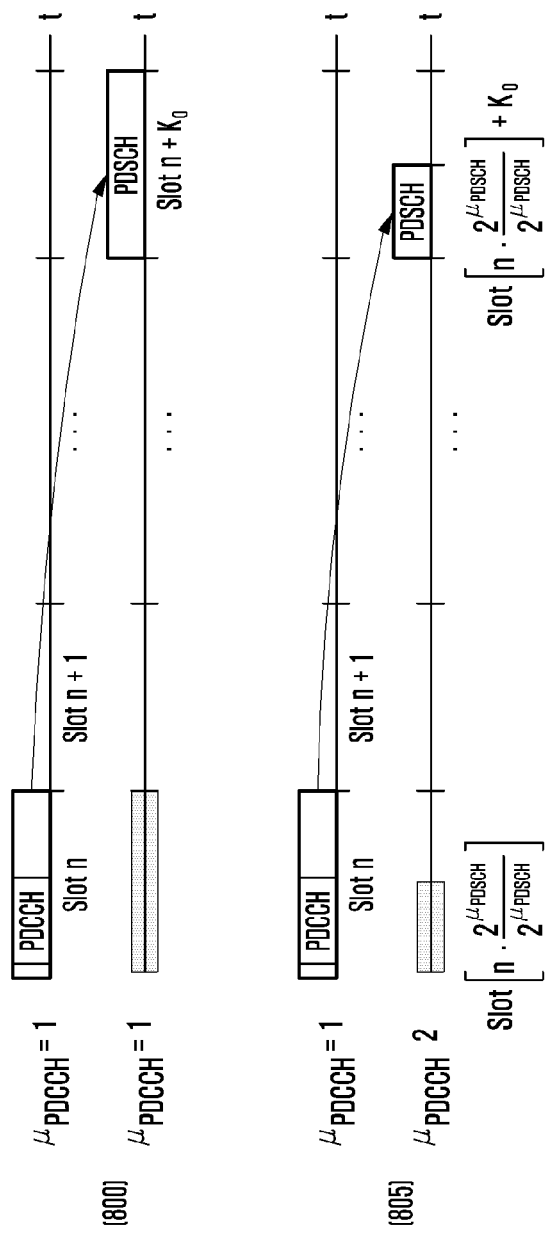
FIG. 8 is a diagram illustrating an example of time axis resource allocation according to subcarrier spacing of a data channel and a control channel in a wireless communication system according to an embodiment of the disclosure.

FIG. 8 is a diagram illustrating an example of time axis resource allocation according to subcarrier spacing of a data channel and a control channel in a wireless communication system according to an embodiment of the disclosure.

With reference to FIG. 8, when subcarrier spacing of the data channel and the control channel are the same (800, $\mu_{PDSCH}=\mu_{PDCCH}$) a slot number for data and control is the same; thus, the base station and the UE generate scheduling offset according to predetermined slot offset K0. However, when subcarrier spacing of the data channel and the control channel are different (805, $\mu_{PDSCH}\neq\mu_{PDCCH}$), slot numbers for data and control are different; thus, the base station and the UE generate scheduling offset according to predetermined slot offset K0 based on the subcarrier spacing of the PDCCH.

In LTE and NR, the UE may perform a procedure of reporting a capability supported by the UE to the corresponding base station in a state connected to a serving base station. In the following description, this is referred to as a UE capability report.

The base station may transmit a UE capability inquiry message for requesting a capability report to the UE in a connected state. The message may include a UE capability request for each radio access technology (RAT) type of the base station. The request for each RAT type may include supported frequency band combination information and the like. Further, in the case of the UE capability inquiry message, a UE capability for a plurality of RAT types may be requested through one RRC message container transmitted by the base station or the base station may include a UE capability inquiry message including a UE capability request for each RAT type multiple times and transmit the UE capability inquiry message to the UE. That is, the UE capability inquiry is repeated multiple times within one message, and the UE may configure and report a corresponding UE capability information message multiple times. In the next generation mobile communication system, a UE capability for Multi-RAT dual connectivity (MR-DC) including NR, LTE, and E-UTRA—NR dual connectivity (EN-DC) may be requested. Further, the UE capability inquiry message is generally transmitted initially after the UE is connected to the base station, but it may be requested under any conditions when the base station is needed.

After the UE capability is configured, the UE transmits a UE capability information message including the UE capability to the base station. The base station performs scheduling and transmission and reception management appropriate for the UE based on the UE capability received from the UE.

In NR, the UE transmits uplink control information (UCI) to the base station through the PUCCH. The control information may include at least one of HARQ-ACK indicating whether demodulation/decoding for a transport block (TB) received by the UE through the PDSCH is successful, a scheduling request (SR) in which the UE requests resource allocation to the base station for uplink data transmission, or channel state information (CSI), which is information for reporting a channel state of the UE.

The PUCCH resource may be largely divided into a long PUCCH and a short PUCCH according to a length of an allocated symbol. In NR, the long PUCCH has a length of 4 symbols or more in a slot, and the short PUCCH has a length of 2 symbols or less in a slot.

When the long PUCCH is described in more detail, the long PUCCH may be used for the purpose of improving uplink cell coverage; thus, it may be transmitted in a DFT-S-OFDM scheme, which is single carrier transmission rather than OFDM transmission. The long PUCCH supports transport formats such as a PUCCH format 1, a PUCCH format 3, and a PUCCH format 4 according to the number of supportable control information bits and whether UE multiplexing is supported through Pre-DFT OCC support in the front end of the IFFT.

First, the PUCCH format 1 is a DFT-S-OFDM-based long PUCCH format capable of supporting control information up to 2 bits and uses a frequency resource of 1 RB. The control information may be configured with a combination or each of HARQ-ACK and SR. In the PUCCH format 1, an OFDM symbol including a DMRS, which is a demodulation reference signal (or reference signal), and an OFDM symbol including UCI are repeatedly configured.

For example, when the number of transmission symbols in the PUCCH format 1 is 8, it is sequentially configured with a DMRS symbol, a UCI symbol, a DMRS symbol, a UCI symbol, a DMRS symbol, a UCI symbol, a DMRS symbol, and a UCI symbols from the first start symbol of 8 symbols. The DMRS symbol is spread using an orthogonal code (or orthogonal sequence or spreading code, wi(m)) on the time axis in a sequence corresponding to a length of 1 RB on the frequency axis within one OFDM symbol and is transmitted after IFFT is performed.

The UCI symbol is generated as follows. The UE generates d(0) by modulating 1-bit control information by BPSK and 2-bit control information by QPSK, scrambles the generated d(0) by multiplying the generated d(0) by a sequence corresponding to a length of 1 RB on the frequency axis, spreads the scrambled sequence using an orthogonal code (or orthogonal sequence or spreading code, wi(m)) on the time axis, and transmits d(0) after performing IFFT.

The UE generates the sequence based on a group hopping or sequence hopping configuration scheduled to a higher signal from the base station and the configured ID, and cyclic shifts the generated sequence with an initial cyclic shift (CS) value configured to the higher signal to generate a sequence corresponding to a length of 1 RB.

wi(m) is determined as $$w_i(m) = e^{\frac{j2\pi\phi(m)}{N_{SF}}}$$

when a length NSF of a spreading code is given and specifically, it is given as illustrated in Table 14. i means an index of the spreading code itself, and m means an index of elements of the spreading code. Here, numbers in [ ] in Table 14 mean φ(m), for example, when the length of the spreading code is 2 and the index i=0 of the configured spreading code, the spreading code wi(m) becomes $w_i(0)=e^{j2\pi\cdot 0/N_{SF}}=1$, $w_i(1)=e^{j2\pi\cdot 0/N_{SF}}=1$, so that wi(m)=[1 1].

TABLE 14

| $N_{SF}$ | φ(m) | | | | | | |
|---|---|---|---|---|---|---|---|
| | i = 0 | i = 1 | i = 2 | i = 3 | i = 4 | i = 5 | i = 6 |
| 1 | [0] | — | — | — | — | — | — |
| 2 | [0 0] | [0 1] | — | — | — | — | — |
| 3 | [0 0 0] | [0 1 2] | [0 2 1] | — | — | — | — |
| 4 | [0 0 0 0] | [0 2 0 2] | [0 0 2 2] | [0 2 2 0] | — | — | — |
| 5 | [0 0 0 0 0] | [0 1 2 3 4] | [0 2 4 1 3] | [0 3 1 4 2] | [0 4 3 2 1] | — | — |
| 6 | [0 0 0 0 0 0] | [0 1 2 3 4 5] | [0 2 4 0 2 4] | [0 3 0 3 0 3] | [0 4 2 0 4 2] | [0 5 4 3 2 1] | — |
| 7 | [0 0 0 0 0 0 0] | [0 1 2 3 4 5 6] | [0 2 4 6 1 3 5] | [0 3 6 2 5 1 4] | [0 4 1 5 2 6 3] | [0 5 3 1 6 4 2] | [0 6 5 4 3 2 1] |

Next, a PUCCH format 3 is a DFT-S-OFDM-based long PUCCH format capable of supporting control information more a 2 bits, and the number of used RBs may be configured through a higher layer. The control information may be configured with a combination or each of HARQ-ACK, SR, and CSI. In the PUCCH format 3, a DMRS symbol position is illustrated in Table 15 according to whether frequency hopping within the slot and whether additional DMRS symbols are configured.

TABLE 15

| | DMRS position within PUCCH format 3/4 transmission | | | |
|---|---|---|---|---|
| PUCCH | Additional DMRS is not configured | | Additional DMRS is configured | |
| format 3/4 transmission length | Frequency hopping is not configured | Frequency hopping is configured | Frequency hopping is not configured | Frequency hopping is configured |
| 4 | 1 | 0, 2 | 1 | 0, 2 |
| 5 | 0, 3 | | 0, 3 | |
| 6 | 1, 4 | | 1, 4 | |
| 7 | 1, 4 | | 1, 4 | |
| 8 | 1, 5 | | 1, 5 | |
| 9 | 1, 6 | | 1, 6 | |
| 10 | 2, 7 | | 1, 3, 6, 8 | |
| 11 | 2, 7 | | 1, 3, 6, 9 | |
| 12 | 2, 8 | | 1, 4, 7, 10 | |
| 13 | 2, 9 | | 1, 4, 7, 11 | |
| 14 | 3, 10 | | 1, 5, 8, 12 | |

When the number of transmission symbols in a PUCCH format 3 is 8, the DMRS is transmitted to a first symbol and a fifth symbol by starting a first start symbol of 8 symbols from 0. The above table is applied to the DMRS symbol position of a PUCCH format 4 in the same manner.

Next, the PUCCH format 4 is a DFT-S-OFDM-based long PUCCH format capable of supporting control information more than 2 bits, and uses frequency resources of 1 RB. The control information may be configured with a combination or each of HARQ-ACK, SR, and CSI. The difference between the PUCCH format 4 and the PUCCH format 3 is that in the case of the PUCCH format 4, the PUCCH format 4 of multiple UEs may be multiplexed within one RB. It is possible to multiplex a PUCCH format 4 of a plurality of UEs by applying Pre-DFT OCC to control information in the front end of the IFFT. However, the number of transmittable control information symbols of one UE is reduced according to the number of multiplexed UEs. The number of multiplexable UEs, that is, the number of different available OCCs may be 2 or 4, and the number of OCCs and an OCC index to be applied may be configured through a higher layer.

Hereinafter, a short PUCCH will be described. The short PUCCH may be transmitted in both a downlink centric slot and an uplink centric slot, and in general, the short PUCCH is transmitted in a last symbol of the slot or an OFDM symbol at the rear (e.g., the last OFDM symbol, the second to last OFDM symbol, or the last 2 OFDM symbols). The short PUCCH may be transmitted at any position within the slot. The short PUCCH may be transmitted using one OFDM symbol or two OFDM symbols. The short PUCCH may be used for reducing delay time compared to a long PUCCH in a situation in which uplink cell coverage is good, and is transmitted in a CP-OFDM scheme.

The short PUCCH supports transport formats such as a PUCCH format 0 and a PUCCH format 2 according to the number of supportable control information bits. First, the PUCCH format 0 is a short PUCCH format capable of supporting control information up to 2 bits and uses a frequency resource of 1 RB. The control information may be configured with a combination or each of HARQ-ACK and SR. The PUCCH format 0 has a structure that transmits only a sequence mapped to 12 subcarriers on the frequency axis within one OFDM symbol without transmitting a DMRS. The UE generates a sequence based on a group hopping or sequence hopping configuration and a configured ID configured as an upper signal from the base station, and cyclically shifts the generated sequence with a final CS value obtained by adding another CS value according to whether an indicated initial cyclic shift (CS) value is ACK or NACK to map the generated sequence to 12 subcarriers and transmit the generated sequence.

For example, when HARQ-ACK is 1 bit, as illustrated in Table 16, if the initial CS value is ACK, 6 is added to the initial CS value to generate a final CS, and if the initial CS value is NACK, 0 is added to the initial CS to generate a final CS. The CS value 0 for NACK and the CS value 6 for ACK are defined to the specification, and the UE always generates a PUCCH format 0 according to the value and transmits 1-bit HARQ-ACK.

TABLE 16

| 1-bit HARQ-ACK | NACK | ACK |
|---|---|---|
| Final CS | (Initial CS + 0) mod 12 = Initial CS | (Initial CS + 6) mod 12 |

For example, when HARQ-ACK is 2 bits, if the initial CS value is (NACK, NACK), as in Table 17, 0 is added to the initial CS value, if the initial CS value is (NACK, ACK), 3 is added to the initial CS value, if the initial CS value is (ACK, ACK), 6 is added to the initial CS value, and if the initial CS value is (ACK, NACK), 9 is added to the initial CS value. A CS value of 0 for (NACK, NACK), a CS value of 3 for (NACK, ACK), a CS value of 6 for (ACK, ACK), and a CS value of 9 for (ACK, NACK) are defined to a specification, and the UE always generates a PUCCH format 0 according to the above value and transmits a 2-bit HARQ-ACK.

When the final CS value exceeds 12 by the CS value added to the initial CS value according to ACK or NACK, a length of the sequence is 12; thus, modulo 12 is applied to the final CS value.

TABLE 17

| 2-bit HARQ-ACK | NACK, NACK | NACK, ACK | ACK, ACK | ACK, NACK |
|---|---|---|---|---|
| final CS | (initial CS + 0) mod 12 = initial CS | (initial CS + 3) mod 12 | (initial CS + 6) mod 12 | (initial CS + 9) mod 12 |

Next, the PUCCH format 2 is a short PUCCH format supporting control information more than 2 bits, and the number of used RBs may be configured through a higher layer. The control information may be configured with a combination or each of HARQ-ACK, SR, and CSI. In the PUCCH format 2, a position of a subcarrier in which a DMRS is transmitted within one OFDM symbol is fixed to a subcarrier having indices of #1, #4, #7, and #10 when an index of a first subcarrier is #0. Control information is mapped to the remaining subcarriers except for a subcarrier in which the DMRS is positioned through a modulation process after channel encoding.

In summary, configurable values and ranges for each of the above-described PUCCH formats may be summarized as illustrated in Table 18. In the case in which the value does not need to be configured in the following table, it is indicated as N.A.

perform frequency hopping in PUCCH transmission in different slots, the UE starts PUCCH transmission from a first PRB index configured through startingPRB, which is higher layer signaling in an even-numbered slot, and starts PUCCH transmission from a second PRB index configured through secondHopPRB, which is higher layer signaling in an odd-numbered slot.

TABLE 18

|  |  | PUCCH format 0 | PUCCH format 1 | PUCCH format 2 | PUCCH format 3 | PUCCH format 4 |
| --- | --- | --- | --- | --- | --- | --- |
| Starting symbol | Configurability | ○ | ○ | ○ | ○ | ○ |
|  | Value range | 0-13 | 0-10 | 0-13 | 0-10 | 0-10 |
| Number of symbols in a slot | Configurability | ○ | ○ | ○ | ○ | ○ |
|  | Value range | 1, 2 | 4-14 | 1, 2 | 4-14 | 4-14 |
| Index for identifying starting PRB | Configurability | ○ | ○ | ○ | ○ | ○ |
|  | Value range | 0-274 | 0-274 | 0-274 | 0-274 | 0-274 |
| Number of PRBs | Configurability | N.A. | N.A. | ○ | ○ | N.A. |
|  | Value range | N.A.(Default is 1) | N.A.(Default is 1) | 1-16 | 1-6, 8-10, 12, 15, 16 | N.A.(Default is 1) |
| Enabling a FH | Configurability | ○ | ○ | ○ | ○ | ○ |
|  | Value range | On/Off (only for 2 symbol) | On/Off | On/Off (only for 2 symbol) | On/Off | On/Off |
| Frequency resource of $2^{nd}$ hop if FH is enabled | Configurability | ○ | ○ | ○ | ○ | ○ |
|  | Value range | 0-274 | 0-274 | 0-274 | 0-274 | 0-274 |
| Index of initial cyclic shift | Configurability | ○ | ○ | N.A. | N.A. | N.A. |
|  | Value range | 0-11 | 0-11 | N.A. | N.A. | N.A. |
| Index of time-domain OCC | Configurability | N.A. | ○ | N.A. | N.A. | N.A. |
|  | Value range | N.A. | 0-6 | N.A. | N.A. | N.A. |
| Length of Pre-DFT OCC) | Configurability | N.A. | N.A. | N.A. | N.A. | ○ |
|  | Value range | N.A. | N.A. | N.A. | N.A. | 2, 4 |
| Index of Pre-DFT OCC | Configurability | N.A. | N.A. | N.A. | N.A. | ○ |
|  | Value range | N.A. | N.A. | N.A. | N.A. | 0, 1, 2, 3 |

For uplink coverage enhancement, multi-slot repetition may be supported to PUCCH formats 1, 3, and 4, and PUCCH repetition may be configured for each PUCCH format.

The UE repeatedly transmits a PUCCH including UCI as many as the number of slots configured through nrofSlots, which is higher layer signaling. For repeated PUCCH transmission, PUCCH transmission of each slot is performed using the same number of consecutive symbols, and the number of corresponding consecutive symbols may be configured through nrofSymbols in PUCCH-format1, PUCCH-format3, or PUCCH-format4, which is higher layer signaling. For repeated PUCCH transmission, PUCCH transmission of each slot is performed using the same start symbol, and the corresponding start symbol may be configured through the startingSymbolIndex in PUCCH-format1, PUCCH-format3, or PUCCH-format4, which is higher layer signaling.

For repeated PUCCH transmission, when the UE is configured to perform frequency hopping in PUCCH transmission in different slots, the UE performs frequency hopping in units of slots. Further, when the UE is configured to Additionally, when the UE is configured to perform frequency hopping in PUCCH transmission in different slots, an index of a slot in which first PUCCH transmission is indicated to the UE is 0, and during the total number of configured repeated PUCCH transmissions, a value of the number of repeated PUCCH transmissions is increased regardless of whether PUCCH transmission is performed in each slot. When the UE is configured to perform frequency hopping in PUCCH transmission in different slots, the UE does not expect that frequency hopping is configured in a slot during PUCCH transmission.

When the UE is not configured to perform frequency hopping in PUCCH transmission in different slots and is configured to perform frequency hopping in a slot, the first and second PRB indexes are equally applied in the slot.

Hereinafter, the PUCCH resource configuration of the base station or the UE will be described. The base station may configure PUCCH resources for each BWP through a higher layer for a specific UE. The corresponding configuration may be the same as that illustrated in Table 19.

TABLE 19

```
PUCCH-Config ::= SEQUENCE {
    resourceSetToAddModList SEQUENCE (SIZE (1..maxNrofPUCCH-ResourceSets)) OF
PUCCH-ResourceSet    OPTIONAL, -- Need N
resourceSetToReleaseList           SEQUENCE (SIZE (1..maxNrofPUCCH-
Resource Sets)) OF PUCCH-ResourceSetId OPTIONAL, -- Need N
resourceToAddModList               SEQUENCE (SIZE (1..maxNrofPUCCH-
Resources)) OF PUCCH-Resource      OPTIONAL, -- Need N
resourceToReleaseList              SEQUENCE (SIZE (1..maxNrofPUCCH-
Resources)) OF PUCCH-ResourceId    OPTIONAL, -- Need N
format1                            SetupRelease { PUCCH-FormatConfig }
OPTIONAL, -- Need M
format2                            SetupRelease { PUCCH-FormatConfig }
OPTIONAL, -- Need M
format3                            SetupRelease { PUCCH-FormatConfig }
OPTIONAL, -- Need M
format4                            SetupRelease { PUCCH-FormatConfig }
OPTIONAL, -- Need M
schedulingRequestResourceToAddModList SEQUENCE (SIZE (1..maxNrofSR-Resources)) OF
SchedulingRequestResourceConfig
OPTIONAL, -- Need N
schedulingRequestResourceToReleaseList SEQUENCE (SIZE (1..maxNrofSR-Resources)) OF
SchedulingRequestResourceId
OPTIONAL, -- Need N
multi-CSI-PUCCH-ResourceList SEQUENCE (SIZE (1..2)) OF PUCCH-ResourceId
OPTIONAL, -- Need M
dl-DataToUL-ACK SEQUENCE (SIZE (1..8)) OF INTEGER (0..15) OPTIONAL, -- Need M
spatialRelationInfoToAddModList SEQUENCE (SIZE (1..maxNrofSpatialRelationInfos)) OF
PUCCH-SpatialRelationInfo
OPTIONAL, -- Need N
spatialRelationInfoToReleaseList SEQUENCE (SIZE (1..maxNrofSpatialRelationInfos)) OF
PUCCH-SpatialRelationInfoId
OPTIONAL, -- Need N
pucch-PowerControl PUCCH-PowerControl OPTIONAL, -- Need M
...
}
```

According to Table 19, one or more PUCCH resource sets may be configured in the PUCCH resource configuration for a specific BWP, and a maximum payload value for UCI transmission may be configured to some of the PUCCH resource sets. One or more PUCCH resources may belong to each PUCCH resource set, and each PUCCH resource may belong to one of the above-described PUCCH formats.

With respect to the PUCCH resource set, a maximum payload value of a first PUCCH resource set may be fixed to 2 bits; thus, the corresponding value may not be separately configured through a higher layer or the like. When the remaining PUCCH resource set is configured, an index of the corresponding PUCCH resource set may be configured in ascending order according to the maximum payload value, and the maximum payload value may not be configured to the last PUCCH resource set. An upper layer configuration for the PUCCH resource set may be the same as that d in Table 20.

TABLE 20

```
PUCCH-ResourceSet ::= SEQUENCE {
pucch-ResourceSetId PUCCH-ResourceSetId,
resourceList SEQUENCE (SIZE (1..maxNrofPUCCH-ResourcesPerSet))
OF PUCCH-ResourceId,
maxPayloadSize INTEGER (4..256) OPTIONAL -- Need R
}
```

The resourceList parameter of Table 20 may include IDs of PUCCH resources belonging to the PUCCH resource set.

Upon initial access or when the PUCCH resource set is not configured, the PUCCH resource set may be used, as illustrated in Table 21 and which is configured with a plurality of cell-specific PUCCH resources in the initial BWP. A PUCCH resource to be used for initial access in the PUCCH resource set may be indicated through SIB 1

TABLE 21

| Index | PUCCH format | First symbol | Number of symbols | PRB offset $RB_{BWP}^{offset}$ | Set of initial CS indexes |
|---|---|---|---|---|---|
| 0 | 0 | 12 | 2 | 0 | {0, 3} |
| 1 | 0 | 12 | 2 | 0 | {0, 4, 8} |
| 2 | 0 | 12 | 2 | 3 | {0, 4, 8} |
| 3 | 1 | 10 | 4 | 0 | {0, 6} |
| 4 | 1 | 10 | 4 | 0 | {0, 3, 6, 9} |
| 5 | 1 | 10 | 4 | 2 | {0, 3, 6, 9} |
| 6 | 1 | 10 | 4 | 4 | {0, 3, 6, 9} |
| 7 | 1 | 4 | 10 | 0 | {0, 6} |
| 8 | 1 | 4 | 10 | 0 | {0, 3, 6, 9} |
| 9 | 1 | 4 | 10 | 2 | {0, 3, 6, 9} |
| 10 | 1 | 4 | 10 | 4 | {0, 3, 6, 9} |
| 11 | 1 | 0 | 14 | 0 | {0, 6} |
| 12 | 1 | 0 | 14 | 0 | {0, 3, 6, 9} |
| 13 | 1 | 0 | 14 | 2 | {0, 3, 6, 9} |
| 14 | 1 | 0 | 14 | 4 | {0, 3, 6, 9} |
| 15 | 1 | 0 | 14 | $\lfloor N_{BWP}^{size}/4 \rfloor$ | {0, 3, 6, 9} |

A maximum payload of each PUCCH resource included in the PUCCH resource set may be 2 bits in the case of a PUCCH format 0 or 1, and in the case of the remaining formats, the maximum payload may be determined by a symbol length, the number of PRBs, and a maximum code rate. The above-described symbol length and number of PRBs may be configured for each PUCCH resource, and the maximum code rate may be configured for each PUCCH format.

Hereinafter, a PUCCH resource selection for UCI transmission will be described. In the case of SR transmission, the PUCCH resource for the SR corresponding to the schedulingRequestID may be configured through a higher layer, as illustrated in Table 22. The PUCCH resource may be a resource belonging to the PUCCH format 0 or PUCCH format 1.

TABLE 22

```
SchedulingRequestResourceConfig ::= SEQUENCE {
    schedulingRequestResourceId SchedulingRequestResourceId,
    schedulingRequestID SchedulingRequestId,
    periodicityAndOffset CHOICE {
        sym2 NULL,
        sym6or7 NULL,
        sl1 NULL, -- Recurs in every slot
        sl2 INTEGER (0..1),
        sl4 INTEGER (0..3),
        sl5 INTEGER (0..4),
        sl8 INTEGER (0..7),
        sl10 INTEGER (0..9),
        sl16 INTEGER (0..15),
        sl20 INTEGER (0..19),
        sl40 INTEGER (0..39),
        sl80 INTEGER (0..79),
        sl160 INTEGER (0..159),
        sl320 INTEGER (0..319),
        sl640 INTEGER (0..639)
    } OPTIONAL, -- Need M
    resource PUCCH-ResourceId OPTIONAL -- Need M
}
```

A transmission period and offset of the configured PUCCH resource are configured through the periodicityAndOffset parameter of Table 22. When there is uplink data to be transmitted by the UE at an occasion corresponding to the configured period and offset, the corresponding PUCCH resource is transmitted, otherwise, the corresponding PUCCH resource may not be transmitted.

In the case of CSI transmission, a PUCCH resource to transmit a periodic or semi-persistent CSI report through a PUCCH may be configured to the pucch-CSI-ResourceList parameter through higher signaling, as illustrated in Table 23. The parameter includes a list of PUCCH resources for each BWP for a cell or CC to transmit a corresponding CSI report. The PUCCH resource may be a resource belonging to a PUCCH format 2, a PUCCH format 3, or a PUCCH format 4.

TABLE 23

```
CSI-ReportConfig ::= SEQUENCE {
reportConfigId CSI-ReportConfigId,
carrier ServCellIndex OPTIONAL, -- Need S
resourcesForChannelMeasurement CSI-ResourceConfigId,
csi-IM-ResourcesForInterference CSI-ResourceConfigId OPTIONAL, -- Need R
nzp-CSI-RS-ResourcesForInterference CSI-ResourceConfigId OPTIONAL, -- Need R
reportConfigType CHOICE {
periodic                         SEQUENCE {
reportSlotConfig CSI-ReportPeriodicityAndOffset,
pucch-CSI-ResourceList SEQUENCE (SIZE (1..maxNrofBWPs)) OF PUCCH-CSI-Resource
},
semiPersistentOnPUCCH SEQUENCE {
reportSlotConfig CSI-ReportPeriodicityAndOffset,
pucch-CSI-ResourceList SEQUENCE (SIZE (1..maxNrofBWPs)) OF PUCCH-CSI-Resource
},
semiPersistentOnPUSCH SEQUENCE {
reportSlotConfig ENUMERATED {sl5, sl10, sl20, sl40, sl80, sl160, sl320},
reportSlotOffsetList SEQUENCE (SIZE (1.. maxNrofUL-Allocations)) OF INTEGER(0..32),
p0alpha P0-PUSCH-AlphaSetId
},
aperiodic SEQUENCE {
reportSlotOffsetList SEQUENCE (SIZE (1..maxNrofUL-Allocations)) OF INTEGER(0..32)
}
},
```

A transmission period and offset of the PUCCH resource are configured through reportSlotConfig of Table 23.

In the case of HARQ-ACK transmission, a resource set of PUCCH resources to be transmitted is first selected according to a payload of the UCI including the corresponding HARQ-ACK. That is, a PUCCH resource set having a minimum payload that is not smaller than the UCI payload is selected. Next, a PUCCH resource in the PUCCH resource set may be selected through a PUCCH resource indicator (PRI) in the DCI scheduling a TB corresponding to the HARQ-ACK, and the PM may be a PUCCH resource indicator specified in Table 5 or 6. The relationship between the PM configured through upper signaling and the PUCCH resource selected from the PUCCH resource set may be the same as that illustrated in Table 24.

TABLE 24

| PUCCH resource indicator | PUCCH resource |
|---|---|
| 000 | $1^{st}$ PUCCH resource provided by pucch-ResourceId obtained from the $1^{st}$ value of resourceList |
| 001 | $2^{nd}$ PUCCH resource provided by pucch-ResourceId obtained from the $2^{nd}$ value of resourceList |
| 010 | $3^{rd}$ PUCCH resource provided by pucch-ResourceId obtained from the $3^{rd}$ value of resourceList |
| 011 | $4^{th}$ PUCCH resource provided by pucch-ResourceId obtained from the $4^{th}$ value of resourceList |
| 100 | $5^{th}$ PUCCH resource provided by pucch-ResourceId obtained from the $5^{th}$ value of resourceList |
| 101 | $6^{th}$ PUCCH resource provided by pucch-ResourceId obtained from the $6^{th}$ value of resourceList |
| 110 | $7^{th}$ PUCCH resource provided by pucch-ResourceId obtained from the $7^{th}$ value of resourceList |
| 111 | $8^{th}$ PUCCH resource provided by pucch-ResourceId obtained from the $8^{th}$ value of resourceList |

When the number of PUCCH resources in the selected PUCCH resource set is greater than 8, the PUCCH resource may be selected by the following equation.

$$r_{PUCCH} = \begin{cases} \left\lfloor \dfrac{n_{CCE,p} \cdot \lceil R_{PUCCH}/8 \rceil}{N_{CCE,p}} \right\rfloor + \Delta_{PRI} \cdot \left\lceil \dfrac{R_{PUCCH}}{8} \right\rceil & \text{if } \Delta_{PRI} < R_{PUCCH} \bmod 8 \\ \left\lfloor \dfrac{n_{CCE,p} \cdot \lfloor R_{PUCCH}/8 \rfloor}{N_{CCE,p}} \right\rfloor + \Delta_{PRI} \cdot \left\lfloor \dfrac{R_{PUCCH}}{8} \right\rfloor + R_{PUCCH} \bmod 8 & \text{if } \Delta_{PRI} \geq R_{PUCCH} \bmod 8 \end{cases}$$ [Equation 1]

In the above equation, rPUCCH indicates an index of the selected PUCCH resource in the PUCCH resource set, RPUCCH indicates the number of PUCCH resources belonging to the PUCCH resource set, ΔPRI indicates a PRI value, NCCE,p indicates the number of total CCEs in a CORESET p to which the received DCI belongs, and nCCE,p indicates a first CCE index for the received DCI.

An occasion at which the corresponding PUCCH resource is transmitted is after a K1 slot from TB transmission corresponding to the corresponding HARQ-ACK. A candidate of a K1 value is configured to a higher layer, and more specifically, it is configured to the dl-DataToUL-ACK parameter in PUCCH-Config specified in Table 19. A K1 value of one of these candidates may be selected by a PDSCH-to-HARQ feedback timing indicator in the DCI scheduling the TB, and the value may be a value specified in Table 5 or 6. A unit of the K1 value may be a slot unit or a subslot unit. Here, the subslot is a unit having a length smaller than that of the slot, and one or a plurality of symbols may constitute one subslot.

Hereinafter, a case in which two or more PUCCH resources are positioned in one slot will be described. The UE may transmit UCI through one or two PUCCH resources in one slot or subslot, and when UCI is transmitted through two PUCCH resources in one slot/subslot, i) each PUCCH resource does not overlap in units of symbols, ii) at least one PUCCH resource may be a short PUCCH. The UE may not expect to transmit a plurality of PUCCH resources for HARQ-ACK transmission within one slot.

Hereinafter, a PUCCH transmission procedure when two or more PUCCH resources overlap will be described. When two or more PUCCH resources overlap, one of the overlapped PUCCH resources or a new PUCCH resource may be selected according to the above-described condition, that is, the condition that transmitted PUCCH resources should not overlap in units of symbols. Further, all UCI payloads transmitted through overlapped PUCCH resources may be multiplexed and transmitted, or some UCI payloads may be dropped.

First, a case (case 1) in which multi-slot repetition is not configured to the PUCCH resource and a case (case 2) in which multi-slot repetition is configured will be described.

A case of overlapping PUCCH resources with respect to the case 1 is classified into a case 1-1) in which two or more PUCCH resources for HARQ-ACK transmission overlap and a case 1-2) of the remaining cases.

Figure 9:
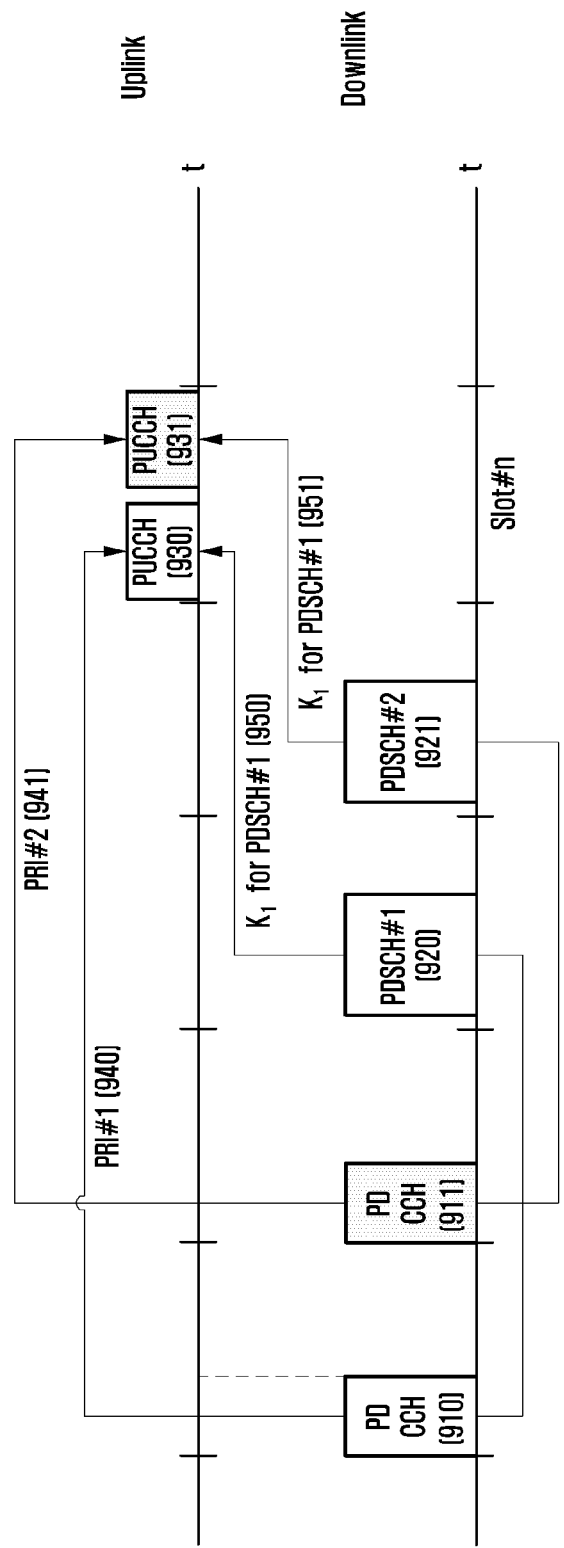
FIG. 9 is a diagram illustrating an example of a case in which a plurality of PUCCH resources for HARQ-ACK transmission for a PDSCH overlap when multi-slot repetition is not configured according to an embodiment of the disclosure.

A case corresponding to the case 1-1) is illustrated in FIG. 9.

FIG. 9 is a diagram illustrating an example in which a plurality of PUCCH resources for HARQ-ACK transmission for a PDSCH overlap when multi-slot repetition is not configured according to an embodiment of the disclosure. With reference to FIG. 9, with respect to two or more different PDCCHs 910 and 911 for scheduling a PDSCH, when transmission slots of PUCCH resources corresponding to the respective PDCCHs are the same, it may be regarded that the corresponding PUCCH resources overlap each other. That is, when uplink slots corresponding to K1 values 950 and 951 indicated by a plurality of PDCCHs are the same, it may be regarded that PUCCH resources corresponding to the PDCCHs overlap each other.

In this case, among PUCCH resources indicated by PRIs 940 and 941 in the PDCCH, only a PUCCH resource 931 selected based on the PRI 941 corresponding to the PDCCH 911 transmitted at the latest occasion is selected and HARQ-ACK information is transmitted on the PUCCH resource. Accordingly, HARQ-ACK information on a PDSCH 921 through the selected PUCCH resource 931 and HARQ-ACK information for another PUCCH 930 overlapped with the PUCCH resource 931 are all encoded by a predefined HARQ-ACK codebook and then transmitted.

Hereinafter, a case in which a PUCCH resource for HARQ-ACK transmission and a PUCCH resource for SR and/or CSI transmission corresponding to case 1-2) overlap or a case in which a plurality of PUCCH resources for SR and/or CSI transmission overlap will be described. In the above case, when a plurality of PUCCH resources transmitted from the same slot overlap by one symbol or more on the time axis, it is defined that the corresponding PUCCH resources overlap, and whether UCIs in these resources are multiplexed may be summarized, as illustrated in Table 25.

TABLE 25

|  | SR | HARQ-ACK | CSI |
| --- | --- | --- | --- |
| SR | — | Case 1-2-1 (multiplex or not depending on PUCCH format) | Always multiplex |
| HARQ-ACK |  | Always multiplex (HARQ-ACK codebook( | Case 1-2-2 (multiplex or not by higher layer) |
| CSI | Always multiplex | Case 1-2-2 | Case 1-2-2 |

According to the above table, when overlap occurs between PUCCH resources in which HARQ-ACK is transmitted or when overlap occurs between PUCCHs in which SR and CSI are transmitted, these UCIs are always multiplexed.

When the respective PUCCH resources in which the SR and HARQ-ACK are transmitted overlap, that is, in case 1-2-1, whether UCI multiplexing is divided according to a format of the PUCCH resource as follows.

SR on PUCCH format 0+HARQ-ACK on PUCCH format 1: SR is dropped and only HARQ-ACK is transmitted For the remaining cases: both SR and HARQ-ACK are multiplexed Further, in the remaining cases corresponding to case 1-2-2, that is, when overlap occurs between PUCCH resources in which HARQ-ACK and CSI are transmitted or when overlap occurs between a plurality of PUCCH resources in which CSI is transmitted, whether these UCIs are multiplexed may follow an upper layer configuration. Further, a configuration on whether to multiplex between HARQ-ACK and CSI and on whether to multiplex between a plurality of CSIs may be made independently.

For example, whether to multiplex between HARQ-ACK and CSI may be configured through simultaneousHARQ-ACK-CSI parameters for each of PUCCH formats 2, 3, and 4, and the corresponding parameters may all be configured to the same value for the PUCCH format. When it is configured not to multiplex through the parameter, only HARQ-ACK is transmitted and overlapped CSI may be dropped. Further, whether to multiplex between multiple CSIs may be configured through a multi-CSI-PUCCH-ResourceList parameter in PUCCH-Config. That is, when the multi-CSI-PUCCH-ResourceList parameter is configured, inter-CSI multiplexing may be performed. Otherwise, according to the inter-CSI priority, only a PUCCH corresponding to the CSI having a high priority may be transmitted.

When UCI multiplexing is performed, as described above, a multiplexing method and a method of selecting a PUCCH resource to transmit a corresponding UCI resource may differ according to overlapped UCI information and a format of the PUCCH resource, which may be summarized, as illustrated in Table 26.

TABLE 26

|  |  | SR | HARQ-ACK |  | CSI |
|---|---|---|---|---|---|
|  |  | (format 0/1) | format 1 | format 0, 2, 3, 4 | (format 2, 3, 4) |
| SR (format 0/1) |  | — | option 1 | option 2 | option 3 |
| HARQ-ACK | format 1 | option 1 | option 4 | option 4 | option 5 (grant-based) option 6 (SPS) |
|  | format 0, 2, 3, 4 | option 2 | option 4 | option 4 | option 5 (grant-based) option 6 (SPS) |
| CSI (format 2, 3, 4) |  | option 3 | option 5 (grant-based) option 6 (SPS) | option 5 (grant-based) option 6 (SPS) | option 7 |

Each option in the table is as follows.

Option 1: The UE varies the PUCCH resource selection according to an SR value of the SR PUCCH resource overlapped with the HARQ-ACK PUCCH resource. That is, if the SR value is positive, the SR PUCCH resource is selected, and if the SR value is negative, the HARQ-ACK PUCCH resource is selected. The UE transmits HARQ-ACK information to the selected PUCCH resource.

Option 2: The UE multiplexes and transmits HARQ-ACK information and SR information to a PUCCH resource for HARQ-ACK transmission.

Option 3: The UE multiplexes and transmits SR information and CSI to a PUCCH resource for CSI transmission.

Option 4: It corresponds to PUCCH resource transmission for overlap between HARQ-ACK and follows the above-described operation.

Option 5: When the PUCCH resource for HARQ-ACK corresponding to the PDSCH scheduled to the PDCCH and the PUCCH resource for CSI transmission overlap, and multiplexing between HARQ-ACK and CSI is configured to a higher layer, the UE multiplexes and transmits HARQ-ACK information and CSI information to the PUCCH resource for HARQ-ACK.

Option 6: When a PUCCH resource for HARQ-ACK corresponding to a semi-persistent scheduling (SPS) PDSCH and a PUCCH resource for CSI transmission overlap, and when multiplexing between HARQ-ACK and CSI is configured to a higher layer, the UE multiplexes and transmits HARQ-ACK information and CSI information to the PUCCH resource for CSI transmission.

When the PUCCH resource list, that is, multi-CSI-PUCCH-ResourceList for multiplexing is configured to the upper layer, the UE selects one resource having a lowest index capable of transmitting all the multiplexed UCI payloads among resources in the list and then transmits a UCI payload. When there is no resource capable of transmitting all the multiplexed UCI payloads in the list, the UE selects a resource having a largest index and then transmits HARQ-ACK and transmittable number of CSI reports to the corresponding resource.

Option 7: When a plurality of PUCCH resources for CSI transmission overlap and a plurality of inter-CSI multiplexing is configured to a higher layer, the UE selects one resource having a lowest index capable of transmitting all the multiplexed UCI payloads in a PUCCH resource list, that is, in the multi-CSI-PUCCH-ResourceList for CSI multiplexing configured to an upper layer and then transmits the UCI payload. When there is no resource capable of transmitting all of the multiplexed UCI payloads in the list, the UE selects a resource having a largest index and then transmits the transmittable number of CSI reports to the corresponding resource.

In the above description, for convenience of description, the case in which two PUCCH resources overlap has been focused on, but the method may be similarly applied even when three or more PUCCH resources overlap. For example, when the CSI PUCCH resource and the PUCCH resource in which SR+HARQ-ACK is multiplexed overlap, a multiplexing method between the HARQ-ACK and CSI may be applied.

When it is configured not to perform multiplexing between specific UCIs, a UCI having a high priority is transmitted according to a priority in order of HARQ-ACK>SR>CSI, and a UCI having a low priority may be dropped. In case that it is configured not to perform multiplexing when a plurality of CSI PUCCH resources overlap, a PUCCH corresponding to CSI having a higher priority may be transmitted, and a PUCCH corresponding to other CSIs may be dropped.

Next, a case 2, that is, a case that multi-slot repetition is configured, is divided into a case 2-1) of a case in which two or more PUCCH resources for HARQ-ACK transmission are located in the same starting slot and a case 2-2) of the remaining cases. Each case is illustrated in FIG. 10.

Figure 10:
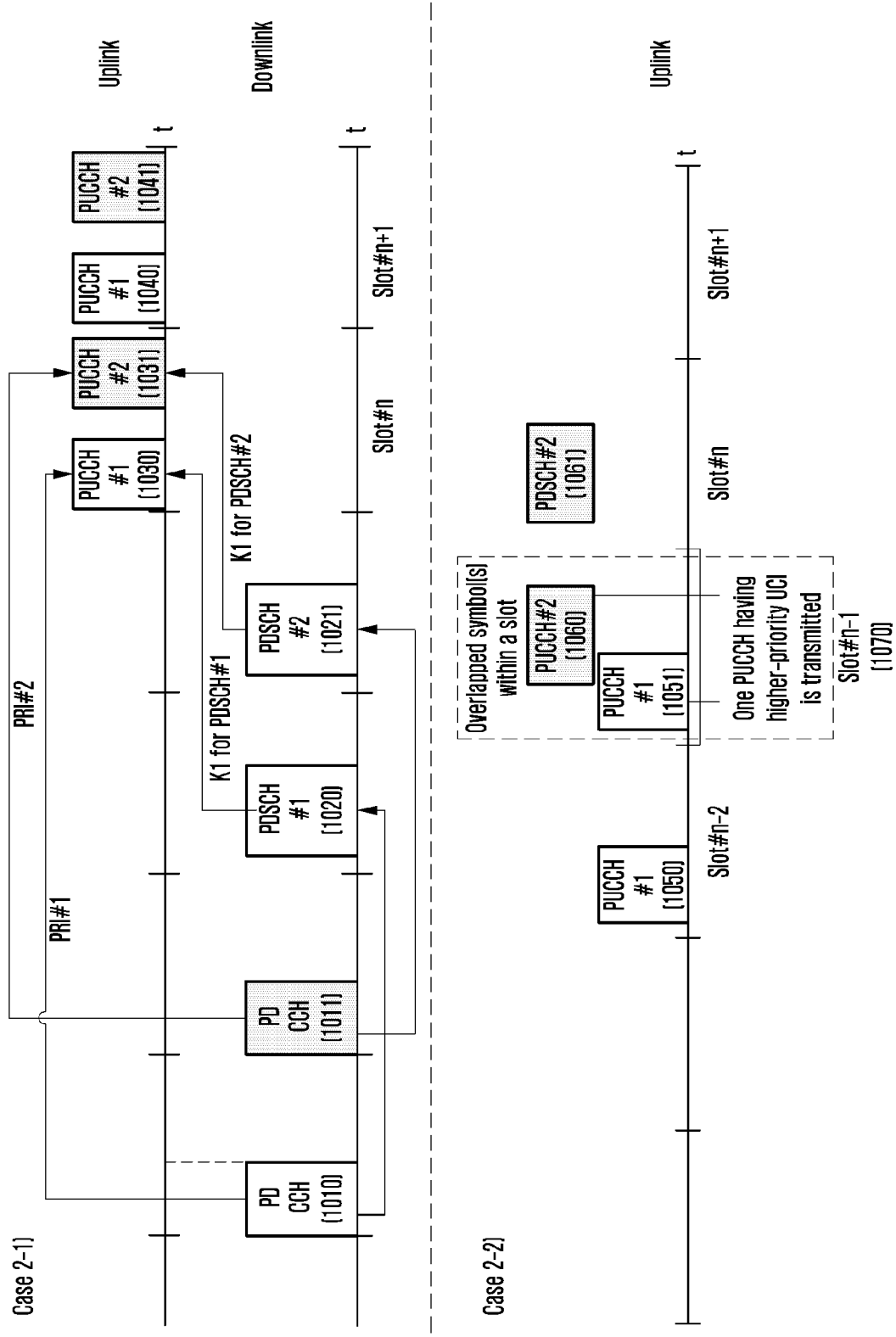
FIG. 10 is a diagram illustrating an example of a case in which PUCCH resources overlap when multi-slot repetition is configured according to an embodiment of the disclosure.

FIG. 10 is a diagram illustrating an example in which PUCCH resources overlap when multi-slot repetition is configured according to an embodiment of the disclosure.

With reference to Case 2-1, when multi-slot repetition is configured to a PUCCH resource for HARQ-ACK, that is, when a PUCCH #1 is repeatedly transmitted over multiple slots (1030, 1040), and when a PUCCH #2 is also repeatedly transmitted over multiple slots (1031, 1041), if start slots of the two PUCCHs indicated by K1 are the same, as in Case 1-1), a single PUCCH resource (a PUCCH transmitted at a latest occasion in one slot), that is, the PUCCH #2 may be selected. Accordingly, HARQ-ACK information corresponding to the PDSCH #1 and the PDSCH #2 is multiplexed and transmitted to the corresponding PUCCH through a HARQ-ACK codebook.

For convenience of description, there is exemplified a case in which a plurality of PUCCHs repeated in multi-slots overlap, but when overlap occurs between a PUCCH repeated in multi-slots and a PUCCH transmitted in a single slot, the same method may be applied.

Case 2-2 corresponds to a case in which overlap in a symbol unit occurs between a PUCCH for HARQ-ACK transmission and a PUCCH for SR or CSI transmission, or between PUCCHs for transmission of a plurality of SRs or CSI. That is, when a PUCCH #1 is repeatedly transmitted over multiple slots (1050, 1051) and a PUCCH #2 is also repeatedly transmitted over multiple slots (1060, 1061), the PUCCH #1 and the PUCCH #2 correspond to the case in which one symbol or more overlap occurs in one slot 1070.

Priorities between UCIs in the PUCCH are compared between PUCCHs in which overlap in one or more symbols occurs in the corresponding slot 1070, and a UCI having a higher priority is transmitted, and other UCIs are dropped from the corresponding slot. In this case, the priority between UCIs follows HARQ-ACK>SR>CSI.

Further, when a plurality of CSI PUCCH resources overlap, a PUCCH corresponding to CSI having a higher priority is transmitted, and PUCCHs corresponding to other CSIs may be dropped from the corresponding slot. PUCCH transmission or drop according to the above-mentioned priority is performed only in a slot in which overlap in a symbol unit occurs, and is not performed in other slots. That is, a PUCCH in which the multi-slot repetition is configured may be dropped from a slot in which overlap in a symbol unit occurs, but may be transmitted as configured in the remaining slots.

In the above case, for convenience of description, a case in which a plurality of PUCCHs repeated in multi-slots overlap is exemplified, but when overlap occurs between a PUCCH repeated in multi-slots and a PUCCH transmitted in a single slot overlap, the same method may be applied.

Further, overlap between PUCCH and PUSCH transmission will be described. When the UE transmits a PUCCH in a first slot and a PUSCH in a second slot among repeated transmissions of $N_{PUCCH}^{repeat}>1$, and when the PUCCH transmission overlaps the PUSCH transmission in one or a plurality of slots, and when UCIs in the PUSCH are multiplexed in overlapped slots, the PUCCH is transmitted and the PUSCH is not transmitted in slots in which the PUCCH and the PUSCH overlap.

Hereinafter, a beam configuration to be applied to PUCCH transmission will be described. When the UE does not have a UE-specific configuration (dedicated PUCCH resource configuration) for a PUCCH resource configuration, the PUCCH resource set is provided through pucch-ResourceCommon, which is upper signaling and in this case, a beam configuration for PUCCH transmission follows the beam configuration used in PUSCH transmission scheduled through a random access response (RAR) UL grant. When the UE has a UE-specific configuration (dedicated PUCCH resource configuration) for a PUCCH resource configuration, a beam configuration for PUCCH transmission is provided through the pucch-spatialRelationInfoId, which is higher signaling illustrated in Table 219. When the UE is configured to one pucch-spatialRelationInfoId, a beam configuration for PUCCH transmission of the UE is provided through one pucch-spatialRelationInfoId. When the UE is configured to a plurality of pucch-spatialRelationInfoIDs, the UE is instructed to activate one of the plurality of pucch-spatialRelationInfoIDs from the base station through a MAC CE (control element). The UE may be configured up to 8 pucch-spatialRelationInfoIDs through upper signaling and be instructed to activate only one pucch-spatialRelationInfoID among them.

When the UE is instructed to activate any pucch-spatialRelationInfoID through the MAC CE, the UE applies activation of pucch-spatialRelationInfoID through the MAC CE from the slot appearing first after $3N_{slot}^{subframe,\mu}$ slot from the slot performing HARQ-ACK transmission for the PDSCH transmitting the MAC CE including activation information on the pucch-spatialRelationInfoID. The above $\mu$ denotes numerology applied to PUCCH transmission, and $N_{slot}^{subframe,\mu}$ denotes the number of slots per subframe in given numerology. An upper layer configuration for pucch-spatialRelationInfo may be the same as that illustrated in Table 27. pucch-spatialRelationInfo may be mixed with PUCCH beam information.

TABLE 27

PUCCH-SpatialRelationInfo ::= SEQUENCE {
pucch-SpatialRelationInfoId PUCCH-SpatialRelationInfoId,
servingCellId ServCellIndex OPTIONAL,   -- Need S
referenceSignal CHOICE {
ssb-Index SSB-Index,
csi-RS-Index NZP-CSI-RS-ResourceId,
srs SEQUENCE {
resource SRS-ResourceId,
uplinkBWP       BWP-Id
}
},
pucch-PathlossReferenceRS-Id PUCCH-PathlossReferenceRS-Id,
p0-PUCCH-Id P0-PUCCH-Id,
closedLoopIndex ENUMERATED { i0, i1 }
}
PUCCH-SpatialRelationInfoId ::= INTEGER
(1..maxNrofSpatialRelationInfos)

According to Table 27, one referenceSignal configuration may exist in a specific pucch-spatialRelationInfo configuration, and the referenceSignal may be an ssb-Index indicating a specific SS/PBCH, a csi-RS-Index indicating a specific CSI-RS, or srs indicating a specific SRS. When the referenceSignal is configured to an ssb-Index, the UE may configure a beam using upon receiving the SS/PBCH corresponding to the ssb-Index among SS/PBCHs in the same serving cell as a beam for PUCCH transmission or when the a servingCellId is provided, the UE may configure a beam using upon receiving an SS/PBCH corresponding to the ssb-Index among SS/PBCHs in a cell indicated by serving-CellId as a beam for PUCCH transmission. When the referenceSignal is configured to a csi-RS-Index, the UE may configure a beam used upon receiving the CSI-RS corresponding to the csi-RS-Index among CSI-RSs in the same serving cell as a beam for PUCCH transmission or when the servingCellId is provided, the UE may configure a beam used upon receiving a CSI-RS corresponding to the csi-RS-Index among CSI-RSs in the cell indicated by the serving-CellId as a beam for PUCCH transmission. When the referenceSignal is configured to srs, the UE may configure a transmission beam used upon transmitting an SRS corresponding to a resource index provided as a higher signaling resource in the same serving cell and/or in the activated uplink BWP as a beam for PUCCH transmission or when servingCellID and/or uplinkBWP are/is provided, the UE may configure a transmission beam used upon transmitting the SRS corresponding to the resource index provided through the upper signaling resource in the uplink BWP and/or the cell indicated by the servingCellID and/or uplinkBWP as a beam for PUCCH transmission.

One pucch-PathlossReferenceRS-Id configuration may exist within a specific pucch-spatialRelationInfo configuration. PUCCH-PathlossReferenceRS of Table 28 may be mapped to pucch-PathlossReferenceRS-Id of Table 27, and up to four PUCCH-PathlossReferenceRS may be configured through pathlossReferenceRSs in upper signaling PUCCH-PowerControl of Table 28. PUCCH-PathlossReferenceRS is configured to an ssb-Index when it is connected to SS/PBCH through the referenceSignal of Table 28, and is configured to csi-RS-Index when it is connected to CSI-RS.

TABLE 28

```
PUCCH-PowerControl ::= SEQUENCE {
deltaF-PUCCH-f0 INTEGER (-16..15)   OPTIONAL, -- Need R
deltaF-PUCCH-f1 INTEGER (-16..15)   OPTIONAL, -- Need R
deltaF-PUCCH-f2 INTEGER (-16..15)   OPTIONAL, -- Need R
deltaF-PUCCH-f3 INTEGER (-16..15)   OPTIONAL, -- Need R
deltaF-PUCCH-f4 INTEGER (-16..15)   OPTIONAL, -- Need R
p0-Set SEQUENCE (SIZE (1..maxNrofPUCCH-P0-PerSet)) OF P0-PUCCH OPTIONAL, --
Need M
pathlossReferenceRSs SEQUENCE (SIZE (1..maxNrofPUCCH-PathlossReferenceRSs)) OF
PUCCH-PathlossReferenceRS   OPTIONAL, -- Need M
twoPUCCH-PC-AdjustmentStates ENUMERATED {twoStates}     OPTIONAL, -- Need S
...
}
P0-PUCCH ::= SEQUENCE {
p0-PUCCH-Id P0-PUCCH-Id,
p0-PUCCH-Value INTEGER (-16..15)
}
P0-PUCCH-Id ::= INTEGER (1..8)
PUCCH-PathlossReferenceRS ::= SEQUENCE {
pucch-PathlossReferenceRS-Id PUCCH-PathlossReferenceRS-Id,
referenceSignal CHOICE {
ssb-Index SSB-Index,
csi-RS-Index NZP-CSI-RS-ResourceId
}
}
```

Hereinafter, an uplink channel estimation method using sounding reference signal (SRS) transmission of the UE will be described. In order to transmit configuration information for SRS transmission to the UE, the base station may configure at least one SRS configuration for each uplink BWP, and configure at least one SRS resource set for each SRS configuration. As an example, in order to transmit information on the SRS resource set, the base station and the UE may exchange higher signaling information as follows.
  srs-ResourceSetId: SRS resource set index
  srs-ResourceIdList: a set of SRS resource indexes referenced in the SRS resource set.
  resourceType: one of 'periodic', 'semi-persistent', or 'aperiodic' may be configured as a time axis transmission configuration of the SRS resource referenced in the SRS resource set. When it is configured to 'periodic' or 'semi-persistent', associated CSI-RS information may be provided according to a used place of the SRS resource set. When it is configured to 'aperiodic', an aperiodic SRS resource trigger list and slot offset information may be provided, and associated CSI-RS information may be provided according to a used place of the SRS resource set.
  usage: as a configuration for a used place of the SRS resource referenced in the SRS resource set, one of 'beamManagement', 'codebook', 'nonCodebook', or 'antennaSwitching' may be configured.
  alpha, p0, pathlossReferenceRS, srs-PowerControlAdjustmentStates: it provides a parameter configuration for controlling transmission power of the SRS resource referenced in the SRS resource set.

The UE may understand that the SRS resource included in the set of SRS resource indexes referenced in the SRS resource set follows information configured to the SRS resource set.

Further, in order to deliver individual configuration information on SRS resources, the base station and the UE may transmit and receive higher layer signaling information. As an example, individual configuration information on the SRS resource may include time-frequency axis mapping information within a slot of the SRS resource, which may include information on frequency hopping within a slot or between slots of the SRS resource. Further, individual configuration information on the SRS resource may include a time axis transmission configuration of the SRS resource, and be configured to one of 'periodic', 'semi-persistent', or 'aperiodic'. This may be limited to have the same time axis transmission configuration as that of an SRS resource set including the SRS resource. When the time axis transmission configuration of the SRS resource is configured to 'periodic' or 'semi-persistent', an SRS resource transmission period and slot offset (e.g., periodicityAndOffset) may be additionally included in the time axis transmission configuration.

The base station may activate, deactivate, or trigger SRS transmission to the UE through L1 signaling (e.g., DCI) or higher layer signaling including RRC signaling or MAC CE signaling. For example, the base station may activate or deactivate periodic SRS transmission to the UE through higher layer signaling. The base station may instruct to activate the SRS resource set in which the resourceType is configured to periodic through higher layer signaling, and the UE may transmit the SRS resource referenced in the activated SRS resource set. Time-frequency axis resource mapping in the slot of the transmitted SRS resource follows resource mapping information configured to the SRS resource, and slot mapping including a transmission period and slot offset follows periodicityAndOffset configured to the SRS resource. Further, a spatial domain transmission filter applied to the transmitted SRS resource may refer to spatial relation info configured to the SRS resource or may refer to associated CSI-RS information configured to the SRS resource set including the SRS resource. The UE may transmit the SRS resource within the activated uplink BWP for the activated periodic SRS resource through higher layer signaling.

For example, the base station may activate or deactivate semi-persistent SRS transmission to the UE through higher layer signaling. The base station may instruct to activate the SRS resource set through MAC CE signaling, and the UE may transmit the SRS resource referenced in the activated SRS resource set. The SRS resource set activated through MAC CE signaling may be limited to an SRS resource set in which a resourceType is configured to semi-persistent. Time-frequency axis resource mapping in the slot of the transmitting SRS resource follows resource mapping information configured to the SRS resource, and slot mapping including a transmission period and slot offset follows periodicityAndOffset configured to the SRS resource. Further, a spatial domain transmission filter applied to the transmitting SRS resource may refer to spatial relation info configured to the SRS resource or may refer to associated CSI-RS information configured to the SRS resource set including the SRS resource. When spatial relation info is configured to the SRS resource, the spatial domain transmission filter may be determined with reference to configuration information on spatial relation info delivered through MAC CE signaling that activates semi-persistent SRS transmission without following the spatial relation info. The UE may transmit the SRS resource within the activated uplink BWP for the activated semi-persistent SRS resource through higher layer signaling.

For example, the base station may trigger aperiodic SRS transmission to the UE through DCI. The base station may indicate one of aperiodic SRS resource triggers (aperiodicSRS-ResourceTrigger) through an SRS request field of DCI. The UE may understand that the SRS resource set including an aperiodic SRS resource trigger indicated through DCI in the aperiodic SRS resource trigger list has been triggered among configuration information on the SRS resource set. The UE may transmit the SRS resource referenced in the triggered SRS resource set. Time-frequency axis resource mapping in the slot of the transmitting SRS resource follows resource mapping information configured to the SRS resource. Further, slot mapping of the transmitting SRS resource may be determined through slot offset between a PDCCH including DCI and an SRS resource, which refers to a value(s) included in the slot offset set configured to the SRS resource set. Specifically, slot offset between the PDCCH including DCI and the SRS resource may apply a value indicated in a time domain resource assignment field of DCI among the offset value(s) included in the slot offset set configured to the SRS resource set. Further, a spatial domain transmission filter applied to the transmitting SRS resource may refer to spatial relation info configured to the SRS resource or may refer to associated CSI-RS information configured to the SRS resource set including the SRS resource. The UE may transmit the SRS resource within the activated uplink BWP for an aperiodic SRS resource triggered through DCI.

When the base station triggers aperiodic SRS transmission to the UE through DCI, in order for the UE to transmit the SRS by applying configuration information on the SRS resource, a minimum time interval may be required between a PDCCH including DCI triggering aperiodic SRS transmission and the transmitting SRS. The time interval for SRS transmission of the UE may be defined as the number of symbols between a first symbol to which an SRS resource to be transmitted first is mapped among a transmitting SRS resource(s) and a last symbol of the PDCCH including DCI triggering aperiodic SRS transmission. The minimum time period may be determined with reference to a PUSCH preparation procedure time required for the UE to prepare for PUSCH transmission. Further, the minimum time interval may have a different value according to a used place of the SRS resource set including the transmitting SRS resource. For example, the minimum time interval may be determined as an N2 symbol defined in consideration of a UE processing capability according to a capability of the UE with reference to the PUSCH preparation procedure time of the UE. Further, when a used place of the SRS resource set is configured to a 'codebook' or 'antennaSwitching' in consideration of a used place of the SRS resource set including a SRS resource to be transmitted, the minimum time interval is configured to N2 symbol, and a used place of the SRS resource set is configured to 'nonCodebook' or 'beamManagement', the minimum time interval may be configured to N2+14 symbols. When the time interval for aperiodic SRS transmission is greater than or equal to the minimum time interval, the UE may transmit the aperiodic SRS and when the time interval for aperiodic SRS transmission is smaller than the minimum time interval, the UE may ignore DCI triggering the aperiodic SRS.

TABLE 29

```
SRS-Resource ::= SEQUENCE {
srs-ResourceId SRS-ResourceId,
nrofSRS-Ports ENUMERATED {port1, ports2, ports4},
ptrs-PortIndex NUMERATED {n0, n1 } OPTIONAL,   -- Need R
transmissionComb CHOICE {
n2 SEQUENCE {
combOffset-n2 INTEGER (0..1),
cyclicShift-n2 INTEGER (0..7)
},
n4 SEQUENCE {
combOffset-n4 INTEGER (0..3),
cyclicShift-n4 INTEGER (0..11)
}
},
resourceMapping SEQUENCE {
startPosition INTEGER (0..5),
nrofSymbols ENUMERATED {n1, n2, n4},
repetitionFactor ENUMERATED {n1, n2, n4}
},
freqDomainPosition INTEGER (0..67),
freqDomainShift INTEGER (0..268),
freqHopping SEQUENCE {
c-SRS INTEGER (0..63),
b-SRS INTEGER (0..3),
b-hop INTEGER (0..3)
},
groupOrSequenceHopping ENUMERATED { neither, groupHopping, sequenceHopping },
resourceType CHOICE {
aperiodic SEQUENCE {
...
},
semi-persistent SEQUENCE {
periodicityAndOffset-sp SRS-PeriodicityAndOffset,
...
},
periodic SEQUENCE {
periodicityAndOffset-p SRS-PeriodicityAndOffset,
...
}
},
sequenceId INTEGER (0..1023),
spatialRelationInfo SRS-SpatialRelationInfo OPTIONAL,   -- Need R
...
}
```

The spatialRelationInfo configuration information of Table 29 applies beam information of the reference signal to a beam used for the corresponding SRS transmission with reference to one reference signal. For example, the configuration of spatialRelationInfo may, include information of Table 30.

TABLE 30

```
SRS-SpatialRelationInfo ::= SEQUENCE {
servingCellId ServCellIndex OPTIONAL,    -- Need S
referenceSignal CHOICE {
ssb-Index SSB-Index,
csi-RS-Index NZP-CSI-RS-ResourceId,
srs SEQUENCE {
resourceId SRS-ResourceId,
uplinkBWP BWP-Id
}
}
}
```

With reference to the spatialRelationInfo configuration, in order to use beam information of a specific reference signal, the base station may configure an SS/PBCH block index, CSI-RS index, or SRS index as an index of a reference signal to be referenced. The upper signaling referenceSignal is configuration information indicating which reference signal beam information is to be referenced for the corresponding SRS transmission, an ssb-Index is an index of the SS/PBCH block, a csi-RS-Index is an index of the CSI-RS, and srs is an index of the SRS. When a value of the upper signaling referenceSignal is configured to an 'ssb-Index', the UE may apply a reception beam used upon receiving the SS/PBCH block corresponding to the ssb-Index as a transmission beam of the corresponding SRS transmission. When a value of the upper signaling referenceSignal is configured to a 'csi-RS-Index', the UE may apply a reception beam used upon receiving the CSI-RS corresponding to the csi-RS-Index as a transmission beam of the corresponding SRS transmission. When a value of the upper signaling referenceSignal is configured to 'srs', the UE may apply a transmission beam used upon transmitting the SRS corresponding to srs as a transmission beam for transmission of the corresponding SRS.

Hereinafter, a scheduling method of PUSCH transmission will be described. PUSCH transmission may be dynamically scheduled by a UL grant in DCI or may operate according to a configured grant type 1 or type 2. Dynamic scheduling indication for PUSCH transmission is possible in a DCI format 0_0 or 0_1.

The configured grant type 1 PUSCH transmission does not receive DCI scheduling UL transmission, but may be semi-statically configured through reception of configuredGrantConfig including the rrc-ConfiguredUplinkGrant of Table 31 through upper signaling. The configured grant Type 2 PUSCH transmission may be semi-continuously scheduled by the UL grant in DCI after reception of the configuredGrantConfig that does not include the rrc-ConfiguredUplinkGrant of Table 31 through upper signaling. When PUSCH transmission is operated by a configured grant, parameters applied to PUSCH transmission are applied through ConfiguredGrantConfig, which is upper level signaling of Table 31, except for dataScramblingIdentityPUSCH, txConfig, codebookSubset, maxRank, and scaling of UCI-OnPUSCH provided by pusch-Config of Table 32, which is higher signaling. When the UE receives a transformPrecoder in configuredGrantConfig, which is upper signaling of Table 31, the UE applies tp-pi2BPSK in pusch-Config of Table 32 to PUSCH transmission operating by the configured grant.

TABLE 31

```
ConfiguredGrantConfig ::= SEQUENCE {
frequencyHopping ENUMERATED {intraSlot, interSlot}
OPTIONAL,    -- Need S,
cg-DMRS-Configuration DMRS -UplinkConfig,
mcs-Table ENUMERATED {qam256, qam64LowSE} OPTIONAL,    -- Need S
mcs-TableTransformPrecoder ENUMERATED {qam256, qam64LowSE} OPTIONAL,    --
Need S
uci-OnPUSCH SetupRelease { CG-UCI-OnPUSCH } OPTIONAL,    -- Need M
resourceAllocation ENUMERATED { resourceAllocationType0, resourceAllocationType1,
dynamicSwitch },
rbg-Size ENUMERATED {config2} OPTIONAL,    -- Need S
powerControlLoopToUse ENUMERATED {n0, n1},
p0-PUSCH-Alpha P0-PUSCH-AlphaSetId,
transformPrecoder ENUMERATED {enabled, disabled} OPTIONAL,    -- Need S
nrofHARQ-Processes INTEGER(1..16),
repK ENUMERATED {n1, n2, n4, n8},
repK-RV ENUMERATED {s1-0231, s2-0303, s3-0000} OPTIONAL,    -- Need R
periodicity ENUMERATED {
sym2, sym7, sym1x14, sym2x14, sym4x14, sym5x14, sym8x14, sym10x14, sym16x14,
sym20x14,
sym32x14, sym40x14, sym64x14, sym80x14, sym128x14, sym160x14, sym256x14, sym320x14,
sym512x14,
sym640x14, sym1024x14, sym1280x14, sym2560x14, sym5120x14,
sym6, sym1x12, sym2x12, sym4x12, sym5x12, sym8x12, sym10x12, sym16x12, sym20x12,
sym32x12,
sym40x12, sym64x12, sym80x12, sym128x12, sym160x12, sym256x12, sym320x12,
sym512x12, sym640x12,
sym1280x12, sym2560x12
},
configuredGrantTimer INTEGER (1..64) OPTIONAL,    -- Need R
rrc-ConfiguredUplinkGrant SEQUENCE {
timeDomainOffset INTEGER (0..5119),
timeDomainAllocation INTEGER (0..15),
frequencyDomainAllocation BIT STRING (SIZE(18)),
antennaPort INTEGER (0..31),
dmrs-SeqInitialization INTEGER (0..1) OPTIONAL,    -- Need R
precodingAndNumberOfLayers        INTEGER (0..63),
srs-ResourceIndicator INTEGER (0..15) OPTIONAL,    -- Need R
mcsAndTBS INTEGER (0..31),
```

TABLE 31-continued

```
frequencyHoppingOffset INTEGER (1.. maxNrofPhysicalResourceBlocks-1) OPTIONAL,  --
Need R
pathlossReferenceIndex INTEGER (0..maxNrofPUSCH-PathlossReferenceRSs-1),
...
} OPTIONAL,  -- Need R
...
}
```

Hereinafter, a PUSCH transmission method will be described. A DMRS antenna port for PUSCH transmission is the same as an antenna port for SRS transmission. PUSCH transmission may follow a codebook-based transmission method and a non-codebook-based transmission method, respectively, according to whether a value of txConfig in pusch-Config of Table 32, which is higher signaling, is a 'codebook' or a 'nonCodebook'.

As described above, PUSCH transmission may be dynamically scheduled through a DCI format 0_0 or 0_1 and be semi-statically configured by a configured grant. When the UE is instructed to schedule PUSCH transmission through the DCI format 0_0, the UE performs a beam configuration for PUSCH transmission using the pucch-spatialRelationInfoID corresponding to the UE-specific PUCCH resource corresponding to a minimum ID in the uplink BWP activated in the serving cell, and in this case, PUSCH transmission is performed based on a single antenna port. The UE does not expect scheduling of PUSCH transmission through the DCI format 0_0 within the BWP in which a PUCCH resource including the pucch-spatialRelationInfo is not configured. When the UE has been not configured to txConfig in pusch-Config of Table 32, the UE does not expect to be scheduled in the DCI format 0_1.

dynamically scheduled through a DCI format 0_0 or 0_1, and operate semi-statically according to a configured grant. When the codebook-based PUSCH is dynamically scheduled by the DCI format 0_1 or semi-statically configured by a configured grant, the UE determines a precoder for PUSCH transmission based on an SRS resource indicator (SRI), a transmission precoding matrix indicator (TPMI), and a transmission rank (the number of PUSCH transport layers).

In this case, the SRI may be given through a field SRS resource indicator in DCI or may be configured through srs-ResourceIndicator, which is higher signaling. When transmitting a codebook-based PUSCH, the UE may be configured to at least one SRS resource, and up to two SRS resources. When the UE is provided with an SRI through DCI, the SRS resource indicated by the corresponding SRI means an SRS resource corresponding to the SRI among SRS resources transmitted before the PDCCH including the corresponding SRI. Further, the TPMI and transmission rank may be given through field precoding information and number of layers in DCI or may be configured through precodingAndNumberOfLayers, which are higher signaling. The TPMI is used for indicating a precoder applied to PUSCH transmission. When the UE is configured to one

TABLE 32

```
PUSCH-Config ::= SEQUENCE {
dataScramblingIdentityPUSCH INTEGER (0..1023) OPTIONAL,  -- Need S
txConfig ENUMERATED {codebook, nonCodebook}
OPTIONAL,  -- Need S
dmrs-UplinkForPUSCH-MappingTypeA SetupRelease { DMRS-UplinkConfig } OPTIONAL,
-- Need M
dmrs-UplinkForPUSCH-MappingTypeB SetupRelease { DMRS-UplinkConfig } OPTIONAL,
-- Need M
pusch-PowerControl PUSCH-PowerControl OPTIONAL,  -- Need M
frequencyHopping ENUMERATED {intraSlot, interSlot} OPTIONAL,  -- Need S
frequencyHoppingOffsetLists SEQUENCE (SIZE (1..4)) OF INTEGER (1..
maxNrofPhysicalResourceBlocks-1)
OPTIONAL,  -- Need M
resourceAllocation ENUMERATED { resourceAllocationType0, resourceAllocationType1,
dynamicSwitch},
pusch-TimeDomainAllocationList SetupRelease { PUSCH-TimeDomainResourceAllocationList
} OPTIONAL,  -- Need M
pusch-AggregationFactor ENUMERATED { n2, n4, n8 } OPTIONAL,  -- Need S
mcs-Table ENUMERATED {qam256, qam64LowSE}
OPTIONAL,  -- Need S
mcs-TableTransformPrecoder ENUMERATED {qam256, qam64LowSE} OPTIONAL,  --
Need S
transformPrecoder ENUMERATED {enabled, disabled}
OPTIONAL,  -- Need S
codebookSubset ENUMERATED {fullyAndPartialAndNonCoherent,
partialAndNonCoherent,nonCoherent}
OPTIONAL, -- Cond codebookBased
maxRank INTEGER (1..4) OPTIONAL, -- Cond codebookBased
rbg-Size ENUMERATED { config2} OPTIONAL, -- Need S
uci-OnPUSCH SetupRelease { UCI-OnPUSCH} OPTIONAL, -- Need M
tp-pi2BPSK ENUMERATED {enabled} OPTIONAL, -- Need S
...
}
```

Hereinafter, a codebook-based PUSCH transmission will be described. Codebook-based PUSCH transmission may be SRS resource, the TPMI is used for indicating a precoder to be applied in the configured one SRS resource. When the UE is configured to a plurality of SRS resources, the TPMI is used for indicating a precoder to be applied in the SRS resource indicated through the SRI.

A precoder to be used for PUSCH transmission is selected from an uplink codebook having the same number of antenna ports as an nrofSRS-Ports value in SRS-Config, which is higher signaling. In codebook-based PUSCH transmission, the UE determines a codebook subset based on the TPMI and codebookSubset in pusch-Config, which is higher signaling. The codebookSubset in the pusch-Config, which is upper signaling may be configured to one of 'fullyAndPartialAndNonCoherent', 'partialAndNonCoherent', or 'nonCoherent' based on a UE capability reported by the UE to the base station. When the UE reports 'partialAndNonCoherent' as the UE capability, the UE does not expect that a value of codebookSubset, which is higher signaling, is configured to 'fullyAndPartialAndNonCoherent'. Further, when the UE reports 'nonCoherent' as the UE capability, the UE does not expect that a value of a codebookSubset, which is higher signaling, is configured to 'fullyAndPartialAndNonCoherent' or 'partialAndNonCoherent'. When nrofSRS-Ports in the SRS-ResourceSet, which is upper signaling indicates two SRS antenna ports, the UE does not expect that a value of the codebookSubset, which is upper signaling is configured to 'partialAndNonCoherent'.

The UE may be configured to one SRS resource set in which a value of usage in the SRS-ResourceSet, which is upper signaling is configured to a 'codebook', and one SRS resource in the corresponding SRS resource set may be indicated through the SRI. When several SRS resources are configured in the SRS resource set in which a value of usage in the SRS-ResourceSet, which is upper signaling is configured to a 'codebook', the UE expects that a value of nrofSRS-Ports in the SRS-Resource, which is upper signaling is configured to the same value for all SRS resources.

The UE transmits, to the base station, one or a plurality of SRS resources included in an SRS resource set in which a value of usage is configured to a 'codebook' according to higher signaling, and the base station selects one of SRS resources transmitted by the UE and instructs the UE to perform PUSCH transmission using transmission beam information of the corresponding SRS resource. In this case, in codebook-based PUSCH transmission, the SRI is used as information for selecting an index of one SRS resource and is included in DCI. Additionally, the base station includes information indicating a transmission rank and TPMI to be used by the UE for PUSCH transmission in the DCI. The UE applies a precoder indicated by the TPMI and a transmission rank indicated based on the transmission beam of the corresponding SRS resource to perform PUSCH transmission using the SRS resource indicated by the SRI.

Hereinafter, non-codebook-based PUSCH transmission will be described. Non-codebook-based PUSCH transmission may be dynamically scheduled through a DCI format 0_0 or 0_1, and operate semi-statically according to a configured grant. When at least one SRS resource is configured in the SRS resource set in which a value of usage in the SRS-ResourceSet, which is upper signaling is configured to a 'nonCodebook', the UE may schedule non-codebook based PUSCH transmission through the DCI format 0_1.

For the SRS resource set in which a value of usage in the SRS-ResourceSet, which is upper signaling is configured to a 'nonCodebook', the UE may be configured to one connected non-zero power CSI-RS (NZP CSI-RS) resource. The UE may calculate a precoder for SRS transmission by measuring the NZP CSI-RS resource connected to the SRS resource set. When the difference between a last reception symbol of an aperiodic NZP CSI-RS resource connected to the SRS resource set and a first symbol of aperiodic SRS transmission in the UE is less than 42 symbols, the UE does not expect that information on the precoder for SRS transmission is updated.

When a value of resourceType in the SRS-ResourceSet, which is upper signaling is configured to 'aperiodic', the connected NZP CSI-RS is indicated by the SRS request, which is a field in the DCI format 0_1 or 1_1. In this case, when the connected NZP CSI-RS resource is an aperiodic NZP CSI-RS resource, it indicates that the connected NZP CSI-RS exists in case that a value of a field SRS request in the DCI format 0_1 or 1_1 is not '00'. In this case, the corresponding DCI should not indicate cross carrier or cross BWP scheduling. Further, when a value of the SRS request indicates existence of the NZP CSI-RS, the corresponding NZP CSI-RS is positioned in a slot in which the PDCCH including the SRS request field is transmitted. In this case, TCI states configured to the scheduled subcarrier are not configured to QCL-TypeD.

When a periodic or semi-persistent SRS resource set is configured, the connected NZP CSI-RS may be indicated through the associatedCSI-RS in the SRS-ResourceSet, which is upper signaling. For non-codebook-based transmission, the UE does not expect that spatialRelationInfo, which is upper signaling for SRS resources, and associatedCSI-RS in SRS-ResourceSet, which is higher signaling, are configured together.

When a plurality of SRS resources are configured, the UE may determine a precoder to be applied to PUSCH transmission and a transmission rank based on the SRI indicated by the base station. In this case, the SRI may be indicated through a field SRS resource indicator in DCI or may be configured through srs-ResourceIndicator, which is higher signaling. As in the above-described codebook-based PUSCH transmission, when the UE is provided with an SRI through DCI, the SRS resource indicated by the SRI means an SRS resource corresponding to the SRI among SRS resources transmitted before the PDCCH including the SRI. The UE may use one or a plurality of SRS resources for SRS transmission, and the maximum number of SRS resources that may be simultaneously transmitted in the same symbol in one SRS resource set is determined by a UE capability reported by the UE to the base station. In this case, SRS resources simultaneously transmitted by the UE occupy the same RB. The UE configures one SRS port for each SRS resource. Only one SRS resource set in which a value of usage in the SRS-ResourceSet, which is upper signaling is configured to a 'nonCodebook' may be configured, and up to four SRS resources for non-codebook-based PUSCH transmission may be configured.

The base station transmits one NZP-CSI-RS connected to the SRS resource set to the UE, and the UE calculates a precoder to use when transmitting one or more SRS resources in the corresponding SRS resource set based on the measurement result upon receiving the corresponding NZP-CSI-RS. The UE applies the calculated precoder when transmitting one or more SRS resources in the SRS resource set in which usage is configured to a 'nonCodebook' to the base station, and the base station selects one or a plurality of SRS resources among the received one or a plurality of SRS resources. In this case, in non-codebook-based PUSCH transmission, the SRI indicates an index capable of expressing one or a combination of a plurality of SRS resources, and the SRI is included in the DCI. In this case, the number of SRS resources indicated by the SRI transmitted by the base station may be the number of transmission layers of the PUSCH, and the UE transmits the PUSCH by applying a precoder applied to SRS resource transmission to each layer.

Hereinafter, a PUSCH preparation procedure time will be described. When the base station schedules the UE to transmit the PUSCH using a DCI format 0_0 or a DCI format 0_1, by applying a transmission method indicated through DCI (transmission precoding method of SRS resource, number of transmission layers, spatial domain transmission filter), the UE may require a PUSCH preparation procedure time for transmitting a PUSCH. In NR, the PUSCH preparation procedure time is defined in consideration of this. The PUSCH preparation procedure time of the UE may follow Equation 2.

$$T_{proc,2}=\max((N_2+d_{2,1})(2048+144)\cdot\kappa 2^{-\mu}\cdot T_c, d_{2,2})\quad\text{[Equation 2]}$$

In the aforementioned Tproc,2, each variable may have the following meaning.

N2: The number of symbols determined according to a UE processing capability 1 or 2 and numerology $\mu$ according to a capability of the UE. When it is reported as a UE processing capability 1 according to the capability report of the UE, it has a value of Table 33, and when it is reported as a UE processing capability 2 and it is configured through higher layer signaling that the UE processing capability 2 may be used, it may have a value of Table 34.

TABLE 33

| $\mu$ | PUSCH preparation time $N_2$ [symbols] |
| --- | --- |
| 0 | 10 |
| 1 | 12 |
| 2 | 23 |
| 3 | 36 |

TABLE 34

| $\mu$ | PUSCH preparation time $N_2$ [symbols] |
| --- | --- |
| 0 | 5 |
| 1 | 5.5 |
| 2 | 11 for frequency range 1 |

$d_{2,1}$: The number of symbols is determined to 0 when a first symbol of the PUSCH is configured with only a DM-RS and 1 if not.

$\kappa$: 64

$\mu$: it follows a value in which $T_{proc,2}$ becomes larger among $\mu_{DL}$ or $\mu_{UL}$. $\mu_{DL}$ denotes numerology of a downlink in which a PDCCH including DCI scheduling a PUSCH is transmitted, and $\mu_{UL}$ denotes numerology of an uplink in which a PUSCH is transmitted.

Tc: it has $1/(\Delta f_{max}\cdot N_f)$, $\Delta f_{max}=480\cdot 10^3$ Hz, $N_f=4096$.

d2,2: When DCI scheduling the PUSCH indicates BWP switching, it follows a BWP switching time, otherwise, it has 0.

When considering time axis resource mapping information of a PUSCH scheduled through DCI and the timing advance (TA) effect between uplink and downlink, the base station and the UE determine that a PUSCH preparation procedure time is not sufficient when a first symbol of the PUSCH starts earlier than a first uplink symbol in which the CP starts after Tproc,2 from the last symbol of the PDCCH including DCI in which the PUSCH is scheduled. If not, the base station and the UE determine that the PUSCH preparation procedure time is sufficient. Only when the PUSCH preparation procedure time is sufficient, the UE transmits the PUSCH, and when the PUSCH preparation procedure time is not enough, the UE may ignore DCI scheduling the PUSCH.

Hereinafter, repeated PUSCH transmission will be described. When the UE schedules PUSCH transmission in a DCI format 0_1 in the PDCCH including the CRC scrambled with C-RNTI, MCS-C-RNTI, or CS-RNTI, if the UE is configured to higher layer signaling pusch-AgreegationFactor, the same symbol allocation is applied in consecutive slots as many as pusch-AgreegationFactor, and PUSCH transmission is limited to single rank transmission. For example, the UE should repeat the same TB in consecutive slots as many as pusch-AgreegationFactor, and apply the same symbol allocation to each slot. Table 35 represents a redundancy version (RV) applied to repeated PUSCH transmission for each slot. When the UE schedules repeated PUSCH transmission in a DCI format 0_1 in a plurality of slots and at least one symbol of slots in which repeated PUSCH transmission is performed according to information of higher layer signaling tdd-UL-DL-ConfigurationCommon or tdd-UL-DL-ConfigurationDedicated is indicated as a downlink symbol, the UE does not perform PUSCH transmission in a slot in which the corresponding symbol is positioned.

TABLE 35

| $rv_{id}$ indicated by the DCI scheduling the PUSCH | $rv_{id}$ to be applied to n-th transmission occasion | | | |
| --- | --- | --- | --- | --- |
|  | n mod 4 = 0 | n mod 4 = 1 | n mod 4 = 2 | n mod 4 = 3 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

Further, with respect to repeated PUSCH transmission, in NR Release 16, the following additional methods may be defined for UL grant-based PUSCH transmission and configured grant-based PUSCH transmission crossing a slot boundary.

Method 1 (mini-slot level repetition): Through one UL grant, two or more PUSCH repetition transmissions within one slot or crossing the boundary of consecutive slots are scheduled. Further, for the method 1, time domain resource allocation information in DCI indicates a resource of the first repeated transmission. Further, time domain resource information of the remaining repeated transmissions may be determined according to time domain resource information of the first repeated transmission and an uplink or downlink direction determined for each symbol of each slot. Each repeated transmission occupies consecutive symbols.

Method 2 (multi-segment transmission): Two or more repeated PUSCH transmissions are scheduled in consecutive slots through one UL grant. In this case, one transmission is designated for each slot, and different starting points or repetition lengths may be different for each transmission. Further, in the method 2, time domain resource allocation information in DCI indicates a start point and repetition length of all repeated transmissions. Further, in the case of performing repeated transmission in a single slot through the method 2, when several bundles of consecutive uplink symbols exist in the corresponding slot, each repeated transmission is performed for each bundle of uplink symbols. When a bundle of consecutive uplink symbols is uniquely present in the corresponding slot, one repeated PUSCH transmission is performed according to a method of NR release 15.

Method 3: Two or more repeated PUSCH transmissions are scheduled in consecutive slots through two or more UL grants. In this case, one transmission is designated for each slot, and the n-th UL grant may be received before PUSCH transmission scheduled to the n−1 th UL grant ends.

Method 4: Through one UL grant or one configured grant, one or several repeated PUSCH transmissions in a single slot, or two or more repeated PUSCH transmissions may be supported across the boundary of consecutive slots. The number of repetitions indicated by the base station to the UE is only a nominal value, and the number of repeated PUSCH transmissions actually performed by the UE may be greater than the nominal number of repetitions. Time domain resource allocation information within DCI or within a configured grant means a resource of first repeated transmission indicated by the base station. Time domain resource information of the remaining repeated transmission may be determined with reference to at least resource information of the first repeated transmission and the uplink or downlink direction of the symbols. When time domain resource information of repeated transmission indicated by the base station spans the slot boundary or includes an uplink/downlink switching point, the repeated transmission may be divided into a plurality of repeated transmissions. In this case, the repeated transmission may include one repeated transmission for each uplink period in one slot.

Figure 11:
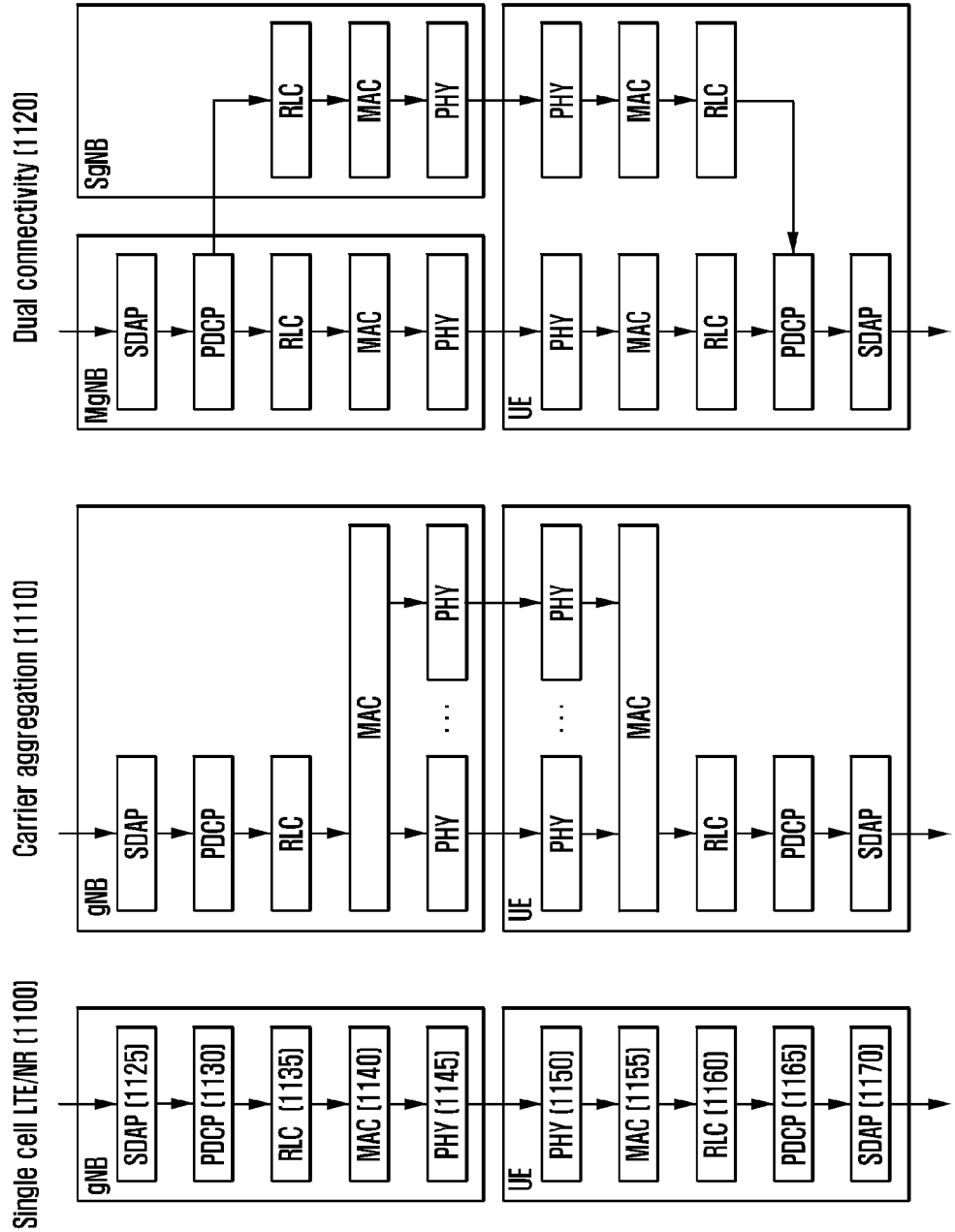
FIG. 11 is a block diagram illustrating a structure of a base station and a terminal radio protocol when a single cell, carrier aggregation, and dual connectivity are performed according to an embodiment of the disclosure.

FIG. 11 is a block diagram illustrating a structure of a base station and a UE radio protocol when a single cell, carrier aggregation, and dual connectivity are performed according to an embodiment of the disclosure.

With reference to FIG. 11, a radio protocol of a next generation mobile communication system is configured with NR service data adaptation protocols (SDAP) 1125 and 1170, NR packet data convergence protocols (PDCP) 1130 and 1165, NR radio link controls (RLC) 1135 and 1160, and NR medium access controls (MAC) 1140 and 1155 in the UE and the NR base station, respectively.

Main functions of the NR SDAPs 1125 and 1170 may include some of the following functions.
 transfer of user plane data
 mapping between a QoS flow and a DRB for both DL and UL
 marking QoS flow ID in both DL and UL packets
 reflective QoS flow to DRB mapping for the UL SDAP PDUs.

With respect to the SDAP layer device, the UE may configure whether to use a header of the SDAP layer device or a function of the SDAP layer device for each PDCP layer device, for each bearer, or for each logical channel with an RRC message, and when the SDAP header is configured, the UE may instruct to update or reconfigure the uplink and downlink QoS flow and data bearer mapping information with a NAS reflective QoS configuration 1-bit indicator and an AS reflective QoS configuration 1-bit indicator of the SDAP header. The SDAP header may include QoS flow ID information indicating QoS. The QoS information may be used as a data processing priority and scheduling information for supporting a smooth service.

Main functions of the NR PDCPs 1130 and 1165 may include some of the following functions.
 Header compression and decompression: ROHC only
 Transfer of user data
 In-sequence delivery of upper layer PDUs
 Out-of-sequence delivery of upper layer PDUs
 PDCP PDU reordering for reception
 Duplicate detection of lower layer SDUs
 Retransmission of PDCP SDUs
 Ciphering and deciphering
 Timer-based SDU discard in uplink.

In the above description, reordering of the NR PDCP device refers to a function of reordering PDCP PDUs received in a lower layer in order based on a PDCP sequence number (SN), and may include a function of delivering data to a higher layer in reordered order or may include a function of directly delivering data without considering the order, include a function of reordering the order to record lost PDCP PDUs, include a function of reporting a status of the lost PDCP PDUs to the transmitting side, and include a function of requesting retransmission of lost PDCP PDUs.

Main functions of the NR RLCs 1135 and 1160 may include some of the following functions.
 Transfer of upper layer PDUs
 In-sequence delivery of upper layer PDUs
 Out-of-sequence delivery of upper layer PDUs
 Error Correction through ARQ
 Concatenation, segmentation and reassembly of RLC SDUs
 Re-segmentation of RLC data PDUs
 Reordering of RLC data PDUs
 Duplicate detection
 Protocol error detection
 RLC SDU discard
 RLC re-establishment In the above description, in-sequence delivery of the NR RLC device refers to a function of sequentially delivering RLC SDUs received from a lower layer to an upper layer, and when one RLC SDU is originally divided into several RLC SDUs and received, in-sequence delivery of the NR RLC device may include a function of reassembling and delivering several RLC SDUs, include a function of reordering the received RLC PDUs based on an RLC sequence number (SN) or PDCP SN (sequence number), include a function of reordering the order and recording lost RLC PDUs, a function of reporting a status on the lost RLC PDUs to the transmitting side, and a function of requesting retransmission of the lost RLC PDUs, and when there is a lost RLC SDU, in-sequence delivery of the NR RLC device may include a function of sequentially delivering only RLC SDUs before the lost RLC SDU to the upper layer, or even if there is a lost RLC SDU, when a predetermined timer expires, in-sequence delivery of the NR RLC device may include a function of sequentially delivering all RLC SDUs received before the start of the timer to the upper layer, or even if there is a lost RLC SDU, when a predetermined timer expires, in-sequence delivery of the NR RLC device may include a function of sequentially delivering all RLC SDUs received so far to the upper layer. Further, in the above description, the RLC PDUs may be processed in the order in which they are received (sequence number, in arrival order regardless of order of the sequence number) and be delivered to the PDCP device out of sequence (out-of sequence delivery), and when the PDU is a segment, segments stored in the buffer or to be received later may be received, reconstructed into one complete RLC PDU, and then processed and delivered to the PDCP device. The NR RLC layer may not include a concatenation function, and the function may be performed in the NR MAC layer or replaced with a multiplexing function of the NR MAC layer.

In the above description, out-of-sequence delivery of the NR RLC device refers to a function of directly delivering RLC SDUs received from a lower layer to a higher layer regardless of order, and when one RLC SDU is originally received after being divided into several RLC SDUs, out-of-sequence delivery may include a function of reassembling and delivering several RLC SDUs, and include a function of storing an RLC SN or PDCP SN of the received RLC PDUs, aligning the order thereof, and recording lost RLC PDUs.

The NR MACs 1140 and 1155 may be connected to several NR RLC layer devices configured in one UE, and a main function of the NR MAC may include some of the following functions.

Mapping between logical channels and transport channels
Multiplexing/demultiplexing of MAC SDUs
Scheduling information reporting
Error correction through HARQ
Priority handling between logical channels of one UE
Priority handling between UEs by means of dynamic scheduling
MBMS service identification
Transport format selection
Padding The NR PHY layers 1145 and 1150 may perform an operation of channel-coding and modulating upper layer data, making the upper layer data into an OFDM symbol and transmitting the OFDM symbol to a radio channel, or demodulating the OFDM symbol received through the radio channel, decoding the channel of the OFDM symbol, and delivering the OFDM symbol to the upper layer.

A detailed structure of the radio protocol structure may be variously changed according to a carrier (or cell) operating method. For example, when the base station transmits data to the UE based on a single carrier (or cell), the base station and the UE use a protocol structure having a single structure for each layer as in 1100. However, when the base station transmits data to the UE based on carrier aggregation using multiple carriers in a single TRP, the base station and the UE have a single structure up to an RLC layer as in 1110, but use a protocol structure for multiplexing a PHY layer through a MAC layer. As another example, when the base station transmits data to the UE based on dual access using multiple carriers in multiple TRPs, the base station and the UE have a single structure up to the RLC layer as in 1120, but use a protocol structure that multiplexes the PHY layer through the MAC layer.

With reference to the above-described PUCCH-related descriptions, current NR release 15 is focused on transmission toward a single cell or/and a single transmission point or/and a single panel or/and a single beam or/and a single transmission direction for repeated PUCCH and PUSCH transmission. In the following description of the disclosure, for convenience, a cell, a transmission point, a panel, a beam, or/and a transmission direction that may be distinguished through an upper layer/L1 parameter such as a TCI state or spatial relation information, or an indicator such as a cell ID, a TRP ID, or a panel ID are unified and described as a TRP (transmission reception point, transmission point). Therefore, in actual application, it is possible to appropriately replace the TRP with one of the above terms.

Because there is one PUCCH resource used for repeated PUCCH transmission, and only one PUCCH-spatialRelationInfo may be activated for one PUCCH resource, the UE should constantly maintain a direction of a transmission beam during the repeated PUCCH transmission. Further, PUCCH-PathlossReferenceRS used for repeated PUCCH transmission, a considered starting RB point, and a frequency hopping pattern also consider transmission to a single TRP.

Similarly, in the case of repeated PUSCH transmission, transmission to a single TRP is considered regardless of codebook-based or non-codebook-based transmission. For example, in the codebook-based PUSCH transmission, a transmission beam of the UE may be determined by the SRI and the TPMI transmitted from the base station, that is, a single TRP to the UE. Similarly, for non-codebook-based PUSCH transmission, an NZP CSI-RS that may be configured from the base station, that is, a single TRP may be configured to the UE, and a transmission beam of the UE may be determined by the SRI delivered from the single TRP.

In NR Release 16 or later release, repeated PUCCH and PUSCH transmission for multiple TRPs may be supported. In this case, the UE should support a configuration for repeated transmission of a PUCCH and PUSCH to a plurality of TRPs. For example, upon repeated PUCCH transmission, a plurality of beam directions should be considered for transmission to a plurality of TRPs, but a method of transmitting using a plurality of beam configuration methods for one PUCCH resource, or a plurality of PUCCH resources for repeated PUCCH transmission was undefined in release 15. A beam configuration upon repeated PUCCH transmission, PUCCH-PathlossReferenceRS, a considered starting RB point and frequency hopping pattern, and a codebook-based or non-codebook-based transmission method upon repeated PUCCH transmission need to adjust a configurations for transmission to a plurality of TRPs, as in the case of the repeated PUCCH transmission, but this was also not defined in release 15.

The disclosure can minimize a loss of uplink control information and data and a transmission delay time upon repeated transmission of a PUCCH and a PUSCH considering a plurality of TRPs by providing a processing method for the above-described case. Additionally, the disclosure is applicable to a repeated PUSCH transmission scheme crossing a slot boundary considered in NR release 16, and in the case of repeated PUSCH transmission, the disclosure is applicable to both DCI-based dynamic scheduling and a configured grant-based higher signaling configuration scheme. Repeated PUCCH and PUSCH transmission configuration and determination method to a plurality of TRPs of the UE for various cases will be described in detail in the following embodiments.

Hereinafter, embodiments of the disclosure will be described in detail with reference to the accompanying drawings. Further, in the description of the disclosure, when it is determined that a detailed description of a related function or configuration may unnecessarily obscure the subject matter of the disclosure, a detailed description thereof will be omitted. Terms described below are terms defined in consideration of functions in the disclosure, which may vary according to intentions or customs of users and operators. Therefore, the definition should be made based on the content throughout this specification.

Hereinafter, a base station is a subject performing resource allocation of a UE, and may be at least one of a gNode B, a gNB, an eNode B, a node B, a base station (BS), a radio access unit, a base station controller, or a node on a network. The terminal may include a user equipment (UE), a mobile station (MS), a cellular phone, a smart phone, a computer, or a multimedia system capable of performing a communication function. Hereinafter, although an embodiment of the disclosure is described below using an NR or LTE/LTE-A system as an example, the embodiment of the disclosure may be applied to other communication systems having a similar technical background or channel type. Further, an embodiment of the disclosure may be applied to other communication systems through some modifications within a range that does not significantly deviate from the scope of the disclosure by the determination of a person having skilled technical knowledge.

The contents of the disclosure are applicable to FDD and TDD systems.

Hereinafter, in the disclosure, higher signaling (or higher layer signaling) is a method of transmitting a signal from a base station to a UE using a downlink data channel of a physical layer or from a UE to a base station using an uplink data channel of a physical layer, and may be referred to as RRC signaling, PDCP signaling, or a medium access control (MAC) control element (MAC CE).

Hereinafter, in the disclosure, when the UE determines whether cooperative communication is applied, it is possible to use various methods such as a method in which a PDCCH(s) for allocating a PDSCH to which cooperative communication is applied has a specific format, a PDCCH(s) for allocating a PDSCH to which cooperative communication is applied includes a specific indicator indicating whether cooperative communication is applied, or a PDCCH(s) for allocating a PDSCH to which cooperative communication is applied is scrambled with a specific RNTI, or assumes cooperative communication application in a specific section indicated by a higher layer. Hereinafter, for convenience of description, a case in which a UE receives a PDSCH to which cooperative communication is applied based on conditions similar to the above conditions will be referred to as an NC-JT case.

Hereinafter, in the disclosure, determining a priority between A and B may be mentioned in various ways such as selecting one having a higher priority according to a predetermined priority rule and performing an operation corresponding thereto or omitting or dropping an operation having a lower priority.

Hereinafter, in the disclosure, the above examples are described through a plurality of embodiments, but these are not independent and one or more embodiments may be applied simultaneously or in combination.

Embodiment 1: DCI Reception for NC-JT

Unlike the existing system, a 5G wireless communication system may support all a service requiring a high transmission rate, a service having a very short transmission delay, and a service requiring a high connection density. Coordinated transmission between each cell, TRP and/or beam in a wireless communication network including a plurality of cells, transmission and reception points (TRPs), or beams is one of element technologies that can satisfy various service requirements by increasing the intensity of a signal received by the UE or by efficiently performing interference control between each cell, TRP, and/or beam.

Joint transmission (JT) is representative transmission technology for the above-mentioned coordinated communication and may increase the intensity of the signal received by the UE by supporting one UE through different cells, TRPs or/and beams with joint transmission technology. Because characteristics of a channel between each cell, TRP or/and beam and the UE may be significantly different, it is necessary to apply different precoding, MCS, resource allocation and the like to a link between each cell, TRP or/and beam and the UE. In particular, in case of non-coherent joint transmission (NC-JT) supporting non-coherent precoding between each cell, TRP or/and beam, an individual DL transmission information configuration for each cell, TRP or/and beam is important. Such an individual DL transmission information configuration for each cell, TRP, and/or beam becomes a major factor in increasing a payload required for DL DCI transmission, which may adversely affect a reception performance of a PDCCH transmitting DCI. Therefore, it is necessary to carefully design tradeoff between an amount of DCI information and a PDCCH reception performance for JT support.

Figure 12:
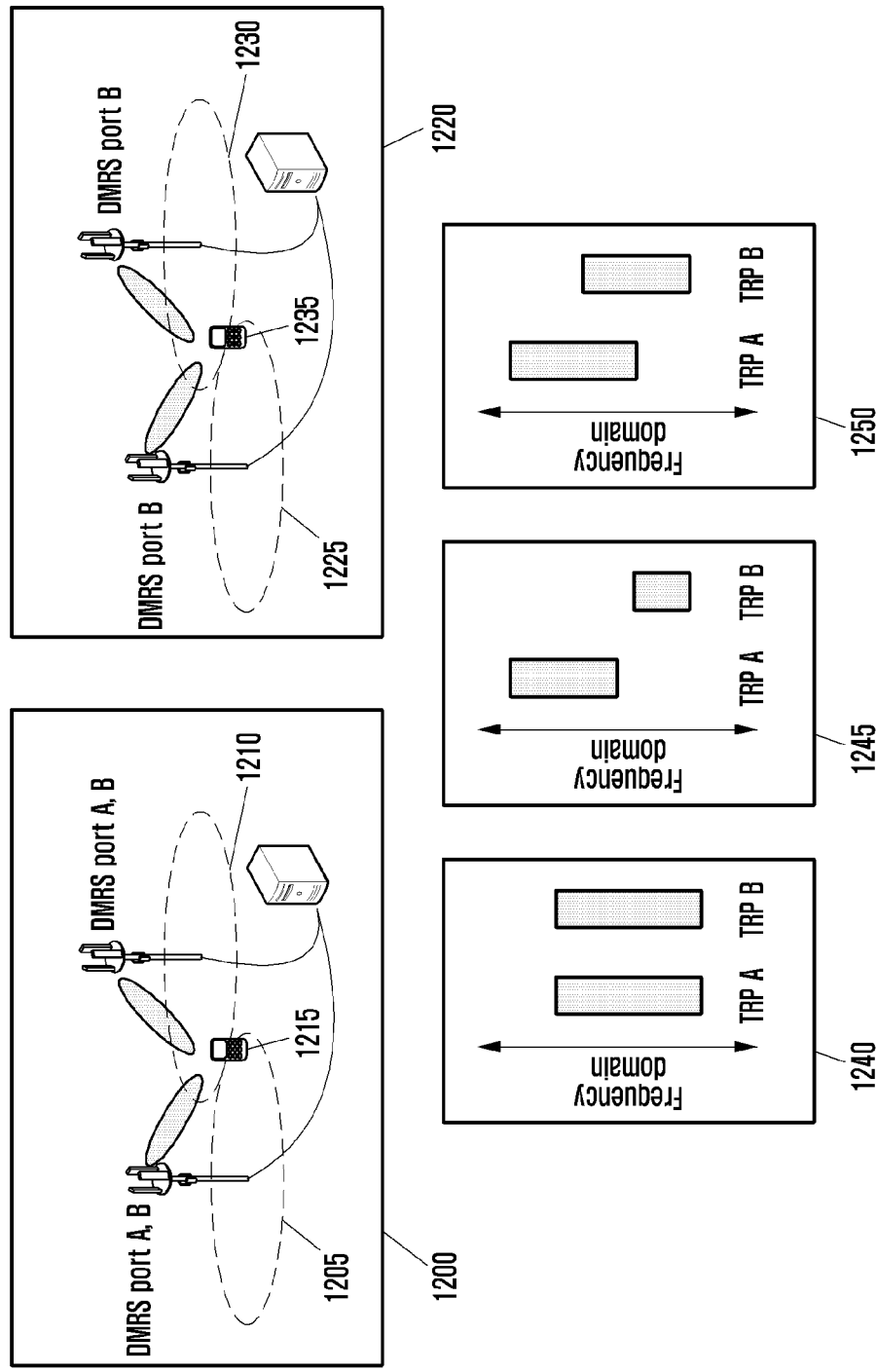
FIG. 12 is a diagram illustrating an example of an antenna port configuration and resource allocation for cooperative communication according to some embodiments in a wireless communication system according to an embodiment of the disclosure.

FIG. 12 is a diagram illustrating an example of an antenna port configuration and resource allocation for cooperative communication according to some embodiments in a wireless communication system according to an embodiment of the disclosure.

With reference to FIG. 12, examples of radio resource allocation for each TRP according to a joint transmission (JT) technique and situation are illustrated. In FIG. 12, 1200 is an example of coherent joint transmission (C-JT) supporting coherent precoding between each cell, TRP and/or beam. In the C-JT, a single data (PDSCH) is transmitted from a TRP A 1205 and a TRP B 1210 to a UE 1215, and joint precoding is performed in a plurality of TRPs. This means that the TRP A 1205 and the TRP B 1210 transmit the same DMRS ports (e.g., DMRS ports A and B in both TRPs) for PDSCH transmission. In this case, the UE may receive one DCI information for receiving one PDSCH demodulated based on a DMRS transmitted through DMRS ports A and B.

In FIG. 12, 1220 is an example of non-coherent joint transmission supporting non-coherent precoding between each cell, TRP and/or beam. In the case of NC-JT, a PDSCH is transmitted to a UE 1235 for each cell, TRP, and/or beam, and individual precoding may be applied to each PDSCH. Each cell, TRP or/and beam may transmit a different PDSCH to improve throughput compared to a single cell, TRP, or/and beam transmission, or each cell, TRP, or/and beam may repeatedly transmit the same PDSCH to improve reliability compared to a single cell, TRP, or/and beam transmission.

When frequency and time resources used by a plurality of TRPs for PDSCH transmission are all the same (1240), if the frequency and time resources used by the plurality of TRPs do not overlap at all (1245), various radio resource allocations may be considered, as in the case in which some of the frequency and time resources used by the plurality of TRPs overlap (1250). When the plurality of TRPs repeatedly transmit the same PDSCH in order to improve reliability in each case of the aforementioned radio resource allocation, if the receiving UE does not know whether the corresponding PDSCH is repeatedly transmitted, the corresponding UE cannot perform combining in a physical layer for the corresponding PDSCH; thus, there may be a limit in improving reliability. Therefore, the disclosure provides a repeated transmission instruction and configuration method for improving NC-JT transmission reliability.

In order to simultaneously allocate a plurality of PDSCHs to one UE for NC-JT support, DCIs of various forms, structures, and relationships may be considered.

Figure 13:
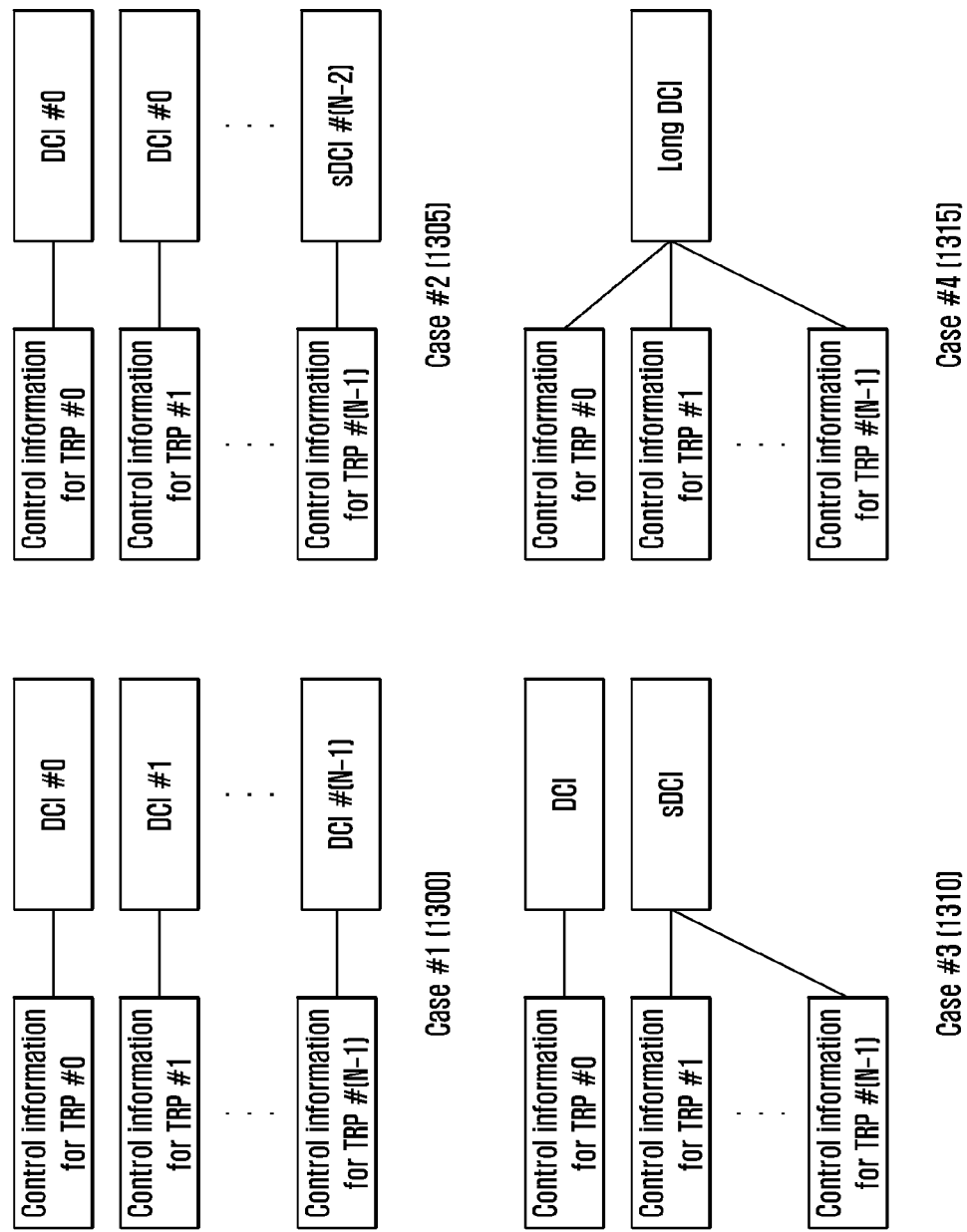
FIG. 13 is a block diagram illustrating an example of downlink control information (DCI) configuration for cooperative communication in a wireless communication system according to an embodiment of the disclosure.

FIG. 13 is a block diagram illustrating an example of downlink control information (DCI) configuration for cooperative communication in a wireless communication system according to an embodiment of the disclosure.

With reference to FIG. 13, four examples of DCI design for NC-JT support are illustrated.

With reference to FIG. 13, a case #1, 1300 is an example in which control information on a PDSCH transmitted from the (N−1) number of additional TRPs is transmitted in the same DCI format as that of control information on a PDSCH transmitted from a serving TRP in a situation in which the (N−1) number of different PDSCHs are transmitted from the (N−1) number of additional TRPs (TRP #1 to TRP #(N−1)) other than a serving TRP (TRP #0) used upon single PDSCH transmission. That is, the UE may obtain control information on PDSCHs transmitted from different TRPs (TRP #0 to TRP #(N−1)) through DCIs (DCI #0-DCW(N−1)) having the same DCI format and the same payload.

In the above-described case #1, each PDSCH control (allocation) degree of freedom may be completely guaranteed, but when each DCI is transmitted from different TRPs, a coverage difference for each DCI may occur; thus, a reception performance may be deteriorated.

A case #2, 1305 is an example in which control information on a PDSCH transmitted from the (N−1) number of additional TRPs is transmitted in a different format (different DCI format or different DCI payload) from that of control information on a PDSCH transmitted from the serving TRP in a situation in which the (N−1) number of different PDSCHs are transmitted from the (N−1) number of additional TRPs (TRP #1 to TRP #(N−1)) other than the serving TRP (TRP #0) used upon single PDSCH transmission.

For example, in the case of DCI #0, which is control information on a PDSCH transmitted from the serving TRP (TRP #0), it includes all information elements of a DCI format 1_0 to a DCI format 1_1, but in the case of shortened DCI (hereinafter, sDCI) (sDCI #0 to sDCI #(N−2)), which is control information on PDSCHs transmitted from cooperative TRP (TRP #1 to TRP #(N−1)), it may include only some of information elements of the DCI format 1_0 to the DCI format 1_1. Therefore, in the case of sDCI transmitting control information on PDSCHs transmitted from the cooperative TRP, it may have a small payload compared to normal DCI (nDCI) transmitting PDSCH-related control information transmitted from the serving TRP, or may include reserved bits as much as the number of bits lacking compared to nDCI.

In the above-described case #2, each PDSCH control (allocation) degree of freedom may be limited according to contents of information elements included in sDCI, but because a reception performance of sDCI is superior to that of nDCI, the probability of occurrence of a coverage difference for each DCI may be lowered.

A case #3, 1310 is an example in which control information on a PDSCH transmitted from the (N−1) number of additional TRPs is transmitted in a different format (different DCI format or different DCI payload) from that of control information on a PDSCH transmitted from a serving TRP in a situation in which the (N−1) number of different PDSCHs are transmitted from the (N−1) number of additional TRPs (TRP #1 to TRP #(N−1)) other than a serving TRP (TRP #0) used upon single PDSCH transmission.

For example, in the case of DCI #0, which is control information on a PDSCH transmitted from the serving TRP (TRP #0), it includes all information elements on a DCI format 1_0 to a DCI format 1_1, and in the case of control information on PDSCHs transmitted from cooperative TRP (TRP #1) to TRP #(N−1), it is possible to collect and transmit only some of information elements of the DCI format 1_0 to the DCI format 1_1 in one 'secondary' DCI (sDCI). For example, the sDCI may include at least one information of HARQ-related information such as frequency domain resource assignment of cooperative TRPs, time domain resource assignment, and MCS. Further, information not included in sDCI, such as a BWP indicator or a carrier indicator may follow DCI (DCI #0, normal DCI, nDCI) of the serving TRP.

In the case #3, each PDSCH control (allocation) degree of freedom may be limited according to contents of information element included in sDCI, but a reception performance of sDCI may be adjusted, and compared to the case #1 or the case #2, the complexity of DCI blind decoding of the UE may be reduced.

A case #4, 1315 is an example in which control information on a PDSCH transmitted from the (N−1) number of additional TRPs is transmitted from the same DCI (long DCI, lDCI) as that of control information on a PDSCH transmitted from a serving TRP in a situation in which the (N−1) number of different PDSCHs are transmitted from the (N−1) number of additional TRPs (TRP #1 to TRP #(N−1)) other than a serving TRP (TRP #0) used upon single PDSCH transmission. That is, the UE may obtain control information on PDSCHs transmitted from different TRPs (TRP #0 to TRP #(N−1)) through single DCI. In the case #4, the complexity of DCI blind decoding of the UE may not increase, but the PDSCH control (allocation) degree of freedom may be low such as the number of cooperative TRPs being limited according to long DCI payload restrictions.

In the following description and embodiments, sDCI may refer to various auxiliary DCIs, such as shortened DCI, secondary DCI, or normal DCI (the above-described DCI formats 1_0 to 1_1) including PDSCH control information transmitted from cooperative TRP, and when no particular limitation is specified, the description is similarly applicable to the various auxiliary DCIs.

In the following description and embodiments, the aforementioned case #1, case #2, and case #3 in which one or more DCI (PDCCH) are used for supporting NC-JT are divided into a plurality of PDCCH-based NC-JTs, and the above-described case #4 in which a single DCI (PDCCH) is used for NC-JT support may be divided into a single PDCCH-based NC-JT.

In embodiments of the disclosure, cooperative TRP may be replaced with various terms such as a cooperative panel or a cooperative beam when applied in practice.

In the embodiments of the disclosure, "when NC-JT is applied" may be interpreted variously according to the situation such as "when the UE receives one or more PDSCHs at the same time in one BWP", "when the UE receives a PDSCH based on two or more TCI indications at the same time in one BWP", and "when a PDSCH received by the UE is associated with one or more DMRS port groups", but it is used as one expression for convenience of description.

In the disclosure, a radio protocol structure for NC-JT may be used in various ways according to a TRP deployment scenario. As an example, when there is no or small backhaul delay between cooperative TRPs, it is possible to use a structure based on MAC layer multiplexing similar to 1110 of FIG. 11 (CA-like method). However, when a backhaul delay between cooperative TRPs is so large that it cannot be ignored (e.g., when a time of 2 ms or more is required for information exchange such as CSI, scheduling, and HARQ-ACK between cooperative TRPs), similar to 1120 of FIG. 11, it is possible to secure a characteristic strong against delay using an independent structure for each TRP from an RLC layer (DC-like method).

Embodiment 1-1: Method of Configuring a Downlink Control Channel for Transmitting a Plurality of PDCCH-Based NC-JTs In a plurality of PDCCH-based NC-JTs, when transmitting DCI for scheduling a PDSCH of each TRP, it may have a CORESET or a search space divided for each TRP. The CORESET or search space for each TRP may be configured as in at least one of the following cases.

- Higher layer index configuration for each CORESET: CORESET configuration information configured to the higher layer may include an index value, and the TRP for transmitting a PDCCH from the corresponding CORESET may be distinguished by the configured index value for each CORESET. That is, in a set of CORESETs having the same higher layer index value, it may be regarded that the same TRP transmits a PDCCH or that a PDCCH scheduling a PDSCH of the same TRP is transmitted.
- A plurality of PDCCH-Config configurations: a plurality of PDCCH-Configs in one BWP are configured, and each PDCCH-Config may include a PDCCH configuration for each TRP. That is, a list of CORESETs for each TRP and/or a list of search spaces for each TRP may be configured in one PDCCH-Config, and it may be regarded that one or more CORESETs and one or more search spaces included in one PDCCH-Config correspond to a specific TRP.
- CORESET beam/beam group configuration: a TRP corresponding to the corresponding CORESET may be distinguished through a beam or beam group configured for each CORESET. For example, when the same TCI state is configured to a plurality of CORESETs, it may be regarded that the CORESETs are transmitted through the same TRP or that a PDCCH scheduling a PDSCH of the same TRP is transmitted in the corresponding CORESETs.
- Search space beam/beam group configuration: a beam or beam group is configured for each search space, and therefore a TRP for each search space may be distinguished. For example, when the same beam/beam group or TCI state is configured in a plurality of search spaces, it may be regarded that the same TRP transmits a PDCCH in the corresponding search space or that a PDCCH scheduling a PDSCH of the same TRP is transmitted in the corresponding search space.

As described above, by dividing the CORESET or search space for each TRP, PDSCH and HARQ-ACK information classification for each TRP is possible, and therefore independent HARQ-ACK codebook generation for each TRP and independent PUCCH resource use are possible.

Embodiment 2: HARQ-ACK Information Delivery Method for NC-JT Transmission

The following embodiment provides a detailed method of delivering HARQ-ACK information on NC-JT transmission.

FIGS. 14 to 17 are diagrams illustrating HARQ-ACK information delivery methods according to various DCI configurations and PUCCH configurations for NC-JT transmission.

Figure 14:
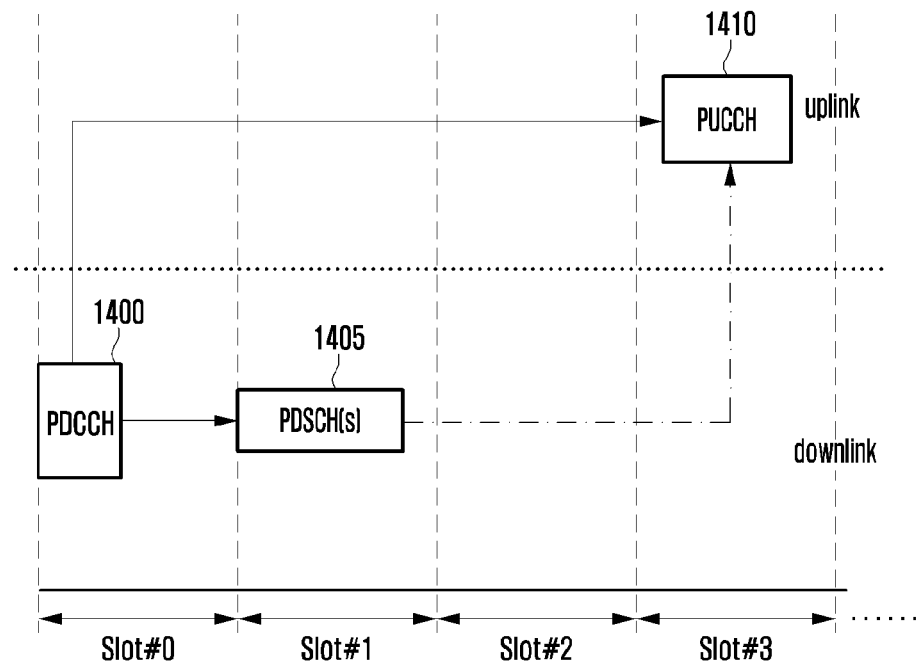
FIG. 14 is a diagram illustrating a HARQ-ACK information delivery method when a single PDCCH is used for NC-JT transmission.

First, FIG. 14 is a diagram illustrating an example in which HARQ-ACK information is transmitted in the case of a single PDCCH-based NC-JT. With reference to FIG. 14, HARQ-ACK information on one or a plurality of PDSCHs 1405 scheduled by a TRP through a single PDCCH 1400 is transmitted through one PUCCH resource 1410. The PUCCH resource may be indicated through the above-described PRI value and K1 value in DCI.

Figure 15:
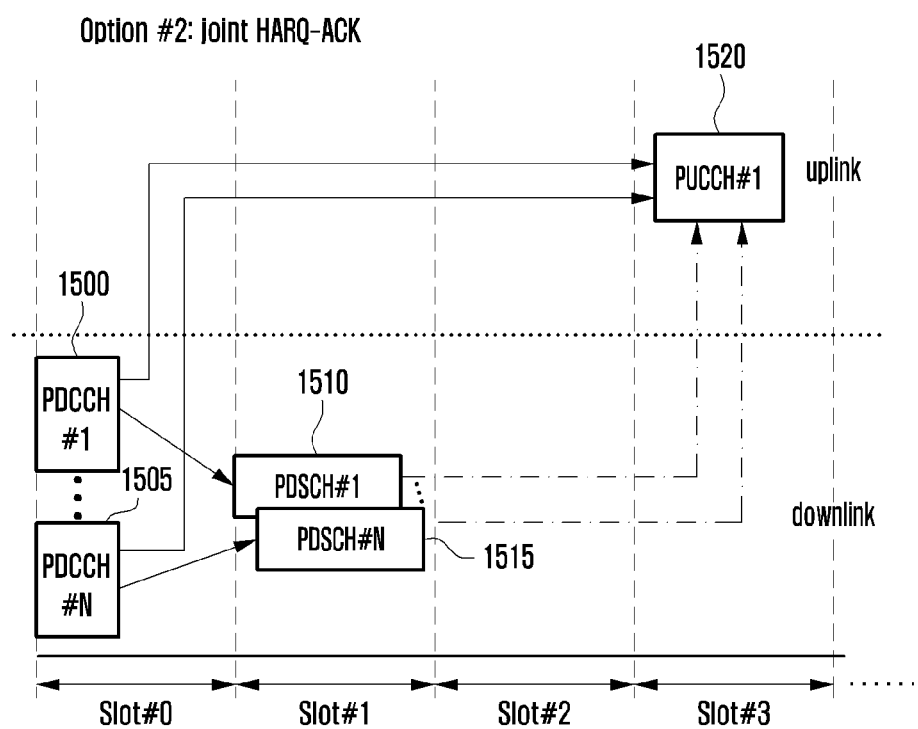
FIG. 15 is a diagram illustrating a joint HARQ-ACK information delivery method when a multi-PDCCH is used for NC-JT transmission.
Figure 16:
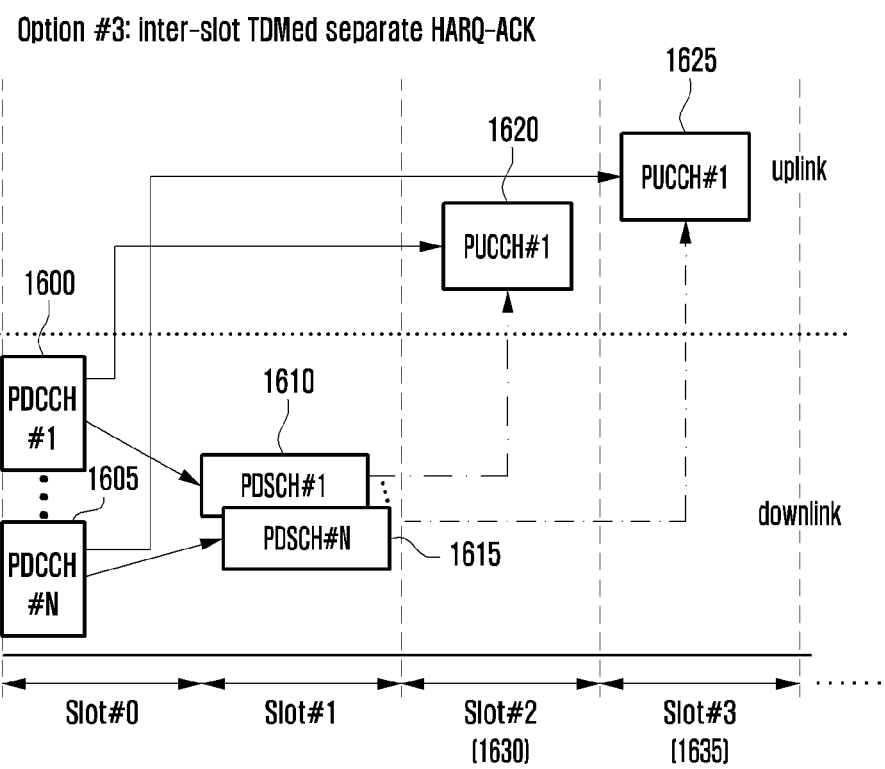
FIG. 16 is a diagram illustrating an inter-slot time division multiplexed HARQ-ACK information delivery method when a multi-PDCCH is used for NC-JT transmission.
Figure 17:
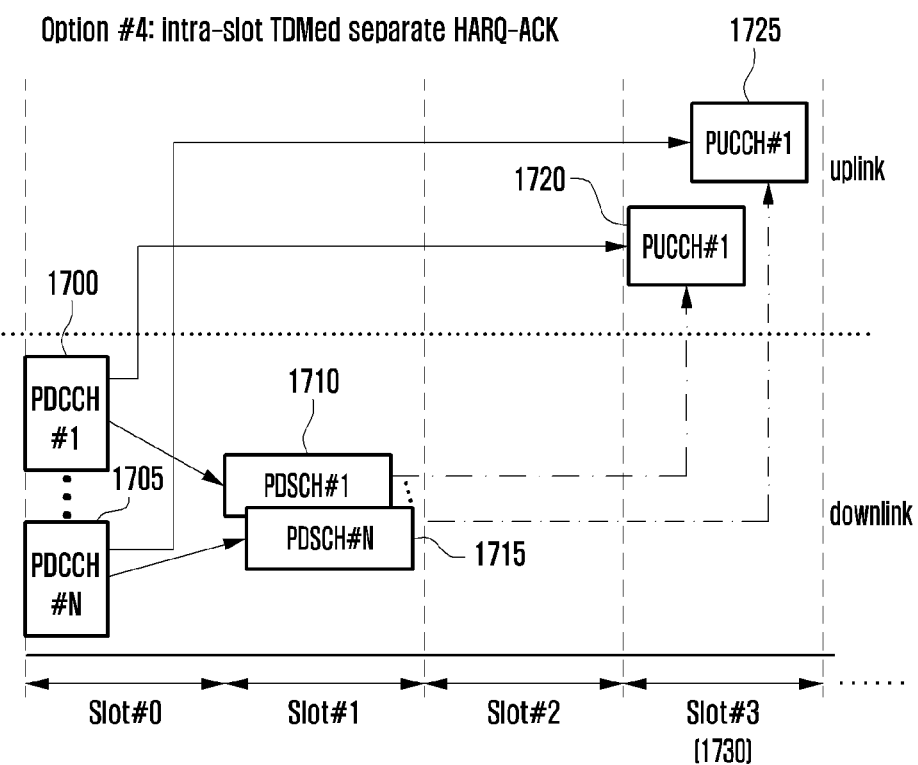
FIG. 17 is a diagram illustrating an intra-slot time division multiplexed HARQ-ACK information delivery method when a multi-PDCCH is used for NC-JT transmission.

FIGS. 15 to 17 are diagrams illustrating a case of a plurality of PDCCH-based NC-JTs. In this case, a case of each drawing may be divided according to the number of PUCCH resources to transmit HARQ-ACK information corresponding to a PDSCH of each TRP and a position of the PUCCH resources on the time axis.

FIG. 15 is a diagram illustrating an example in which HARQ-ACK information is transmitted through one PUCCH resource in the case of a plurality of PDCCH-based NC-JTs. With reference to FIG. 15, the UE may transmit HARQ-ACK information corresponding to PDSCHs 1510 and 1515 of each TRP scheduled by a plurality of PDCCHs 1500 and 1505 through one PUCCH resource 1520. In this case, all HARQ-ACK information for each TRP may be generated based on a single HARQ-ACK codebook or HARQ-ACK information for each TRP may be generated based on an separate HARQ-ACK codebook. In this case, HARQ-ACK information for each TRP may be concatenated and transmitted in one PUCCH resource.

When an separate HARQ-ACK codebook for each TRP is used, the TRP may be divided into at least one of a set of CORESETs having the same higher layer index, a set of CORESETs belonging to the same TCI state, beam, or beam group, or a set of search spaces belonging to the same TCI state, beam, or beam group, as defined in Embodiment 1-1.

FIG. 16 is a diagram illustrating an example in which PUCCH resources for transmitting HARQ-ACK information are positioned in different slots in the case of a plurality of PDCCH-based NC-JTs. With reference to FIG. 16, the UE may transmit HARQ-ACK information corresponding to PDSCHs 1610 and 1615 of each TRP scheduled by a plurality of PDCCHs 1600 and 1605 through PUCCH resources 1620 and 1625 of different slots 1630 and 1635, respectively. A slot in which the PUCCH resource for each TRP is transmitted may be determined by the above-described K1 value. When the K1 value indicated by a plurality of PDCCHs indicates the same slot, it is regarded that all of the corresponding PDCCHs are transmitted in the same TRP, and all HARQ-ACK information corresponding to the PDCCHs may be transmitted. In this case, HARQ-ACK information concatenated in one PUCCH resource positioned in the same slot may be transmitted to the TRP.

FIG. 17 is a diagram illustrating an example in which HARQ-ACK information is transmitted through PUCCH resources positioned in one slot in the case of a plurality of PDCCH-based NC-JTs. With reference to FIG. 17, the UE may transmit HARQ-ACK information corresponding to PDSCHs 1710 and 1715 of each TRP scheduled by a plurality of PDCCHs 1700 and 1705 in different symbols within the same slot 1730 through different PUCH resources 1720 and 1725, respectively. A slot in which the PUCCH resource for each TRP is transmitted may be determined by the aforementioned K1 value, and when the value K1 indicated by a plurality of PDCCHs indicates the same slot, the UE may select a PUCCH resource and determine a transmission symbol through at least one of the following methods.

PUCCH Resource Group Configuration for Each TRP

A PUCCH resource group for HARQ-ACK transmission for each TRP may be configured. As in Embodiment 1-1, when a TRP for each CORESET and/or search space is divided, a PUCCH resource for HARQ-ACK transmission for each TRP may be selected within the PUCCH resource group for the TRP. TDM may be expected between PUCCH resources selected from different PUCCH resource groups, that is, it may be expected that the selected PUCCH resources do not overlap in units of symbols (within the same slot). After generating a separate HARQ-ACK codebook for each TRP, the UE may transmit the separate HARQ-ACK codebook in the PUCCH resource selected for each TRP, as described above.

Different PRI Indications for Each TRP

As in Embodiment 1-1, when TRPs for each CORESET and/or search space are distinguished, a PUCCH resource for each TRP may be selected according to the PM. That is, the above-described PUCCH resource selection process may be independently performed for each TRP. In this case, the PRIs used for determining a PUCCH resource for each TRP should be different from each other. For example, the UE may not expect that the PRI used for determining the PUCCH resource for each TRP is indicated with the same value. For example, the PDCCH for TRP 1 may include a PM configured to PRI=n, and the PDCCH for TRP 2 may include a PM configured to PRI=m. Further, TDM may be expected between PUCCH resources indicated by the PRI for each TRP. That is, it may be expected that the selected PUCCH resources do not overlap in units of symbols (within the same slot). As described above, a separate HARQ-ACK codebook for each TRP may be generated in the PUCCH resource selected for each TRP and then transmitted.

Define a Value K1 in Units of Subslots

The above-described PUCCH resource selection process may be followed, but the value K1 may be defined in units of subslots. For example, the UE may generate a HARQ-ACK codebook for PDSCH/PDCCHs indicated to report HARQ-ACK in the same subslot, and then transmit the HARQ-ACK codebook to the PUCCH resource indicated by a PM. A process of generating the HARQ-ACK codebook and selecting the PUCCH resource may be independent of whether the TRP is divided for each CORESET and/or search space.

When the UE supports NC-JT reception, one of the above options may be configured through a higher layer or may be implicitly selected according to a situation. For example, a UE supporting a plurality of PDCCH-based NC-JTs may configure one of options of FIGS. 15 to 17 through a higher layer. As another example, according to whether a single PDCCH-based NC-JT or a plurality of PDCCH-based NC-JTs are supported/configured, the former may select an option of FIG. 14 and the latter may select one of options of FIGS. 16 to 17.

As another example, an option to be used in a plurality of PDCCH-based NC-JTs may be determined according to a selection of a PUCCH resource. When PUCCH resources of the same slot correspond to different TRPs, if the corresponding PUCCH resources are different and do not overlap in units of symbols, HARQ-ACK is transmitted according to the option of FIG. 17 and the PUCCH resources overlap in units of symbols or if the assigned symbols are the same, HARQ-ACK may be transmitted according to the option of FIG. 15. When PUCCH resources of different slots are selected in different TRPs, HARQ-ACK may be transmitted according to the option of FIG. 16.

The configuration of the option may be dependent on the UE capability. For example, the base station may receive the capability of the UE according to the above-described procedure, and configure the option based thereon. For example, only the UE having a capability supporting intra-slot TDMed separate HARQ-ACK that is time division multiplexed in the slot is allowed to configure the option of FIG. 17 and the UE that does not have the corresponding capability may not expect the configuration according to the option of FIG. 17.

Figure 18:
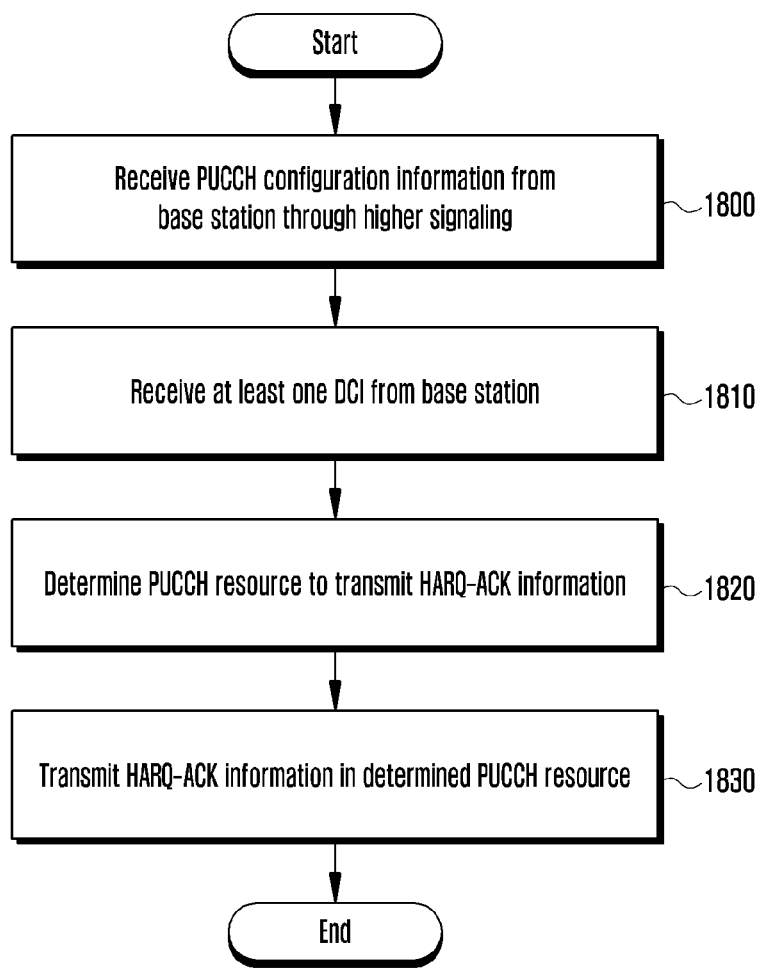
FIG. 18 is a flowchart illustrating an example of a method in which a terminal transmits HARQ-ACK information for NC-JT transmission to a base station.

FIG. 18 is a flowchart illustrating an example of a method in which a UE transmits HARQ-ACK information on NC-JT transmission to a base station. With reference to FIG. 18, the UE (not illustrated) may transmit a capability for the above-described option to the base station with a UE capability, and the base station may explicitly configure which option is applied to the UE based on capability information transmitted by the UE or may implicitly apply a specific option. The UE may receive PUCCH configuration information from the base station through higher signaling (step 1800). The PUCCH configuration information may include at least one of information related to Tables 19, 20, 27, 28, and includes at least one of PUCCH group configuration information and information for configuring the relationship between PRI and PUCCH resources illustrated in Table 24, and information for configuring candidates of a value K1 of Table 19. Thereafter, the UE receives DCI scheduling downlink data from the base station on the PDCCH (which may be mixed with PDCCH reception) (step 1810), and determine a PUCCH resource to transmit the HARQ-ACK by identifying a HARQ-ACK payload to be transmitted according to the above-described method based on the applied option and a PDSCH-to-HARQ feedback timing indicator and the PM included in the DCI (step 1820). Thereafter, the UE transmits HARQ-ACK information in the determined PUCCH resource (step 1830).

Not all steps of the above-described method have to be performed, and specific steps may be omitted or performed in different order.

Figure 19:
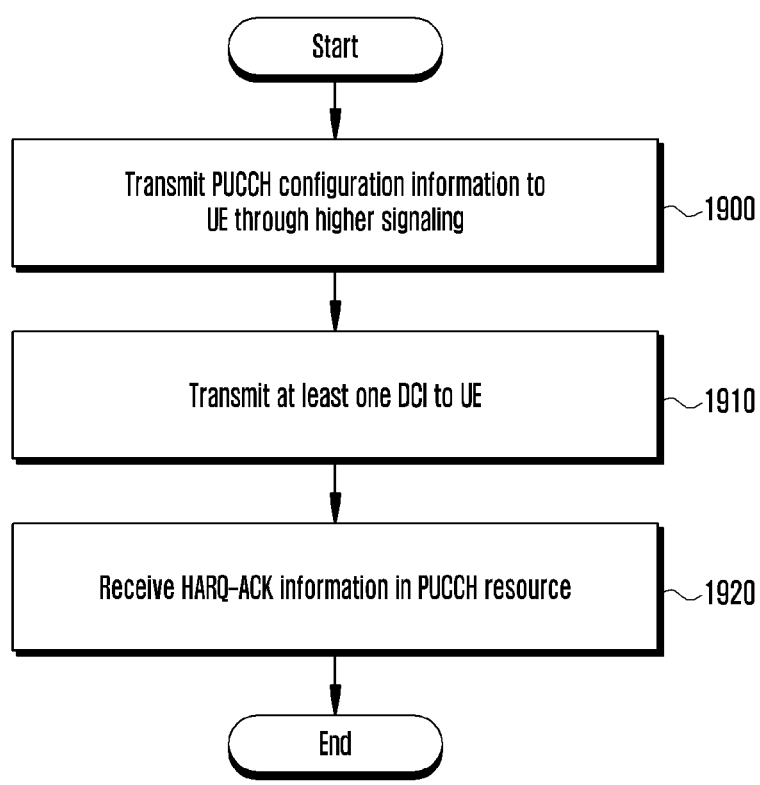
FIG. 19 is a flowchart illustrating an example of a method in which a base station receives HARQ-ACK information for NC-JT transmission from a terminal.

FIG. 19 is a flowchart illustrating an example of a method in which a base station receives HARQ-ACK information on NC-JT transmission from a UE. With reference to FIG. 19, the base station (not illustrated) may receive a UE capability for the above-described option transmitted by the UE, and explicitly configure which option is applied to the UE based on capability information transmitted by the UE or may enable a specific option to be implicitly applied. The base station may transmit PUCCH configuration information to the UE through higher signaling (step 1900). The PUCCH configuration information may include at least one of Tables 19, 20, 27, 28, and include at least one of PUCCH group configuration information, information configuring the relationship between a PRI and PUCCH resources illustrated in Table 24, and information configuring candidates of a K1 value of Table 19. Thereafter, the base station transmits DCI scheduling downlink data to the UE on the PDCCH (which may be mixed with PDCCH transmission) (step 1910), and the UE determines a PUCCH resource to transmit a HARQ-ACK by identifying a HARQ-ACK payload to be transmitted according to the above-described method based on the applied option, a PRI and a PDSCH-to-HARQ feedback timing indicator included in the DCI. Thereafter, the UE transmits HARQ-ACK information in the determined PUCCH resource, and the base station receives HARQ-ACK information in the PUCCH resource determined in the same method (step 1920).

Not all steps of the above-described method have to be performed, and specific steps may be omitted or performed in different order.

Embodiment 3: Repeated PUCCH Transmission Method to a Plurality of TRPs

As an example of a method in which the UE supports or determines repeated PUCCH transmission to a plurality of TRPs, the UE may report a capability for repeated PUCCH transmission to the base station. In this case, the capability of the UE may be an indicator for repeated PUCCH transmission to a plurality of TRPs. In this case, the corresponding repeated transmission may be classified into repeated transmission in units of slots or repeated transmission in units of symbols crossing a slot boundary. In this case, the capability of the UE may indicate whether each of repeated transmission in units of slots and repeated transmission in units of symbols crossing the slot boundary is possible. Additionally, a method in which the UE supports or determines repeated PUCCH transmission to a plurality of TRPs may be performed based on condition or configuration information in consideration of at least one of the following conditions or configuration information.

PUCCH resource and PUCCH resource group (PUCCH resource group) configuration
  PUCCH-spatialRelationInfo information
  PUCCH-pathlossReferenceRS information
  Start PRB or frequency hopping information in the PUCCH resource In this case, the PUCCH resource group may be configured with a plurality of PUCCH resources, all PUCCH resources in the PUCCH resource group may be configured to the same information of some configuration information, and be configured differently for each PUCCH resource in the PUCCH resource group for some configuration information. Information capable of having the same or different configuration information for all PUCCH resources in the PUCCH resource group may include spatialRelationInfo, pathlossReferenceRS, start PRB point, frequency hopping information, and the like, as described above.

The UE may be configured to a plurality of PUCCH transmissions using one PUCCH resource or a PUCCH resource group for repeated PUCCH transmission to a plurality of TRPs. In other words, the UE may obtain configuration information on repeated PUCCH transmission to a plurality of TRPs using configuration information on one PUCCH resource or PUCCH resource group.

As an example, the UE may be configured to a plurality of PUCCH-spatialRelationInfos for one PUCCH resource or a PUCCH resource group to configure a plurality of PUCCH transmission beams. In this case, when activating PUCCH-spatialRelationInfo of a specific PUCCH resource using an MAC CE, the base station may activate two or more PUCCH-spatialRelationInfo per PUCCH resource through the MAC-CE to configure a plurality of PUCCH transmission beams. As another example, the base station may configure two or more referenceSignals in PUCCH-spatialRelationInfo for one PUCCH resource to configure a plurality of PUCCH transmission beams corresponding to each referenceSignal. In this case, when the base station activates PUCCH-spatialRelationInfo using the MAC CE, the base station may activate one PUCCH-spatialRelationInfo per PUCCH resource through the MAC CE to configure PUCCH transmission beams corresponding to two referenceSignals.

As another example, the UE may be configured a referenceSignal value in the PUCCH-spatialRelationInfo for one PUCCH resource to one of a plurality of configurations in which two reference signals form a pair, as in {SSB #1, SSB #2}, {SSB #1, CSI-RS #1}, {SSB #1, SRS #1}, . . . . In this case, in each repeated transmission, a PUCCH transmission beam according to a different reference signal may be applied to transmission of the even-numbered number of repeated transmissions and transmission of the odd-numbered number of repeated transmissions. In this case, the base station may activate a plurality of PUCCH-spatialRelationInfo per PUCCH resource using a MAC-CE, as described above.

As another example, the UE may be configured a referenceSignal value in the PUCCH-spatialRelationInfo for one PUCCH resource to one of a plurality of configurations in which reference signals as many as the number of repeated transmissions constitute a set, as in {SSB #1, CSI-RS #1, SRS #1, . . . }, . . . . In this case, the base station may activate a plurality of PUCCH-spatialRelationInfo per PUCCH resource using a MAC-CE, as described above.

Further, the UE may be configured to a plurality of PUCCH-pathlossReferenceRSs for one PUCCH resource or PUCCH resource group and use the plurality of PUCCH-pathlossReferenceRSs for power control upon transmitting a plurality of PUCCHs. In this case, upon PUCCH repetition and simultaneous transmission to a plurality of TRPs, the UE may perform uniform power control using all of the plurality of configured PUCCH-pathlossReferenceRSs. Further, during repeated PUCCH transmission to a plurality of TRPs, the UE may select a PUCCH-pathlossReferenceRS that achieves a maximum RSRP value among a plurality of configured PUCCH-pathlossReferenceRS and use the PUCCH-pathlossReferenceRS for power control. In addition to this, all methods of operating, configuring, and determining the above PUCCH-spatialRelationInfo may be considered as a method of operating, configuring, and determining a plurality of pathlossReferenceRS.

Further, the UE may configure a plurality of starting PRB information such as startingPRB or secondHopPRB and a plurality of frequency hopping information such as intraSlotFrequencyHopping or InterslotFrequencyHopping to one PUCCH resource or PUCCH resource group. In this case, the frequency hopping information may be the same or different for a plurality of PUCCH resources in one PUCCH resource group. In this case, it is not impossible to simultaneously configure intraSlotFrequencyHopping and InterslotFrequencyHopping to one PUCCH resource or PUCCH resource group, and when two pieces of information are simultaneously configured, only one piece of information may be configured to one TRP of a plurality of TRPs. In addition to this, all methods of operating, configuring, and determining the above PUCCH-spatialRelationInfo and PUCCH-pathlossReferenceRS may be considered as a method for operating, configuring, and determining a plurality of start PRBs or frequency hopping information.

Further, the UE may obtain configuration information on repeated PUCCH transmission using a configuration of a plurality of PUCCH resources or PUCCH resource groups for repeated PUCCH transmission to a plurality of TRPs. In other words, the UE may obtain configuration information on repeated PUCCH transmission for each TRP through configuration information on each PUCCH resource or PUCCH resource group. In this case, the configuration information in the PUCCH resource or the PUCCH resource group may be the same as that of current NR release 15, and as described above, PUCCH-spatialRelationInfo, PUCCH-pathlossReferenceRS, a start PRB, or frequency hopping information may exist for a plurality of PUCCH resources and PUCCH resource groups.

As an example, when the UE is configured to use two PUCCH resources or PUCCH resource groups for repeated PUCCH transmission, the UE may perform PUCCH transmission using a configuration of one PUCCH resource or PUCCH resource group in an even-numbered index of repeated PUCCH transmission, and perform PUCCH transmission using a configuration of the remaining one PUCCH resource or PUCCH resource group in an odd-numbered index.

Figure 20:
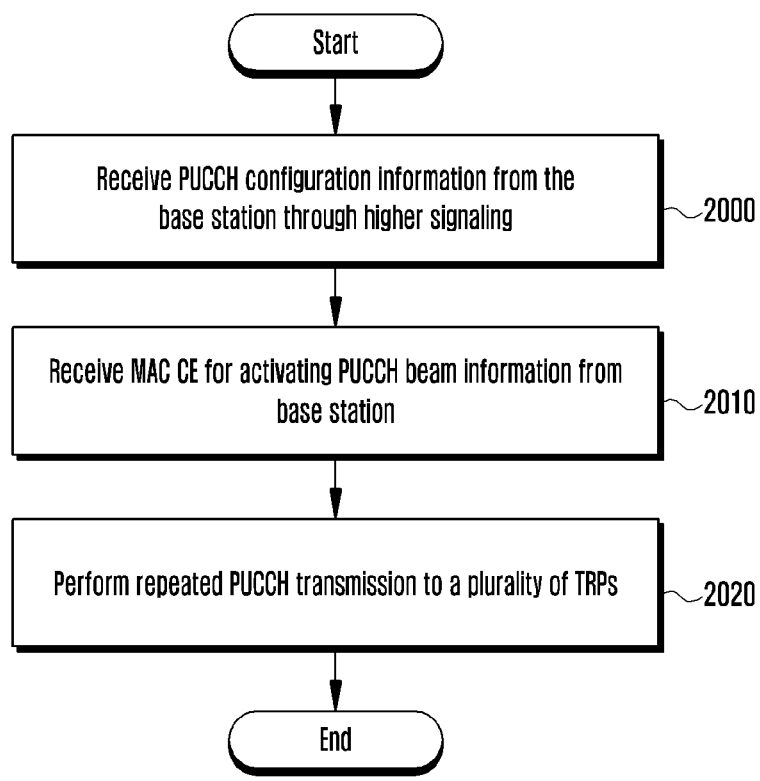
FIG. 20 is a flowchart illustrating an example of a method in which a terminal repeatedly transmits a PUCCH to a plurality of TRPs.

FIG. 20 is a flowchart illustrating an example of a method in which the UE repeatedly transmits a PUCCH to a plurality of TRPs. With reference to FIG. 20, the UE (not illustrated) may report a capability for repeated PUCCH transmission with a UE capability. The details of the capability are as described above. Upon receiving the UE capability, the base station transmits PUCCH configuration information to the UE through higher signaling, and the UE receives the PUCCH configuration information (step 2000). The PUCCH configuration information may include at least one information of Tables 19, 20, 27, and 28 and include at least one of a PUCCH resource and/or a PUCCH resource group configuration, PUCCH-spatialRelationInfo information capable of indicating a plurality of TRPs, a plurality of PUCCH-pathlossReferenceRS information, or frequency hopping information or a start PRB in a plurality of PUCCH resources, as described above, for PUCCH transmission to a plurality of TRPs.

Thereafter, the UE receives a MAC CE for activating PUCCH-spatialRelationInfo from the base station (step 2010), and the MAC CE may indicate a plurality of PUCCH-spatialRelationInfo. Upon receiving the PUCCH configuration information and/or the MAC CE, the UE may sequentially or alternately apply a PUCCH transmission beam corresponding to each TRP to transmit the PUCCH, and control PUCCH transmission power using at least some of the plurality of PUCCH-pathlossReferenceRSs according to the above-described method (step 2020).

Not all steps of the above-described method have to be performed, and specific steps may be omitted or performed in different order.

Figure 21:
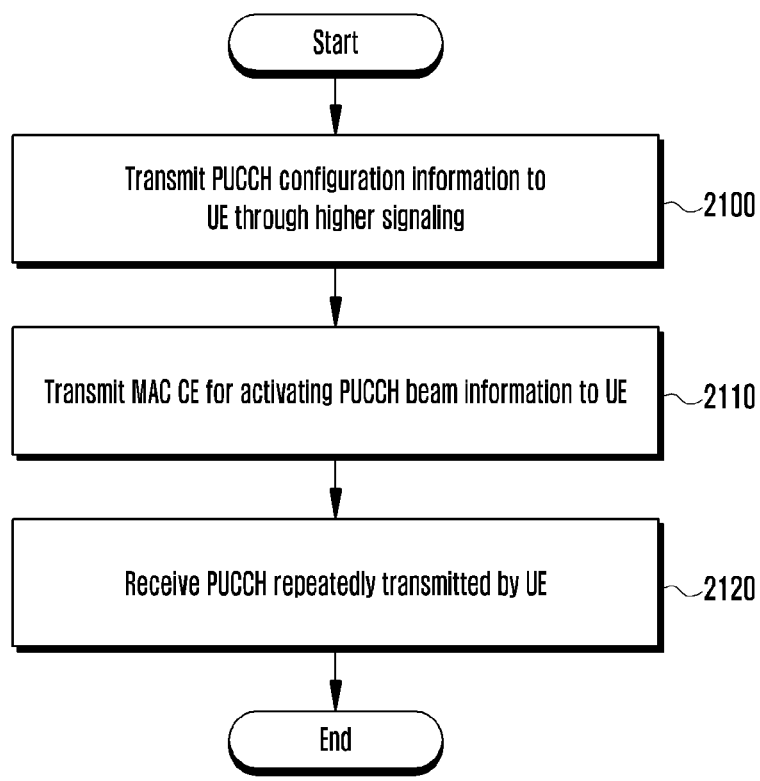
FIG. 21 is a flowchart illustrating an example of a method in which a base station receives a PUCCH repeatedly transmitted by a terminal to a plurality of TRPs.

FIG. 21 is a flowchart illustrating an example of a method in which a base station receives a PUCCH repeatedly transmitted by a UE to a plurality of TRPs. With reference to FIG. 21, the base station (not illustrated) may receive a UE capability for repeated PUCCH transmission reported by the UE. The details of the capability are as described above. Upon receiving the UE capability, the base station transmits PUCCH configuration information to the UE through higher signaling (step 2100). The PUCCH configuration information may include at least one information of Tables 19, 20, 27, 28, and include at least one of a PUCCH resource and/or a PUCCH resource group configuration, PUCCH-spatialRelationInfo information capable of indicating a plurality of TRPs, a plurality of PUCCH-pathlossReferenceRS information, or frequency hopping information or a start PRB in a plurality of PUCCH resources, as described above for PUCCH transmission to a plurality of TRPs.

Thereafter, the base station transmits a MAC CE for activating PUCCH-spatialRelationInfo to the UE (step 2110), and the MAC CE may indicate a plurality of PUCCH-spatialRelationInfo. Upon receiving the PUCCH configuration information and/or MAC CE, the UE may sequentially or alternately apply a PUCCH transmission beam corresponding to each TRP to transmit the PUCCH, and control PUCCH transmission power using at least some of the plurality of PUCCH-pathlossReferenceRSs according to the above-described method. The base station receives the PUCCH repeatedly transmitted by the UE (step 2120)

Not all steps of the above-described method have to be performed, and specific steps may be omitted or performed in different order.

Figure 22:
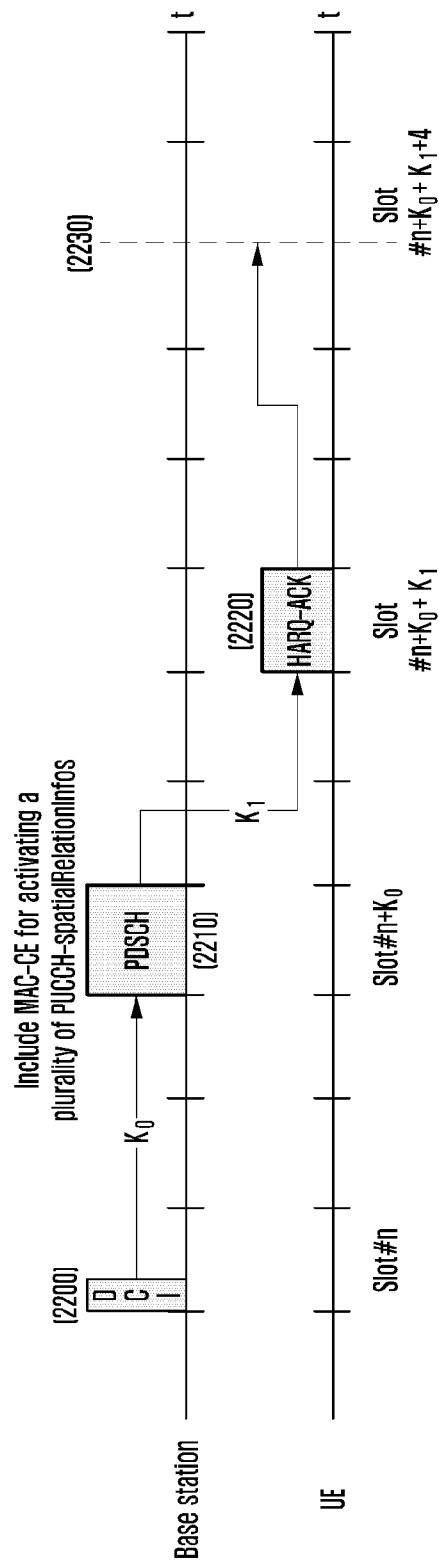
FIG. 22 is a diagram illustrating an example of a method of activating a plurality of PUCCH-spatialRelationInfos with a MAC CE according to some embodiments.

FIG. 22 is a diagram illustrating an example of a method of activating a plurality of PUCCH-spatialRelationInfos with a MAC CE according to some embodiments. The base station may schedule the PDSCH through DCI 2200 to the UE, and transmit a MAC CE indicating activation of a plurality of PUCCH-spatialRelationInfos to the UE through a corresponding PDSCH 2210. The UE may apply activation of a plurality of PUCCH-spatialRelationInfos from a first slot after 3 slots 2230 from a slot in which a HARQ-ACK 2220 for the PDSCH is transmitted.

As an example, when the base station instructs to activate a plurality of PUCCH-spatialRelationInfo in one PUCCH resource through a MAC-CE, the corresponding MAC CE may include one PUCCH resource Id and a bitmap indicating a plurality of PUCCH-spatialRelationInfo or an index of a combination indicating a plurality of PUCCH spatialRelationInfos. As another example, when the base station instructs to activate one PUCCH-spatialRelationInfo per a plurality of PUCCH resources through a MAC-CE, the corresponding MAC CE may include a plurality of PUCCH resource IDs and a bitmap indicating a plurality of PUCCH-spatialRelationInfos or an index of combination indicating a plurality of PUCCH-spatialRelationInfo.

Embodiment 4: Repeated PUSCH Transmission Method for a Plurality of TRPs

As an example of a method in which the UE supports or determines repeated PUSCH transmission for a plurality of TRPs, the UE may report a capability for repeated PUSCH transmission to the base station. In this case, the capability of the UE may be an indicator for repeated PUSCH transmission to a plurality of TRPs. In this case, the corresponding repeated transmission may be classified into repeated transmission in units of slots or repeated transmission in units of symbols crossing a slot boundary. In this case, the capability of the UE may indicate whether each of repeated transmission in units of slots and repeated transmission in units of symbols crossing the slot boundary is possible. Further, it may be distinguished whether the repeated transmission is transmission through dynamic scheduling through DCI or a semi-static configuration through a configured grant.

When PUSCH transmission is scheduled through a DCI format 0_0, the UE may not support repeated PUSCH transmission. When the UE is scheduled to repeated PUSCH transmission to a plurality of TRPs through the DCI format 0_0, the UE may configure a plurality of transmission beams for the repeated PUSCH transmission, and a method of configuring the plurality of PUSCH transmission beams may follow at least one of the following methods.

Method 1: The UE configures a plurality of PUSCH transmission beams based on PUCCH-spatialRelationInfo configured to a PUCCH resource of a lowest index in which the plurality of PUCCH-spatialRelationInfos are configured.

Method 2: The UE configures a plurality of PUSCH transmission beams based on PUCCH-spatialRelationInfo configured to the PUCCH resource used in the most recent PUCCH transmission situation or a PUCCH transmission situation that occurs closest to repeated PUSCH transmission before repeated PUSCH transmission among PUCCH resources in which a plurality of PUCCH-spatialRelationInfos are configured.

Method 3: The UE configures a plurality of PUSCH transmission beams based on PUCCH-spatialRelationInfo corresponding to PUCCH resources as many as the number of repeated transmissions from a lowest index among PUCCH resources in which one PUCCH-spatialRelationInfo is configured.

Method 4: The UE configures a plurality of PUSCH transmission beams based on a plurality of PUCCH-spatialRelationInfolds irrespective of PUCCH resources, and the certain number of information from a low ID among PUCCH-spatialRelationInfolds may be used or the certain number of information from a high ID may be used.

Method 5: A type and order of transmission beams to be used upon repeated PUSCH transmission are configured through higher layer signaling.

In this case, the UE may not expect to be scheduled to the DCI format 0_0 in a BWP in which PUCCH-spatialRelationInfo is not configured.

Figure 23A:
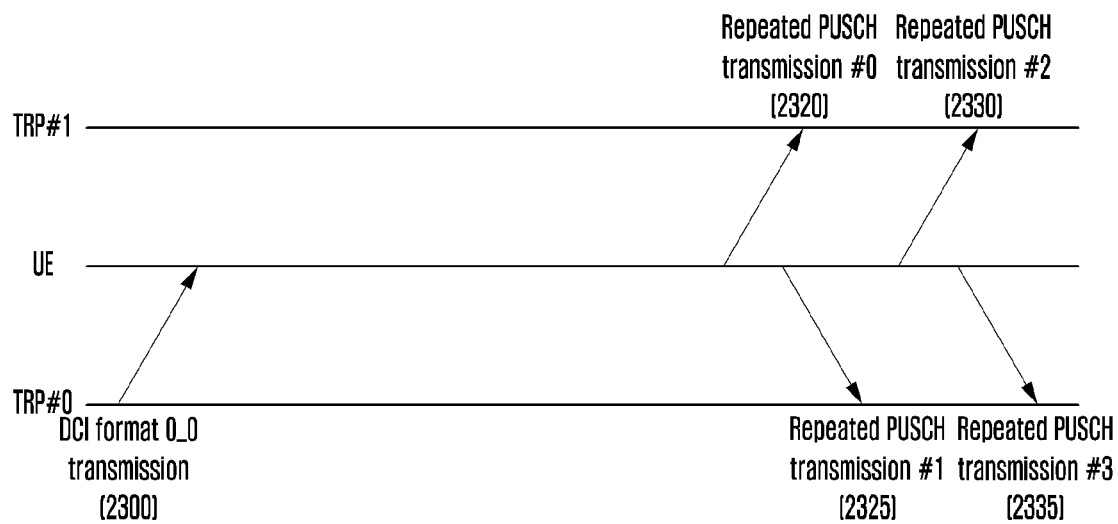
FIG. 23A is a diagram illustrating an example of a method of repeatedly transmitting a PUSCH based on a DCI format 0_0 of a terminal according to some embodiments.
Figure 23A:
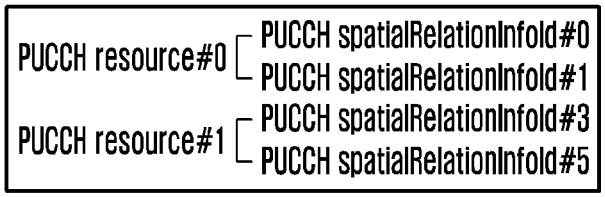

FIG. 23A is a diagram illustrating an example of a method of repeatedly transmitting a PUSCH based on a DCI format 0_0 of a UE according to some embodiments.

With reference to FIG. 23A, there is illustrated a method of selecting a PUSCH transmission beam based on a PUCCH resource of a lowest index in which two PUCCH-spatialRelationInfos are configured when the UE repeatedly transmits a PUSCH based on a DCI format 0_0. In FIG. 23A, two TRPs and total four repeated PUSCH transmissions (transmit twice to each TRP) are assumed, and it was assumed that the UE receives one DCI format 0_0 in the plurality of TRPs (2300). The UE may have a plurality of PUCCH resource configurations 2310 in which two PUCCH-spatialRelationInfos are configured through higher signaling. In an example of FIG. 23A, because two PUCCH-spatialRelationInfos are configured based on PUCCH-spatialRelationInfo information of a lowest index among the configured PUCCH resources, the UE may configure a PUSCH transmission beam based on PUCCH-spatialRelationInfo #0 and #1 of PUCCH resources #0 during repeated PUSCH transmission. That is, the UE may perform repeated PUSCH transmissions #0, 2320 and #2, 2330 using PUCCH-spatialRelationInfo #0 and perform repeated PUSCH transmissions #1, 2325 and #3, 2335 using PUCCH-spatialRelationInfo #1 or vice versa.

Figure 23B:
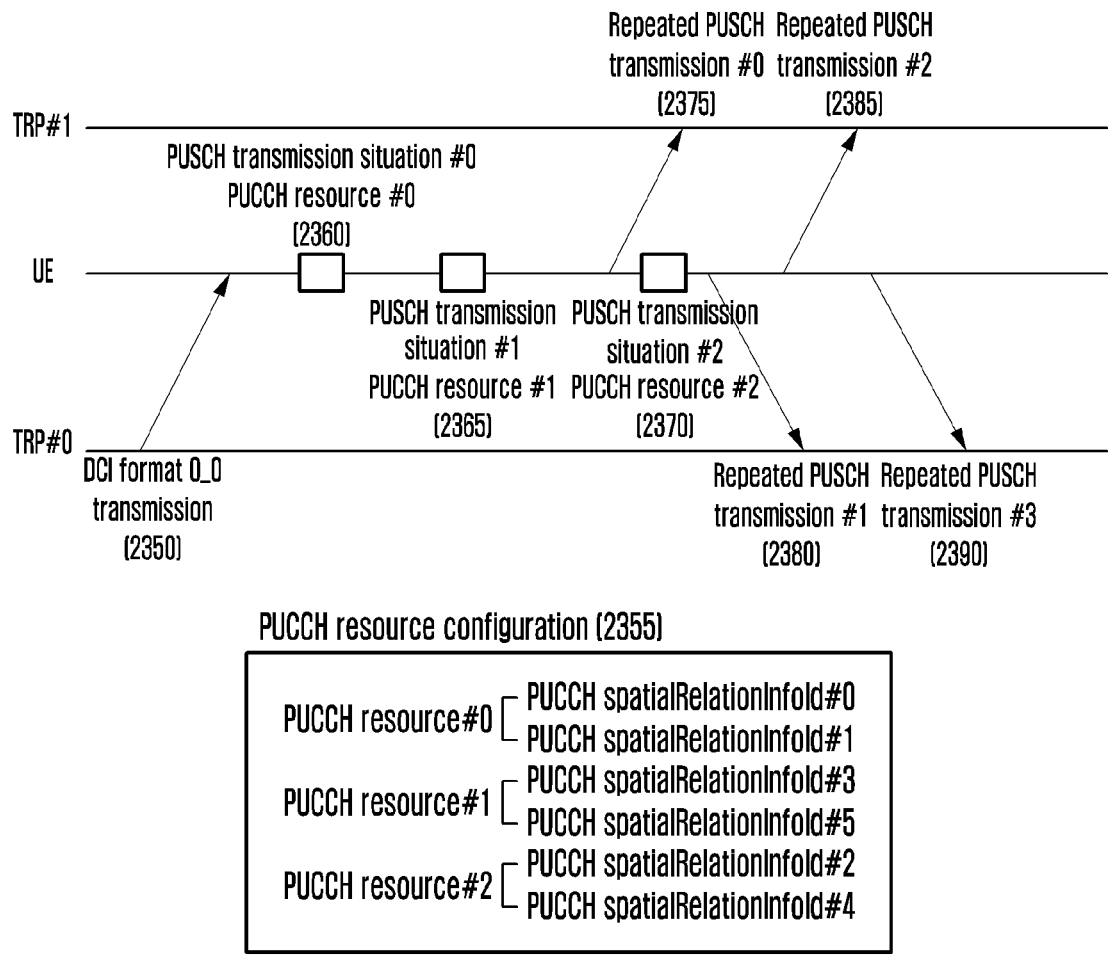
FIG. 23B is a diagram illustrating another example of a method of repeatedly transmitting a PUSCH based on a DCI format 0_0 according to some embodiments.

FIG. 23B is a diagram illustrating another example of a method in which the UE repeatedly transmits a PUSCH based on a DCI format 0_0 according to some embodiments.

With reference to FIG. 23B, when the UE repeatedly transmits a PUSCH based on a DCI format 0_0, there is illustrated an example of selecting a PUSCH transmission beam based on a PUCCH resource used in PUCCH transmission that occurs most recently or closest to repeated PUSCH transmission before repeated PUSCH transmission among PUCCH resources in which two PUCCH-spatialRelationInfos are configured. In FIG. 23B, two TRPs and total four repeated PUSCH transmissions (transmit twice to each TRP) are assumed, and it is assumed that the UE receives one DCI format 0_0 in the plurality of TRPs (2350). A PUCCH-spatialRelationInfo configuration (2355) for each PUCCH resource was configured by higher signaling. The UE may be configured to a PUCCH transmission situation #0, 2360 based on a PUCCH resource #0, a PUCCH transmission situation #1, 2365 based on a PUCCH resource #1, and a PUCCH transmission situation #2 based on a PUCCH resource #2, 2370.

In this case, in selecting a transmission beam to be used in repeated PUSCH transmission, the UE may select a PUSCH transmission beam based on the PUCCH resource used in the most recent PUCCH transmission situation before repeated PUSCH transmission, and the PUCCH transmission situation #1, 2365 is selected according to these criteria, so that the UE may select PUCCH-spatialRelationInfo #3 and #5 of a PUCCH resource #1 to configure a PUSCH transmission beam. That is, the UE may perform repeated PUSCH transmissions #0, 2375 and #2, 2385 using PUCCH-spatialRelationInfo #3, and perform repeated PUSCH transmissions #1, 2380 and #3, 2390 using PUCCH-spatialRelationInfo #5 and or vice versa.

As another example, in selecting a transmission beam to be used in repeated PUSCH transmission, the UE may select a PUSCH transmission beam based on a PUCCH resource used in a PUCCH transmission situation that occurs closest to repeated PUSCH transmission and a transmission situation #2, 2370 is selected according to these criteria, so that the UE may select PUCCH-spatialRelationInfo #2 and #4 of a PUCCH resource #2 to configure a PUSCH transmission beam. That is, the UE may perform repeated PUSCH transmissions #0, 2375 and #2, 2385 using PUCCH-spatialRelationInfo #2, and perform repeated PUSCH transmissions #1, 2380 and #3, 2390 using PUCCH-spatialRelationInfo #4 or vice versa.

When codebook-based PUSCH transmission is dynamically scheduled through DCI or semi-statically configured through a configured grant, the UE may not support repeated PUSCH transmission. When the UE dynamically schedules codebook-based repeated PUSCH transmission through DCI, the UE may configure a plurality of transmission beams for repeated PUSCH transmission, and a method of configuring a plurality of PUSCH transmission beams may follow at least one of the following methods.

Method 1: The UE performs SRS transmission to a plurality of TRPs through an SRS resource existing in an SRS resource set in which a value of usage, which is a higher layer signaling, is a codebook. Each TRP receives the SRS, and delivers TPMI information to the UE through DCI, but does not deliver a SRI. In this case, each TRP may transmit DCI to deliver an individual TPMI to the UE or may transmit a single DCI in a plurality of TRPs to deliver the TPMI.

In order to perform repeated PUSCH transmission without a SRI, the UE receive a configuration of SRS switching order information through higher layer signaling. The SRS switching order information may be configured with a plurality of SRS resources. For example, during repeated PUSCH transmission, the UE may apply the PUSCH transmission beam corresponding to a transmission beam of an SRS resource #0 at an even-numbered transmission occasion and an SRS resource #1 at an odd-numbered transmission occasion to transmit the PUSCH. In this way, the UE may determine whether to transmit a PUSCH through a transmission beam corresponding to which SRS resource for specific transmission among all repeated PUSCH transmissions based on the configured SRS switching order information. In this case, the UE may receive one TPMI through DCI and apply equally the TPMI to all SRS resources, or receive the TPMI as many as the number of SRS resources using for repeated PUSCH transmission and apply the TPMI corresponding to each SRS resource to perform repeated PUSCH transmission.

Method 2: The UE performs SRS transmission to a plurality of TRPs through an SRS resource existing in an SRS resource set in which a value of usage, which is a higher layer signaling, is a codebook. Each TRP receives the SRS and delivers a TPMI and SRI information to the UE through DCI. In this case, the UE may receive one TPMI through DCI and apply equally the TPMI to all SRS resources, or receive TPMI as many as the number of SRS resources using for repeated PUSCH transmission and apply the TPMI corresponding to each SRS resource to perform repeated PUSCH transmission. Further, the SRI information may be an index of a combination expressing the specific number of SRS resources among all SRS resources or an index of a specific SRS resource group when a predefined SRS resource group is configured by bundling specific SRS resources.

The UE performs repeated PUSCH transmission based on the received TPMI and SRI information. For example, when the SRI information indicates an index of a combination of two SRS resources, the UE may perform repeated PUSCH transmission using a transmission beam of one SRS resource at an even-numbered transmission time and a transmission beam of the other one SRS resource at an odd-numbered transmission time among all repeated PUSCH transmissions. Alternatively, the UE may use a transmission beam of one SRS resource at a transmission occasion of the first half of all repeated PUSCH transmissions and use a transmission beam of the remaining one SRS resource at a transmission occasion of the other half. In this case, as described above, the TPMI may have the same value for every transmission in repeated transmission or may have a different value for each SRS resource.

Similar to dynamic scheduling through the DCI, the UE may be semi-statically configured to codebook-based repeated PUSCH transmission through a configured grant. In this case, one or a plurality of precodingAndNumberOfLayers or srs-ResourceIndicator in rrc-ConfiguredUplinkGrant, which is higher layer signaling, may be configured. Further, upon dynamic scheduling through the DCI, as in a method 1, SRS switching order information may be configured without a srs-ResourceIndicator, which is higher layer signaling to be used for repeated PUSCH transmission.

Figure 24A:
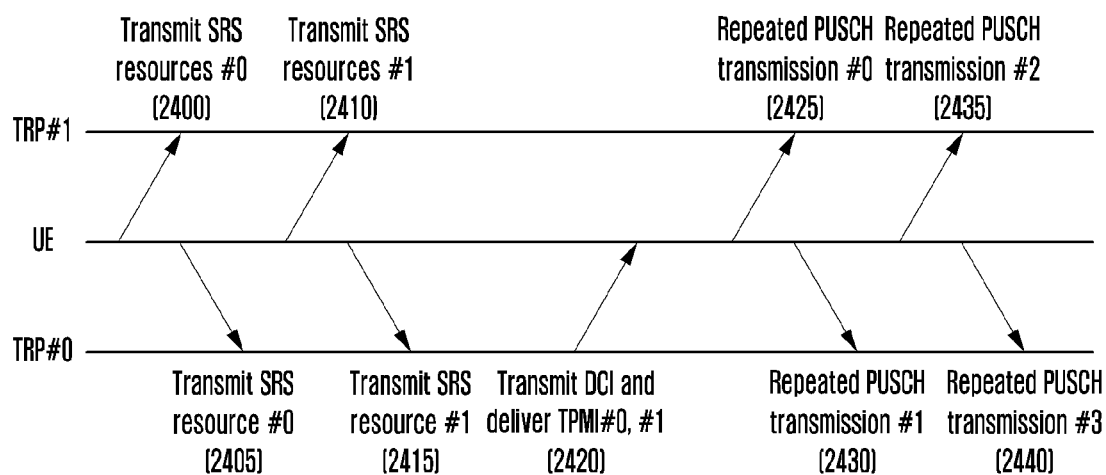
FIG. 24A is a diagram illustrating an example of a codebook-based repeated PUSCH transmission method of a terminal according to some embodiments.

FIG. 24A is a diagram illustrating an example of a codebook-based repeated PUSCH transmission method of a UE according to some embodiments.

With reference to FIG. 24A, the UE may perform codebook-based repeated PUSCH transmission based on preconfigured SRS switching order information. In FIG. 24A, two TRPs, two SRS resources, and total four repeated PUSCH transmissions (transmit twice to each TRP) are assumed, and it is assumed that TPMI #0 and TPMI #1 to be applied to transmission to each TRP through one DCI in a plurality of TRPs are delivered. The UE performs SRS transmission for a plurality of TRPs in SRS resource #0, 2400 and 2405 and SRS resource #1, 2410 and 2415. DCI dynamically scheduling codebook-based repeated PUSCH transmission in TRP #0 among TRP #0 and TRP #1 is transmitted to the UE (2420), and the DCI includes TPMI #0 and TPMI #1.

The UE performs codebook-based repeated PUSCH transmission using TPMI #0 and TPMI #1 in the received DCI and preconfigured SRS switching order information. For example, the UE transmits a PUSCH using TPMI #0 to TRP #0, and transmits a PUSCH using TPMI #1 to TRP #1. As SRS switching order information, it is assumed that the UE has previously configured to transmit using an SRS resource #0 at an even-numbered transmission occasion and an SRS resource #1 at an odd-numbered transmission occasion during repeated PUSCH transmission. According to the SRS switching order information, the UE transmits a PUSCH according to the SRS resource #0 using TPMI #0 in repeated PUSCH transmissions #0, 2425 and #2, 2435, and transmits a PUSCH according to the SRS resource #1 using TPMI #1 in repeated PUSCH transmission #1, 2430 and #3, 2440.

Figure 24B:
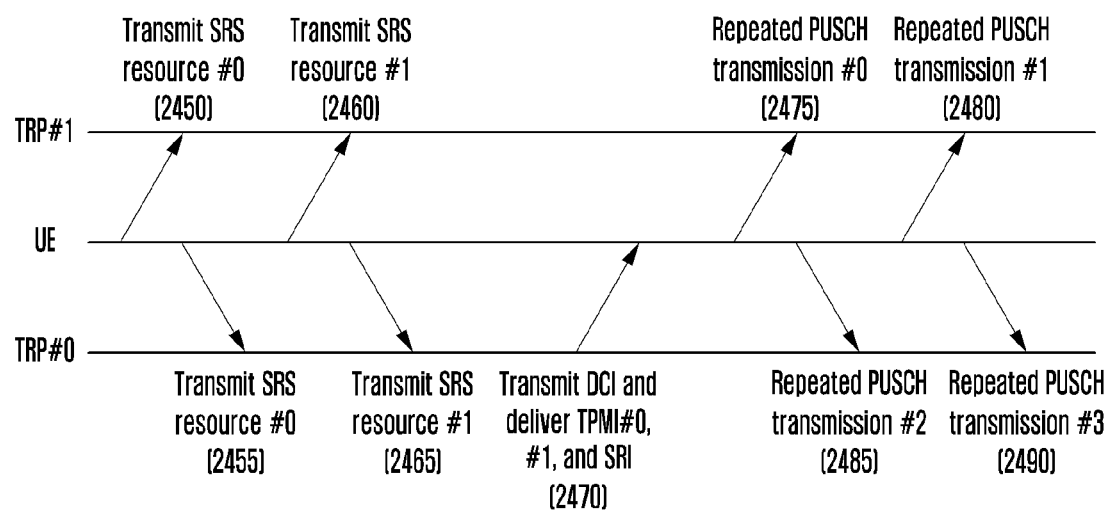
FIG. 24B is a diagram illustrating another example of a codebook-based repeated PUSCH transmission method of a terminal according to some embodiments.

FIG. 24B is a diagram illustrating another example of a codebook-based repeated PUSCH transmission method of a UE according to some embodiments.

With reference to FIG. 24B, the UE may perform codebook-based repeated PUSCH transmission based on SRI information. In FIG. 24B, two TRPs, two SRS resources, and total four repeated PUSCH transmissions (transmit twice to each TRP) are assumed, and it is assumed that TPMI #0 and TPMI #1 to be applied to transmission to each TRP are delivered through one DCI in a plurality of TRPs. Additionally, in FIG. 24B, it is assumed that the UE delivers SRI information to be used for transmission to each TRP to DCI. The UE performs SRS transmission for a plurality of TRPs in an SRS resource #0, 2450 and 2455 and an SRS resource #1, 2460 and 2465. DCI dynamically scheduling codebook-based repeated PUSCH transmission in TRP #0 among TRP #0 and TRP #1 is transmitted to the UE (2470), and the DCI includes TPMI #0, TPMI #1, and SRI. The UE transmits a PUSCH using TPMI #0 to TRP #0 and a PUSCH using TPMI #1 to TRP #1. The UE may transmit a PUSCH according to SRS resource #0 in repeated PUSCH transmissions #0, 2475 and #1, 2480 using the received SRI and transmit a PUSCH according to an SRS resource #1 in repeated PUSCH transmissions #2, 2485 and #3, 2490.

Codebook-based repeated PUSCH transmission based on DCI-based dynamic scheduling of FIGS. 24A and 24B may be semi-statically configured based on the grant configured as described above. Further, when codebook-based repeated PUSCH transmission of FIGS. 24A and 24B is performed, repeated transmission in units of slots or in units of symbols within a slot and in units of symbols crossing a slot boundary are all possible.

When non-codebook-based PUSCH transmission is dynamically scheduled through DCI or semi-statically configured through a configured grant, the UE may not support repeated PUSCH transmission. When the UE is dynamically scheduled for non-codebook-based repeated PUSCH transmission through DCI, the UE may receive a configuration of one or a plurality of SRS resource sets whose usage value, which is higher layer signaling, is nonCodebook.

When the UE receives a configuration of one SRS resource set having a usage value of nonCodebook, a plurality of NZP CSI-RS resources connected to the corresponding SRS resource set may be configured. In this case, the plurality of NZP CSI-RS resources connected to the corresponding SRS resource set may have the same or different time domain behaviors. For example, a plurality of periodic, semi-persistent, or aperiodic NZP CSI-RS resources connected to a periodic, semi-persistent, or aperiodic SRS resource set may be configured to the UE. Further, a plurality of connected NZP CSI-RS resources may be considered as NZP CSI-RS resources transmitted from each TRP. For example, two NZP CSI-RS resources are connected in the SRS resource set having a usage value of nonCodebook, which may be considered as NZP CSI-RS resources transmitted from each of the two TRPs. The UE may calculate one precoder through reception and measurement of a plurality of NZP CSI-RS resources in the corresponding SRS resource set. Further, the UE may calculate each precoder through reception and measurement of each of a plurality of NZP CSI-RS resources. The UE transmits the SRS resource using the precoder calculated by the above methods.

The base station receives an SRS resource transmitted by the UE and delivers SRI information. In this case, the SRI information may deliver a plurality of indexes of combinations expressing the specific number of SRS resources among all SRS resources or may deliver an index of a plurality of SRS resource group when a predefined SRS resource group is configured by binding specific SRS resources.

For example, when the UE receives, from the base station, an SRI in which an index of a first SRS resource combination indicates SRS resources #0 and #1 and in which an index of a second SRS resource combination indicates SRS resources #2 and #3, the UE may perform PUSCH transmission according to an index of the first SRS resource combination at an even-numbered transmission occasion and perform PUSCH transmission according to the index of the second SRS resource combination at an odd-numbered transmission occasion during non-codebook-based repeated PUSCH transmission. As another example, when receiving the combination index, the UE may perform PUSCH transmission according to the index of the first SRS resource combination at a transmission occasion of the first half of non-codebook-based repeated PUSCH transmission and perform PUSCH transmission according to the index of the second SRS resource combination at a transmission occasion of the other half. As another example, when the UE receives an SRI indicating a plurality of SRS resource group indices from the base station, the UE may equally apply an operation when receiving the combination index to the SRS resource group index to perform non-codebook-based repeated PUSCH transmission.

When the UE receives a configuration of a plurality of SRS resource sets having a usage value of nonCodebook, one or a plurality of NZP CSI-RS resources connected to the corresponding SRS resource set may be configured. In this case, one or a plurality of NZP CSI-RS resources connected to the SRS resource set may have the same or different time domain behavior. For example, a plurality of periodic, semi-persistent, or aperiodic NZP CSI-RS resources connected to a periodic, semi-persistent, or aperiodic SRS resource set may be configured to the UE. In this case, the UE may consider each of a plurality of SRS resource sets having a usage value of nonCodebook as information corresponding to TRP. If there is one NZP CSI-RS resource connected with each SRS resource set, the UE may operate similarly to non-codebook-based repeated PUSCH transmission in NR release 15 for each SRS resource set. In this case, non-overlapping SRS resources should be configured for each SRS resource set.

If there are a plurality of NZP CSI-RS resources connected with each SRS resource set, the UE may use the most recently received NZP CSI-RS resource or select the NZP-CSI-RS based on a time domain behavior of the plurality of NZP CSI-RS resources and calculate a precoder to be used when transmitting the SRS resource. In this case, when the UE selects the NZP-CSI-RS to be the basis of the precoder calculation using the time domain behavior of the NZP CSI-RS resources, the UE may select in order of aperiodic, semi-persistent, or periodic NZP CSI-RS resources or vice versa. When all of a plurality of NZP CSI-RS resources have the same time domain behavior, the plurality of NZP CSI-RS resources may be used for precoder calculation based on the most recently received NZP CSI-RS resource. As described above, the UE may calculate one precoder through reception and measurement of a plurality of NZP CSI-RS resources in the corresponding SRS resource set. Further, as described above, the UE may calculate each precoder through reception and measurement of each of a plurality of NZP CSI-RS resources.

The UE transmits the SRS resource using the precoder calculated by the above methods. The base station may receive the SRS resource transmitted from the UE and delivers the SRI information as described above, and the UE may perform non-codebook based repeated PUSCH transmission using the SRS resource according to the interpretation of the SRI information, as described above.

Similar to dynamic scheduling through DCI, the UE may be semi-statically configured to non-codebook-based repeated PUSCH transmission through a configured grant. In this case, one or a plurality of srs-ResourceIndicators in rrc-ConfiguredUplinkGrant, which is higher layer signaling, may be configured. Further, the srs-ResourceIndicator may be an index of a combination of a plurality of SRS resources or an index of an SRS resource group configured with a plurality of predefined SRS resources.

Figure 25A:
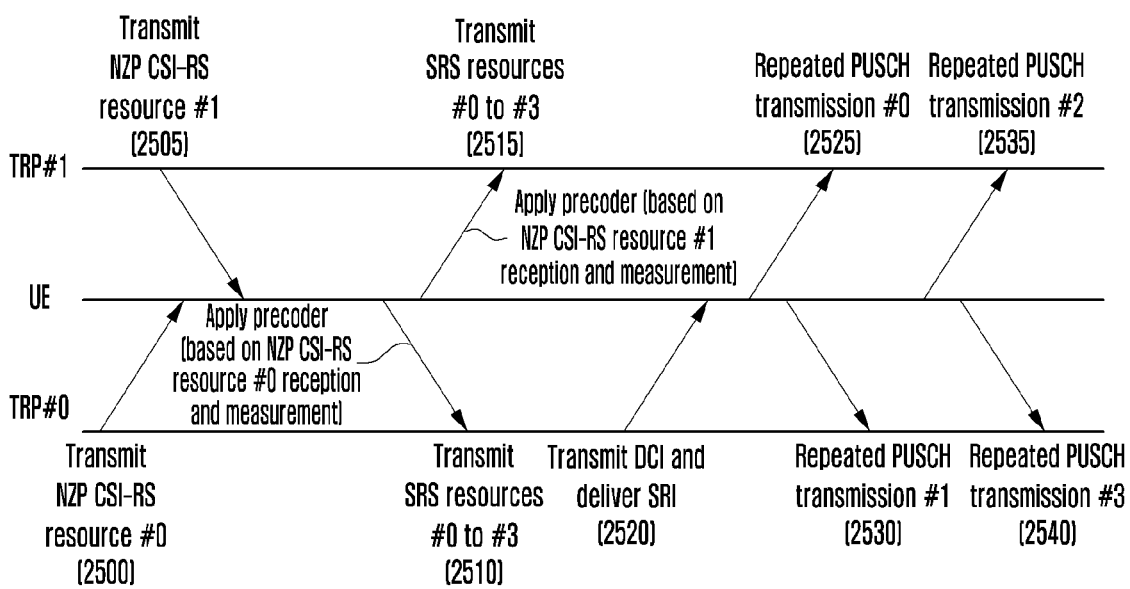
FIG. 25A is a diagram illustrating an example of a non-codebook-based repeated PUSCH transmission method of a terminal when one SRS resource set is configured.
Figure 25B:
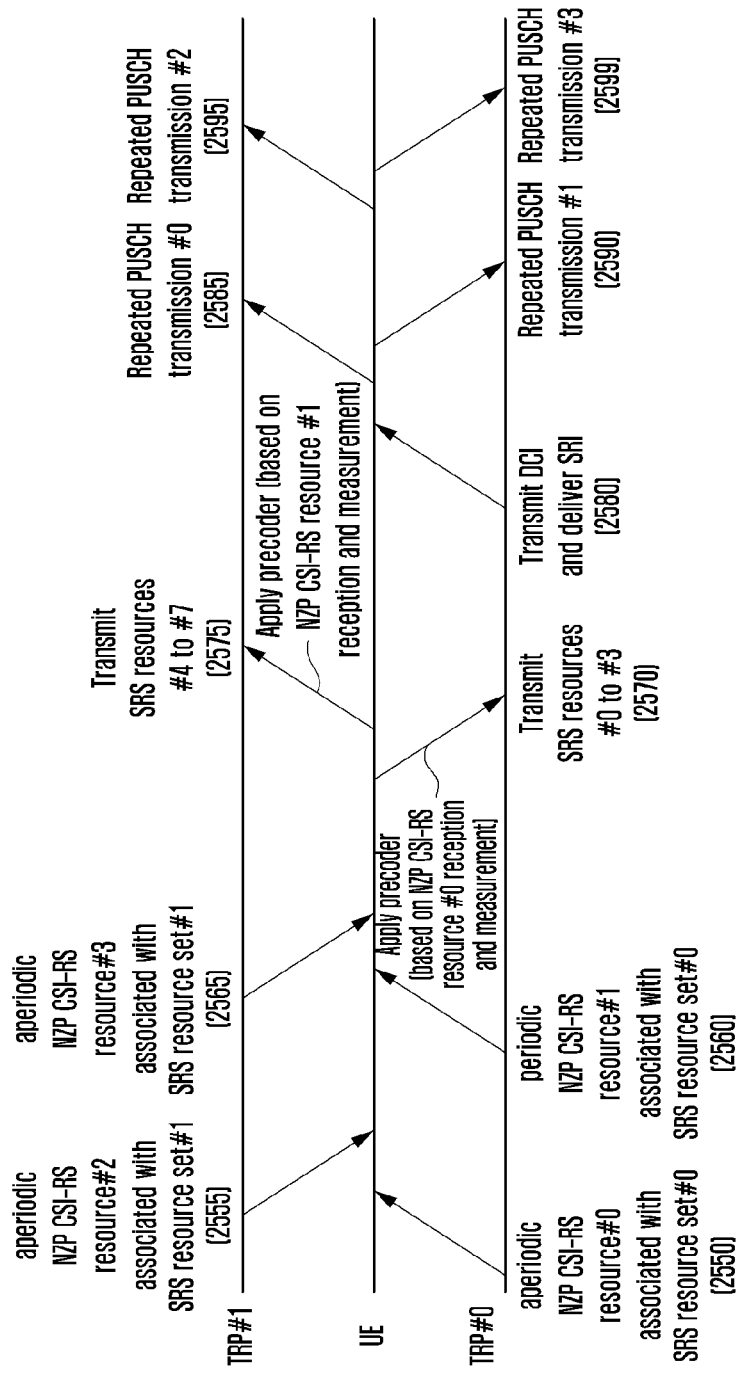
FIG. 25B is a diagram illustrating an example of a non-codebook-based repeated PUSCH transmission method of a terminal when two SRS resource sets are configured.

FIGS. 25A and 25B are diagrams illustrating an example of a non-codebook-based repeated PUSCH transmission method of a UE according to some embodiments. Specifically, FIG. 25A is a diagram illustrating an example of a non-codebook-based repeated PUSCH transmission method of a UE when one SRS resource set is configured, and FIG. 25B is a diagram illustrating an example of a non-codebook-based repeated PUSCH transmission method of the UE when two SRS resource sets are configured.

With reference to FIG. 25A, the UE may perform non-codebook based repeated PUSCH transmission using one SRS resource set having a usage value of a nonCodebook. In FIG. 25A, 2 TRPs, 4 SRS resources, and total 4 repeated PUSCH transmissions (transmit twice to each TRP) are assumed, and it is assumed that an SRI to be applied to transmission to each TRP is transmitted through one DCI in a plurality of TRPs. Additionally, NZP CSI-RS resources #0 and #1 connected to the above SRS resource set were considered. A TRP #0 and TRP #1 transmit NZP CSI-RS resources #0, 2500 and #1, 2505, respectively to the UE. The UE calculates a precoder to be applied to SRS resources #0 to #3, 2510 to be transmitted to the TRP #0 based on reception and measurement of the NZP CSI-RS resource #0. Similarly, the UE calculates a precoder to be applied to SRS resources #0 to #3, 2515 to be transmitted to the TRP #1 based on reception and measurement of the NZP CSI-RS resource #1.

DCI dynamically scheduling non-codebook-based repeated PUSCH transmission in TRP #0 among the TRP #0 and TRP #1 is transmitted to the UE (2520), and the DCI includes an SRI. The UE performs repeated non-codebook-based PUSCH transmission using the SRI in the received DCI. The SRI may indicate a combination of SRS resources for each TRP. For example, the SRI in DCI may be an index indicating a pair of SRS resources #0 and #1 for PUSCH transmission to the TRP #0 and a pair of SRS resources #2 and #3 for PUSCH transmission to the TRP #1. According to the corresponding SRI information, the UE performs PUSCH transmission using SRS resources #0 and #1 in repeated PUSCH transmissions #0, 2525 and #2, 2535 and performs PUSCH transmission using SRS resources #2 and #3 in repeated PUSCH transmissions #1, 2530 and #3, 2540. Specifically, the UE performs 2-layer transmission based on SRS resources #0 and #1 in repeated PUSCH transmissions #0, 2525 and #2, 2535, and in this case, a precoder based on the precoder applied to each of SRS resources #0 and #1 is applied to each layer of the PUSCH, and such a precoder may be the same as or different from that applied to the SRS resource. Further, the UE performs 2-layer transmission based on SRS resources #2 and #3 in repeated PUSCH transmissions #1, 2530 and #3, 2540, and in this case, a precoder based on the precoder applied to each of SRS resources #2 and #3 is applied to each layer, and such a precoder may be the same as or different from that applied to the SRS resource.

With reference to FIG. 27B, when two SRS resource sets having a usage value of a nonCodebook are configured to the UE and there are two NZP CSI-RS resources connected for each SRS resource set, the UE may perform non-codebook based repeated PUSCH transmission. In FIG. 27B, two TRPs and four SRS resources for each SRS resource set, and total four repeated PUSCH transmissions (transmit twice to each TRP) are assumed, and it was assumed that an SRI to be applied to transmission to each TRP is delivered through one DCI in the plurality of TRPs. Additionally, an aperiodic NZP CSI-RS resource #0 connected to an SRS resource set #0, an aperiodic NZP CSI-RS resource #2 and an aperiodic NZP CSI-RS resource #3 connected to a periodic NZP CSI-RS resource #1 and an SRS resource set #1 were considered.

The TRP #0 transmits an aperiodic NZP CSI-RS resource #0, 2550 and a periodic NZP CSI-RS resource #1, 2560 to the UE, and the TRP #1 transmits an aperiodic NZP CSI-RS resource #2, 2550 and an aperiodic NZP CSI-RS resource #3, 2565 to the UE. When transmitting SRS resources #0 to #3 to the TRP #0 (2570), the UE may calculate a precoder to be applied based on reception and measurement of the aperiodic NZP CSI-RS resource #0. In this case, because the NZP CSI-RS resource #0 is a resource having the most dynamic time domain behavior among two NZP CSI-RS resources, the NZP CSI-RS resource #0 is selected. The corresponding NZP CSI-RS resource may be selected because the NZP CSI-RS resource is a resource having the most static time domain behavior, contrary to the above. Further, the UE may calculate a precoder to be applied when transmitting SRS resources #4 to #7 to the TRP #1 (2575) based on reception and measurement of the NZP CSI-RS resource #3. In this case, the NZP CSI-RS resource #3 is selected because the NZP CSI-RS resource #3 is the most recently received resource among two NZP CSI-RS resources having the same time domain behavior.

One DCI in two TRPs is transmitted from the TRP #0 (2580), and the DCI includes an SRI usable by the UE. The SRI may indicate a combination of SRS resources for each TRP. For example, the SRI may include a pair of SRS resources #0 and #1 for PUSCH transmission to the TRP #0 and set information of SRS resources #5, #6, and #7 for PUSCH transmission to the TRP #1. Based on the SRI information, the UE may perform PUSCH transmission at repeated PUSCH transmission occasions #1, 2590 and #3, 2599 using SRS resources #0 and #1 for repeated PUSCH transmission to the TRP #0, and perform PUSCH transmission at repeated PUSCH transmission occasions #0, 2585 and #2, 2595 using SRS resources #5, #6, and #7 for repeated PUSCH transmission to the TRP #1.

In this case, the UE performs 2-layer transmission based on SRS resources #0 and #1 in repeated PUSCH transmissions #1, 2590 and #3, 2599 for the TRP #0, and in this case, a precoder based on the precoder applied to each of SRS resource #0 and #1 is applied to each layer of the PUSCH, and such a precoder may be the same as or different from that applied to the SRS resource. Further, the UE performs 3-layer transmission based on SRS resources #5, #6, and #7 in repeated PUSCH transmissions #0, 2585 and #2, 2595 for the TRP #1, and in this case, a precoder based on the precoder applied to each of SRS resources #5, #6, and #7 is applied to each layer, and such a precoder may be the same as or different from that applied to the SRS resource.

Non-codebook-based repeated PUSCH transmission based on DCI-based dynamic scheduling of FIGS. 25A and 25B may be configured semi-statically based on the configured grant, as described above. Further, when the non-codebook-based repeated PUSCH transmission of FIGS. 25A and 25B is performed, repeated transmission in units of slots or in units of symbols within a slot and in units of symbols crossing a slot boundary are all possible.

Figure 26:
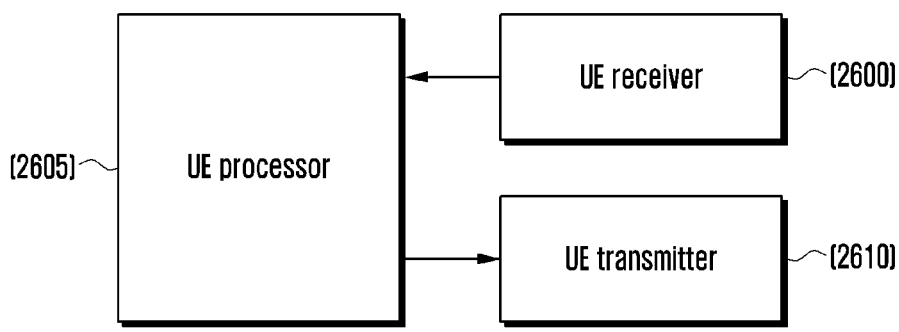
FIG. 26 is a block diagram illustrating a structure of a terminal in a wireless communication system according to an embodiment of the disclosure.

FIG. 26 is a block diagram illustrating a structure of a UE in a wireless communication system according to an embodiment of the disclosure.

With reference to FIG. 26, the UE may include transceivers 2600 and 2610, a memory, and a processor 2605. According to a communication method of the UE described above, the transceivers 2600 and 2610 and the processor 2605 of the UE may operate. However, the components of the UE are not limited to the above-described examples. For example, the UE may include more or fewer components than the aforementioned components. Further, the transceiver, the memory, and the processor may be implemented in the form of a single chip.

The transceivers 2600 and 2610 may transmit and receive signals to and from the base station. Here, the signal may include control information and data. To this end, the transceivers 2600 and 2610 may include an RF transmitter for up-converting and amplifying a frequency of a signal to be transmitted, and an RF receiver for low-noise amplifying a received signal and down-converting a frequency thereof. However, this is only an embodiment of the transceivers 2600 and 2610, and components of the transceivers 2600 and 2610 are not limited to the RF transmitter and the RF receiver.

Further, the transceivers 2600 and 2610 may receive a signal through a wireless channel, output the signal to the processor 2605, and transmit the signal output from the processor 2605 through a wireless channel.

The memory may store programs and data necessary for the operation of the UE. Further, the memory may store control information or data included in a signal transmitted and received by the UE. The memory may be configured with a storage medium or a combination of storage media, such as a ROM, RAM, hard disk, CD-ROM, and DVD. Further, there may be a plurality of memories.

Further, the processor 2605 may control a series of processes so that the UE can operate according to the above-described embodiment. There may be a plurality of processors 2605, and the processor 2605 may execute a program stored in the memory to perform a component control operation of the UE.

Figure 27:
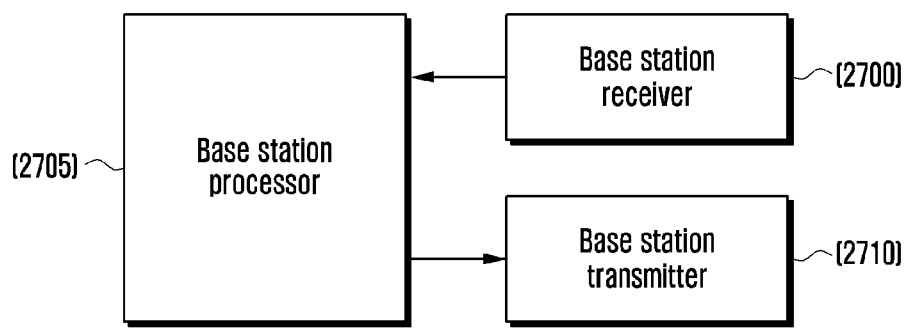
FIG. 27 is a block diagram illustrating a structure of a base station in a wireless communication system according to an embodiment of the disclosure.

FIG. 27 is a block diagram illustrating a structure of a base station in a wireless communication system according to an embodiment of the disclosure.

With reference to FIG. 27, the base station may include transceivers 2700 and 2710, a memory, and a processor 2705. According to the above-described communication method of the base station, the transceivers 2700 and 2710 and the processor 2705 of the base station may operate. However, the components of the base station are not limited to the above-described example. For example, the base station may include more or fewer components than the aforementioned components. Further, the transceiver, the memory, and the processor may be implemented in the form of a single chip.

The transceivers 2700 and 2710 may transmit and receive signals to and from the UE. Here, the signal may include control information and data. To this end, the transceivers 2700 and 2710 may include an RF transmitter for up-converting and amplifying a frequency of a signal to be transmitted, and an RF receiver for low-noise amplifying a received signal and down-converting a frequency thereof. However, this is only an embodiment of the transceivers 2700 and 2710, and components of the transceivers 2700 and 2710 are not limited to the RF transmitter and the RF receiver.

Further, the transceivers 2700 and 2710 may receive a signal through a wireless channel, output the signal to the processor 2705, and transmit the signal output from the processor 2705 through a wireless channel.

The memory may store programs and data necessary for the operation of the base station. Further, the memory may store control information or data included in a signal transmitted and received by the base station. The memory may be configured with a storage medium or a combination of storage media, such as a ROM, RAM, hard disk, CD-ROM, and DVD. Further, there may be a plurality of memories.

The processor 2705 may control a series of processes so that the base station can operate according to the above-described embodiment of the disclosure. There may be a plurality of processors 2705, and the processor 2705 may execute a program stored in the memory to perform a component control operation of the base station.

Methods according to the embodiments described in the claims or specifications of the disclosure may be implemented in the form of hardware, software, or a combination of hardware and software.

When implemented in software, a computer readable storage medium storing one or more programs (software modules) may be provided. One or more programs stored in the computer readable storage medium are configured for execution by one or more processors in an electronic device. The one or more programs include instructions for causing an electronic device to execute methods according to embodiments described in a claim or specification of the disclosure.

Such programs (software modules, software) may be stored in a random access memory, a non-volatile memory including a flash memory, a read only memory (ROM), an electrically erasable programmable ROM (EEPROM), a magnetic disc storage device, a compact disc-ROM (CD-ROM), digital versatile discs (DVDs), any other form of optical storage device, or a magnetic cassette. Alternatively, the programs may be stored in a memory configured with a combination of some or all thereof. Further, each configuration memory may be included in the plural.

Further, the program may be stored in an attachable storage device that may access through a communication network such as the Internet, Intranet, local area network (LAN), wide LAN (WLAN), or storage area Network (SAN), or a communication network configured with a combination thereof. Such a storage device may access to a device implementing an embodiment of the disclosure through an external port. Further, a separate storage device on a communication network may access to a device implementing the embodiment of the disclosure.

In the specific embodiments of the disclosure described above, elements included in the disclosure are expressed in the singular or plural according to the specific embodiments presented. However, the singular or plural expression is appropriately selected for a situation presented for convenience of description, and the disclosure is not limited to the singular or plural element, and even if a component is represented in the plural, it may be configured with the singular, or even if a component is represented in the singular, it may be configured with the plural.

Embodiments of the disclosure disclosed in this specification and drawings merely present specific examples in order to easily describe the technical contents of the disclosure and help the understanding of the disclosure, and they are not intended to limit the scope of the disclosure. That is, it will be apparent to those of ordinary skill in the art to which the disclosure pertains that other modifications based on the technical spirit of the disclosure may be implemented. Further, each of the above embodiments may be operated in combination with each other, as needed. For example, the base station and the UE may be operated by combining parts of an embodiment and another embodiment of the disclosure with each other. For example, the base station and the UE may be operated by combining parts of Embodiments 1 and 2 of the disclosure with each other. Further, although the above embodiments have been presented based on an FDD LTE system, other modifications based on the technical idea of the embodiment may be implemented in other systems such as a TDD LTE system, 5G or NR system.

In the drawings illustrating a method of the disclosure, the order of description does not necessarily correspond to the order of execution, and the precedence relationship may be changed or may be executed in parallel.

Alternatively, in the drawings illustrating the method of the disclosure, some components may be omitted and only some components may be included within a range that does not impair the essence of the disclosure.

Further, the method of the disclosure may be implemented in a combination of some or all of the contents included in each embodiment within a range that does not impair the essence of the disclosure.

The invention claimed is:

1. A method performed by a terminal in a communication system, the method comprising:
  transmitting, to a base station, capability information on physical uplink control channel (PUCCH) repetitions;
  receiving, from the base station, PUCCH configuration information, the PUCCH configuration information including a plurality of spatialrelationinfo parameters;
  receiving, from the base station, a medium access control-control element (MAC-CE) including an identifier of a PUCCH resource and identifiers of two spatialrelationinfo parameters for the PUCCH resource; and
  performing repetitive PUCCH transmissions for transmitting uplink control information on the PUCCH resource by applying the two spatialrelationinfo parameters alternately.

2. The method of claim 1, wherein a spatialrelationinfo parameter corresponding to an identifier includes an identifier of a reference signal related to a path loss for identifying a PUCCH transmission power, and an identifier of one of a synchronization signal block (SSB), a channel state information reference signal (CSI-RS), or a sounding reference signal (SRS).

3. The method of claim 2, wherein a PUCCH transmission power of a PUCCH transmission among the repetitive PUCCH transmissions is identified based on the path loss based on the reference signal of the spatialrelationinfo parameter corresponding to the PUCCH transmission.

4. The method of claim 1,
  wherein the capability information includes information indicating whether the terminal supports inter-slot PUCCH repetitions and information indicating whether the terminal supports intra-slot PUCCH repetitions.

5. A method performed by a base station in a communication system, the method comprising:

receiving, from a terminal, capability information on physical uplink control channel (PUCCH) repetitions;

transmitting, to the terminal, PUCCH configuration information, the PUCCH configuration information including a plurality of spatialrelationinfo parameters;

transmitting, to the terminal, a medium access control-control element (MAC-CE) including an identifier of a PUCCH resource and identifiers of two spatialrelationinfo parameters for the PUCCH resource; and receiving repetitive PUCCH transmissions for receiving uplink control information on the PUCCH resource, wherein the two spatialrelationinfo parameters are associated with the repetitive PUCCH transmissions alternately.

6. The method of claim 5, wherein a spatialrelationinfo parameter corresponding to an identifier includes an identifier of a reference signal related to a path loss associated with a PUCCH transmission power, and an identifier of one of a synchronization signal block (SSB), a channel state information reference signal (CSI-RS), or a sounding reference signal (SRS).

7. The method of claim 6, wherein the PUCCH transmission power of a PUCCH transmission among the repetitive PUCCH transmissions is based on the path loss based on the reference signal of the spatialrelationinfo parameter corresponding to the PUCCH transmission.

8. The method of claim 5,
wherein the capability information includes information indicating whether the terminal supports inter-slot PUCCH repetitions and information indicating whether the terminal supports intra-slot PUCCH repetitions.

9. A terminal in a communication system, the terminal comprising:
a transceiver; and
a controller configured to:
transmit, to a base station, capability information on physical uplink control channel (PUCCH) repetitions,
receive, from the base station, PUCCH configuration information, the PUCCH configuration information including a plurality of spatialrelationinfo parameters,
receive, from the base station, a medium access control-control element (MAC-CE) including an identifier of a PUCCH resource and identifiers of two spatialrelationinfo parameters for the PUCCH resource, and
performing repetitive PUCCH transmissions for transmitting uplink control information on the PUCCH resource by applying the two spatialrelationinfo parameters alternately.

10. The terminal of claim 9, wherein a spatialrelationinfo parameter corresponding to an identifier includes an identifier of a reference signal related to a path loss for identifying a PUCCH transmission power, and an identifier of one of a synchronization signal block (SSB), a channel state information reference signal (CSI-RS), or a sounding reference signal (SRS).

11. The terminal of claim 10, wherein the PUCCH transmission power of a PUCCH transmission among the repetitive PUCCH transmissions is identified based on the path loss based on the reference signal of the spatialrelationinfo parameter corresponding to the PUCCH transmission.

12. The terminal of claim 9,
wherein the capability information includes information indicating whether the terminal supports inter-slot PUCCH repetitions and information indicating whether the terminal supports intra-slot PUCCH repetitions.

13. A base station for receiving uplink control information in a communication system, the base station comprising:
a transceiver; and
a controller configured to:
receive, from a terminal, capability information on physical uplink control channel (PUCCH) repetitions,
transmit, to the terminal, PUCCH configuration information, the PUCCH configuration information including a plurality of spatialrelationinfo parameters,
transmit, to the terminal, a medium access control-control element (MAC-CE) including an identifier of a PUCCH resource and identifiers of two spatialrelationinfo parameters for the PUCCH resource, and
receiving repetitive PUCCH transmissions for receiving uplink control information on the PUCCH resource,
wherein the two spatialrelationinfo parameters are associated with the repetitive PUCCH transmissions alternately.

14. The base station of claim 13,
wherein the capability information includes information indicating whether the terminal supports inter-slot PUCCH repetitions and information indicating whether the terminal supports intra-slot PUCCH repetitions.

15. The base station of claim 13, wherein a spatialrelationinfo parameter corresponding to an identifier includes an identifier of a reference signal related to a path loss associated with a PUCCH transmission power, and an identifier of one of a synchronization signal block (SSB), a channel state information reference signal (CSI-RS), or a sounding reference signal (SRS).

16. The base station of claim 15, wherein the PUCCH transmission power of a PUCCH transmission among the repetitive PUCCH transmissions is based on the path loss based on the reference signal of the spatialrelationinfo parameter corresponding to the PUCCH transmission.

* * * * *